US012315692B2

(12) United States Patent
Yoo

(10) Patent No.: US 12,315,692 B2
(45) Date of Patent: May 27, 2025

(54) ARC PATH FORMING UNIT AND DIRECT CURRENT RELAY COMPRISING SAME

(71) Applicant: LS ELECTRIC CO., LTD., Anyang-si (KR)

(72) Inventor: Jungwoo Yoo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 18/405,176

(22) Filed: Jan. 5, 2024

(65) Prior Publication Data

US 2024/0145196 A1 May 2, 2024

Related U.S. Application Data

(62) Division of application No. 17/626,003, filed as application No. PCT/KR2019/010755 on Aug. 23, 2019, now abandoned.

(30) Foreign Application Priority Data

Jul. 11, 2019 (KR) ........................ 10-2019-0083784

(51) Int. Cl.
*H01H 50/38* (2006.01)
*H01H 50/02* (2006.01)
*H01H 50/54* (2006.01)

(52) U.S. Cl.
CPC ............ *H01H 50/38* (2013.01); *H01H 50/02* (2013.01); *H01H 50/54* (2013.01)

(58) Field of Classification Search
CPC ........................... H01H 9/44–46; H01H 50/38
(Continued)

(56) References Cited

U.S. PATENT DOCUMENTS 5,546,061 A 8/1996 Okabayashi et al.
8,653,691 B2 * 2/2014 Hsu ........................ H01H 50/36 335/125
(Continued)

FOREIGN PATENT DOCUMENTS

CN 102683116 A 9/2012
CN 102834891 A 12/2012
(Continued)

OTHER PUBLICATIONS

1 Office Action for related Chinese Application No. 201980098278.8; action dated Apr. 11, 2024; (7 pages).
(Continued)

*Primary Examiner* — Alexander Talpalatski
(74) *Attorney, Agent, or Firm* — K&L Gates LLP

(57) ABSTRACT

An arc path forming unit and a direct current relay are disclosed. An arc path forming unit according to an embodiment of the present disclosure comprises: a magnet frame extending in a longitudinal direction; and a plurality of main magnet units disposed in the width direction of the magnet frame. The surfaces, which face each other, of the main magnet units have the same polarity. Therefore, magnetic fields that repel each other are generated in a space between the respective main magnet units. An electromagnetic force in the direction oriented toward the outside of the arc path forming unit is formed by means of the magnetic fields. Thus, a generated arc can move in the direction of the electromagnetic force so as to be stably extinguished. As a result, various members positioned in the center of the direct current relay are prevented from being damaged by the arc.

9 Claims, 22 Drawing Sheets

(a)

(b)

(58) Field of Classification Search
USPC .......................................................... 335/201
See application file for complete search history.

(56) References Cited

U.S. PATENT DOCUMENTS

| | | | | |
|---|---|---|---|---|
| 8,853,585 | B2 | 10/2014 | Tachikawa et al. | |
| 9,087,655 | B2 * | 7/2015 | Enomoto | H01H 50/546 |
| 9,190,233 | B2 * | 11/2015 | Daitoku | H01H 9/40 |
| 9,570,258 | B2 | 2/2017 | Park | |
| 10,998,155 | B2 | 5/2021 | Lee et al. | |
| 12,142,447 | B2 * | 11/2024 | Hotta | H01H 50/38 |
| 2011/0120844 | A1 * | 5/2011 | Hoffmann | H01H 50/02 200/275 |
| 2011/0240603 | A1 | 10/2011 | Hoffmann et al. | |
| 2012/0175345 | A1 | 7/2012 | Tachikawa et al. | |
| 2013/0240495 | A1 * | 9/2013 | Yano | H01H 9/443 219/123 |
| 2014/0159837 | A1 * | 6/2014 | Hiraiwa | H01H 9/443 335/201 |
| 2016/0133404 | A1 | 5/2016 | Zhong et al. | |
| 2022/0336177 | A1 | 10/2022 | Park et al. | |

FOREIGN PATENT DOCUMENTS

| | | | |
|---|---|---|---|
| CN | 107248463 | A | 10/2017 |
| CN | 208027938 | U | 10/2018 |
| EP | 2325860 | A1 | 5/2011 |
| EP | 2551882 | A1 | 1/2013 |
| JP | 2007214034 | A | 8/2007 |
| JP | 2011204479 | A | 10/2011 |
| JP | 2015159131 | A | 9/2015 |
| JP | 2019036431 | A | 3/2019 |
| KR | 101216824 | B1 | 12/2012 |
| KR | 20130018733 | A | 2/2013 |
| KR | 2020150004349 | U | 12/2015 |
| KR | 101696952 | B1 | 1/2017 |
| WO | 2017154578 | A1 | 9/2017 |
| WO | 2019031228 | A1 | 2/2019 |
| WO | 2021149361 | A1 | 7/2021 |

OTHER PUBLICATIONS

International Search Report for related International Application No. PCT/KR2019/010755; report dated Jan. 14, 2021; (5 pages).
Written Opinion for related International Application No. PCT/KR2019/010755; report dated Jan. 14, 2021; (4 pages).
Korean Office Action for related Korean Application No. 10-2019-0083784 dated Apr. 29, 2021; (5 pages).
Korean Notice of Allowance for related Korean Application No. 10-2019-0083784 dated Oct. 23, 2021; (2 pages).
Office Action for related Japanese Application No. 2022-501060; action dated Mar. 7, 2023; (3 pages).
Extended European Search Report for related European Application No. 19936706.1; action dated Jul. 7, 2023; (7 pages).
Office Action for related Japanese Application No. 2022-501060; action dated Sep. 12, 2023; (4 pages).
Office Action for related Chinese application No. 201980098278.8; action dated Dec. 7, 2023; (7 pages).

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

ARC PATH FORMING UNIT AND DIRECT CURRENT RELAY COMPRISING SAME

CROSS-REFERENCE TO RELATED APPLICATIONS

This application is a Divisional application of U.S. application Ser. No. 17/626,003, filed on Jan. 10, 2022, which is the National Stage filing under 35 U.S.C. 371 of International Application No. PCT/KR2019/010755, filed on Aug. 23, 2019, which claims the benefit of earlier filing date of and right of priority to Korean Application No. 10-2019-0083784 filed on Jul. 11, 2019, the contents of which are all hereby incorporated by reference herein in their entirety.

FIELD

The present disclosure relates to an arc path forming unit and a direct current (DC) relay comprising the same, and more particularly, to an arc path forming unit having a structure capable of forming an arc discharge path using electromagnetic force and preventing damage on a DC relay, and a DC relay comprising the same.

BACKGROUND

A direct current (DC) relay is a device that transmits a mechanical driving signal or a current signal using the principle of an electromagnet. The DC relay is also called a magnetic switch and generally classified as an electrical circuit switching device.

A DC relay includes a fixed contact and a movable contact. The fixed contact is electrically connected to an external power supply and a load. The fixed contact and the movable contact may be brought into contact with or spaced apart from each other.

By the contact and separation between the fixed contact and the movable contact, electrical connection or disconnection through the DC relay is achieved. Such movement like the contact or separation is made by a drive unit that applies driving force.

When the fixed contact and the movable contact are separated from each other, an arc is generated between the fixed contact and the movable contact. The arc is a flow of high-pressure and high-temperature current. Accordingly, the generated arc must be rapidly discharged from the DC relay through a preset path.

An arc discharge path is formed by magnets provided in the DC relay. The magnets produce magnetic fields in a space where the fixed contact and the movable contact are in contact with each other. The arc discharge path may be formed by the formed magnetic fields and electromagnetic force generated by a flow of current.

Referring to FIG. 1, a space in which fixed contacts 1100 and movable contacts 1200 provided in a DC relay 1000 according to the prior art are in contact with each other is shown. As described above, permanent magnets 1300 are provided in the space.

The permanent magnets 1300 include a first permanent magnet 1310 disposed at an upper side and a second permanent magnet 1320 disposed at a lower side. A lower side of the first permanent magnet 1310 is magnetized to an N pole, and an upper side of the second permanent magnet 1320 is magnetized to an S pole. Accordingly, a magnetic field is generated in a direction from the upper side to the lower side.

(a) of FIG. 1 illustrates a state in which current flows in through the left fixed contact 1100 and flows out through the right fixed contact 1100. According to the Fleming's left-hand rule, electromagnetic force is formed outward as indicated with a hatched arrow. Accordingly, a generated arc can be discharged to outside along the direction of the electromagnetic force.

On the other hand, (b) of FIG. 1 illustrates a state in which current flows in through the right fixed contact 1100 and flows out through the left fixed contact 1100. According to the Fleming's left-hand rule, electromagnetic force is formed inward as indicated with a hatched arrow. Accordingly, a generated arc moves inward along the direction of the electromagnetic force.

Several members for driving the movable contact 1200 to be moved up and down (in a vertical direction) are provided in a central portion of the DC relay 1000, that is, in a space between the fixed contacts 1100. For example, a shaft, a spring member inserted through the shaft, etc. are provided at the position.

Therefore, when an arc generated as illustrated in (b) of FIG. 1 is moved toward the central portion, there is a risk that various members provided at the position may be damaged by energy of the arc.

In addition, as illustrated in FIG. 1, a direction of electromagnetic force formed inside the related art DC relay 1000 depends on a direction of current flowing through the fixed contacts 1200. Therefore, current preferably flows only in a preset direction, namely, in a direction illustrated in (a) of FIG. 1.

In other words, a user must consider the direction of the current whenever using the DC relay. This may cause inconvenience to the use of the DC relay. In addition, regardless of the user's intention, a situation in which a flowing direction of current applied to the DC relay is changed due to an inexperienced operation or the like cannot be excluded.

In this case, the members disposed in the central portion of the DC relay may be damaged by the generated arc. This may be likely to reduce the lifespan of the DC relay and cause a safety accident.

Korean Registration Application No. 10-1696952 discloses a DC relay. Specifically, a DC relay having a structure capable of preventing movement of a movable contact using a plurality of permanent magnets is disclosed.

The DC relay having the structure can prevent the movement of the movable contact by using the plurality of permanent magnets, but there is a limitation in that any method for controlling a direction of an arc discharge path is not considered.

Korean Registration Application No. 10-1216824 discloses a DC relay. Specifically, a DC relay having a structure capable of preventing arbitrary separation between a movable contact and a fixed contact using a damping magnet is disclosed.

However, the DC relay having the structure merely proposes a method for maintaining a contact state between the movable contact and the fixed contact. That is, there is a limitation in that a method for forming a discharge path for an arc generated when the movable contact and the fixed contact are separated from each other is not introduced.

Korean Registration Application No. 10-1696952 (Jan. 16, 2017)

Korean Registration Application No. 10-1216824 (Dec. 28, 2012)

SUMMARY

The present disclosure describes an arc path forming unit having a structure capable of solving those problems, and a DC relay having the same.

The present disclosure also describes an arc path forming unit having a structure in which a generated arc does not extend toward a central portion, and a DC relay having the same.

The present disclosure further describes an arc path forming unit having a structure capable of forming an arc discharge path toward an outside, regardless of a direction of current applied to a fixed contact, and a DC relay having the same.

The present disclosure further describes an arc path forming unit having a structure capable of minimizing damage on members located at a central portion due to a generated arc, and a DC relay having the same.

The present disclosure further describes an arc path forming unit having a structure capable of sufficiently extinguishing a generated arc while the generated arc moves, and a DC relay having the same.

The present disclosure further describes an arc path forming unit having a structure capable of increasing strength of magnetic fields for forming an arc discharge path, and a DC relay having the same.

The present disclosure further describes an arc path forming unit having a structure capable of effectively discharging a generated arc, and a DC relay having the same.

The present disclosure further describes an arc path forming unit having a structure capable of changing an arc discharge path without an excessive structural change, and a DC relay having the same.

To achieve those aspects of the subject matter described in this application, an arc path forming unit may include a magnet frame having an inner space, and comprising two pairs of surfaces facing each other and surrounding the inner space, and main magnets coupled to any one pair of surfaces extending shorter among the two pairs of surfaces. A fixed contactor and a movable contactor configured to be brought into contact with or separated from the fixed contactor may be accommodated in the inner space. The main magnets coupled to the one pair of surfaces may have facing surfaces, respectively, that face each other, and have a same polarity so as to form a discharge path of an arc generated when the fixed contactor and the movable contactor are separated from each other.

The main magnets of the arc path forming unit may include a first main magnet coupled to any one of the one pair of surfaces, and a second main magnet coupled to another one of the one pair of surfaces and disposed to face the first main magnet.

In the arc path forming unit, facing surfaces of the third main magnet and the second main magnet that face each other may have a same polarity.

In the arc path forming unit, the facing surfaces of the first main magnet and the second main magnet that face each other may have an N pole.

The arc path forming unit may include sub magnets coupled to another pair of surfaces extending longer among the two pairs of surfaces of the magnet frame, and facing surfaces of the sub magnets that face each other may have a same polarity.

In the arc path forming unit, the facing surfaces of the sub magnets that face each other may have a different polarity from the polarity of the facing surfaces of the first main magnet and the second main magnet.

In the arc path forming unit, arc discharge openings may be formed through another pair of surfaces extending shorter among the two pairs of surfaces of the magnet frame such that the inner space communicates with an outside of the magnet frame.

In the arc path forming unit, the first main magnet may be provided in plurality, and the plurality of first main magnets may be spaced apart from each other by a predetermined distance. The second main magnet may be provided in plurality, and the plurality of second main magnets may be spaced apart from each other by a predetermined distance.

In the arc path forming unit, magnetization members may be disposed between the plurality of first main magnets and between the plurality of second main magnets, respectively, such that the plurality of first main magnets and the magnetization member are connected to each other and the plurality of second main magnets and the magnetization member are connected to each other.

To achieve those aspects of the subject matter described in this application, a Direct current (DC) relay may include a fixed contactor, a movable contactor configured to be brought into contact with or separated from the fixed contactor, an arc path forming unit having an inner space for accommodating the fixed contactor and the movable contactor, and configured to produce magnetic fields in the inner space so as to form a discharge path of an arc that is generated when the fixed contactor and the movable contactor are separated from each other, and a frame part configured to accommodate the arc path forming unit. The arc path forming unit may include a magnet frame having an inner space, and comprising two pairs of surfaces facing each other and surrounding the inner space, and main magnets accommodated in the inner space and coupled to any one pair of surfaces extending shorter among the two pairs of surfaces. A fixed contactor and a movable contactor configured to be brought into contact with or separated from the fixed contactor may be accommodated in the inner space. The main magnets coupled to the one pair of surfaces may have facing surfaces, respectively, which face each other and have a same polarity so as to form a discharge path of an arc generated when the fixed contactor and the movable contactor are separated from each other.

In the DC relay, the main magnets may include a first main magnet coupled to any one of the one pair of surfaces, and a second main magnet coupled to another one of the one pair of surfaces and disposed to face the first main magnet. Facing surfaces of the first main magnet and the second main magnet that face each other may have a same polarity.

In the DC relay, the arc path forming unit may include sub magnets coupled to another pair of surfaces extending longer among the two pairs of surfaces of the frame part. Facing surfaces of the sub magnets that face each other may have a same polarity. The facing surfaces of the sub magnets that face each other may have a different polarity from the polarity of the facing surfaces of the first main magnet and the second main magnet.

In the DC relay, the first main magnet may be provided in plurality, and the plurality of first main magnets may be spaced apart from each other by a predetermined distance. The second main magnet may be provided in plurality, and the plurality of second main magnets may be spaced apart from each other by a predetermined distance.

In the DC relay, one of the plurality of first main magnets may be shorter than another first main magnet, and one of the plurality of second main magnets may be shorter than another second main magnet.

In the DC relay, magnetization members may be disposed between the plurality of first main magnets and between the plurality of second main magnets, respectively, such that the plurality of first main magnets and the magnetization member are connected to each other and the plurality of second main magnets and the magnetization member are connected to each other.

In the DC relay, the first main magnet and the second main magnet may include opposing surfaces opposite to the facing surfaces, respectively, and coming in contact with the surfaces of the magnet frame. A main magnetic field may be produced between the first main magnet and the second main magnet and a sub magnetic field may be produced between the facing surfaces and the opposing surfaces of the first main magnet and the second main magnet, such that the sub magnetic field strengthens the main magnetic field.

According to the present disclosure, the following effects can be achieved.

First, main magnets provided at a magnet frame may be arranged to face each other. Sides of the main magnets that face each other may have the same polarity. Accordingly, in a space between the main magnets, magnetic fields may be produced in a direction of repelling or attracting each other.

This can change proceeding directions of the magnetic fields, such that electromagnetic force generated in the vicinity of each fixed contact can be generated in a direction away from a center of the magnet frame. This can result in forming a path (A.P) of a generated arc in a direction away from the center of the magnet frame as well.

The sides of the main magnets that face each other may have the same polarity. Accordingly, in a space between the main magnets, magnetic fields may be produced in a direction of repelling or attracting each other.

As a result, the magnetic field produced near each fixed contact can flow in a direction away from the center of the magnet frame, regardless of a direction of current applied to each fixed contact. The generated arc can also move away from the center of the magnet frame, regardless of the direction of the current applied to each fixed contact.

This can prevent the generated arc from moving toward the center of the magnet frame. Thus, each member disposed at a central portion of a DC relay can be prevented from being damaged due to the arc.

In addition, the generated arc can extend toward an outside of the fixed contacts, which is a wider space, other than toward the center of the magnet frame, which is a narrow space, i.e., toward a space between the fixed contacts. Accordingly, the arc can be sufficiently extinguished while moving toward the wider space.

Main magnetic fields can be produced among a plurality of main magnets in the magnet frame. Sub magnetic fields can also be produced by the main magnets themselves. The sub magnetic fields can strengthen the main magnetic fields.

Accordingly, the main magnetic fields produced by the plurality of main magnets can be strengthened. This can also increase strength of electromagnetic force generated by the main magnetic fields, so that an arc discharge path can be formed effectively.

The magnet frame may also include sub magnets in addition to the main magnets. The sub magnets may be disposed on surfaces of the magnet frame where the main magnets are not located. The sub magnets may produce sub magnetic fields to strengthen the main magnetic fields produced by the main magnets.

Accordingly, the main magnetic fields produced by the main magnets can be strengthened. This can also increase strength of electromagnetic force generated, so that an arc discharge path can be formed effectively.

In addition, the main magnets disposed at the magnet frame can be connected to each other by a magnetization member. Accordingly, the magnetization member may have the same polarity as the main magnets.

Therefore, the magnetic fields can be produced not only by the main magnets but also by the magnetization members. The magnetic fields may be produced in the same direction and thus can be strengthened.

Arc discharge openings may be formed at the magnet frame. The arc discharge openings may be formed through the magnet frame, such that an arc can be discharged through a formed path. The arc discharge openings may be located on extension lines of magnetic fields produced by the main magnets or by the main magnets and the sub magnets.

Accordingly, when a generated arc is moved along the formed discharge path, the arc may move toward the arc discharge openings. The generated arc can thusly be effectively discharged from the magnet frame.

In one implementation, each main magnet may have a different length. That is, the main magnets located on respective sides of the magnet frame may have different lengths.

Accordingly, a direction of a magnetic field produced by each main magnet can change only by changing the length of the main magnet.

DETAILED DESCRIPTION

Hereinafter, an arc path forming unit and a DC relay according to implementations of the present disclosure will be described in detail with reference to the accompanying drawings.

In the following description, descriptions of some components may be omitted to help understanding of the present disclosure.

1. Definition of Terms

It will be understood that when an element is referred to as being “connected with” another element, the element can be connected with the another element or intervening elements may also be present.

In contrast, when an element is referred to as being “directly connected with” another element, there are no intervening elements present.

A singular representation used herein may include a plural representation unless it represents a definitely different meaning from the context.

The term “magnetize” used in the following description refers to a phenomenon in which an object exhibits magnetism in a magnetic field.

The term “polarities” used in the following description refers to different properties belonging to an anode and a cathode of an electrode. In one implementation, the polarities may be classified into an N pole or an S pole.

The term “electric connection” used in the following description means a state in which two or more members are electrically connected.

The term “arc path” used in the following description means a path through which a generated arc is moved or extinguished.

The terms “left”, “right”, “top”, “bottom”, “front” and “rear” used in the following description will be understood based on a coordinate system illustrated in FIG. 2.

2. Description of Configuration of DC Relay 10 According to Implementation

Figure 1:
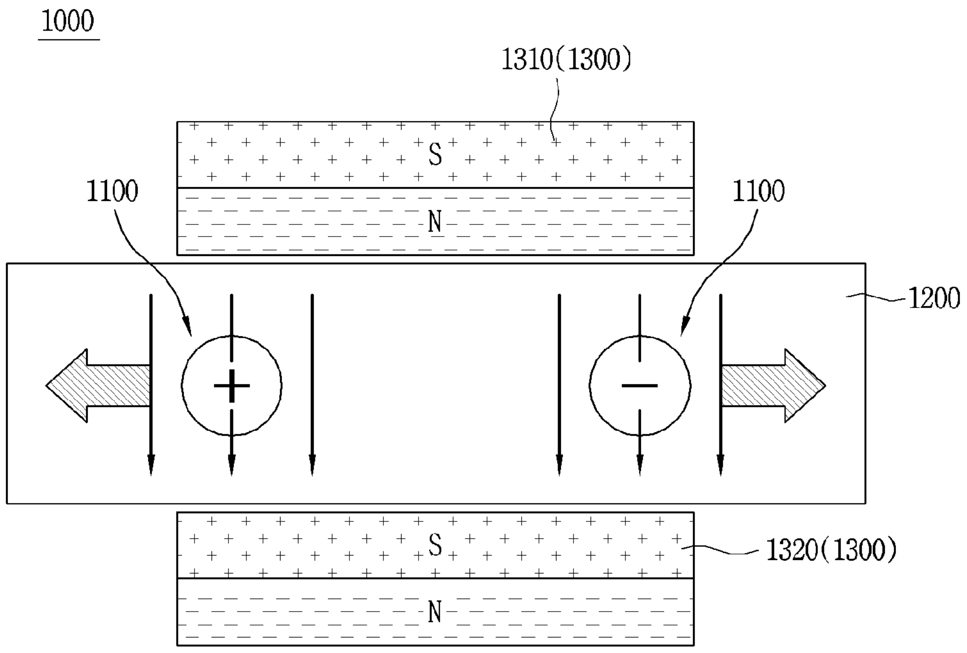
FIG. 1 is a planar view illustrating paths on which an arc is generated in a DC relay according to the related art.
Figure 1:
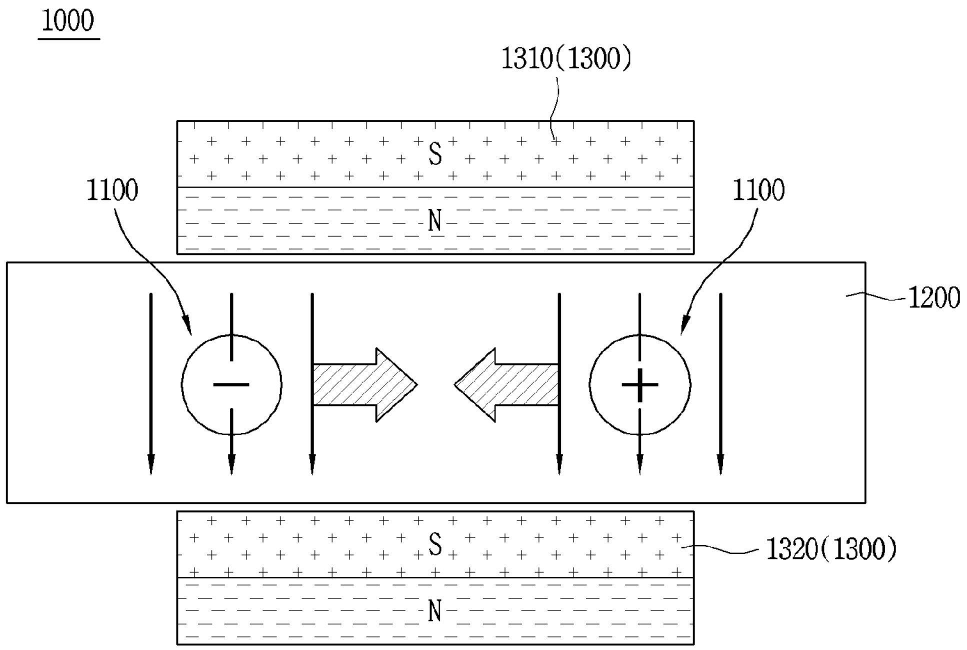
Figure 2:
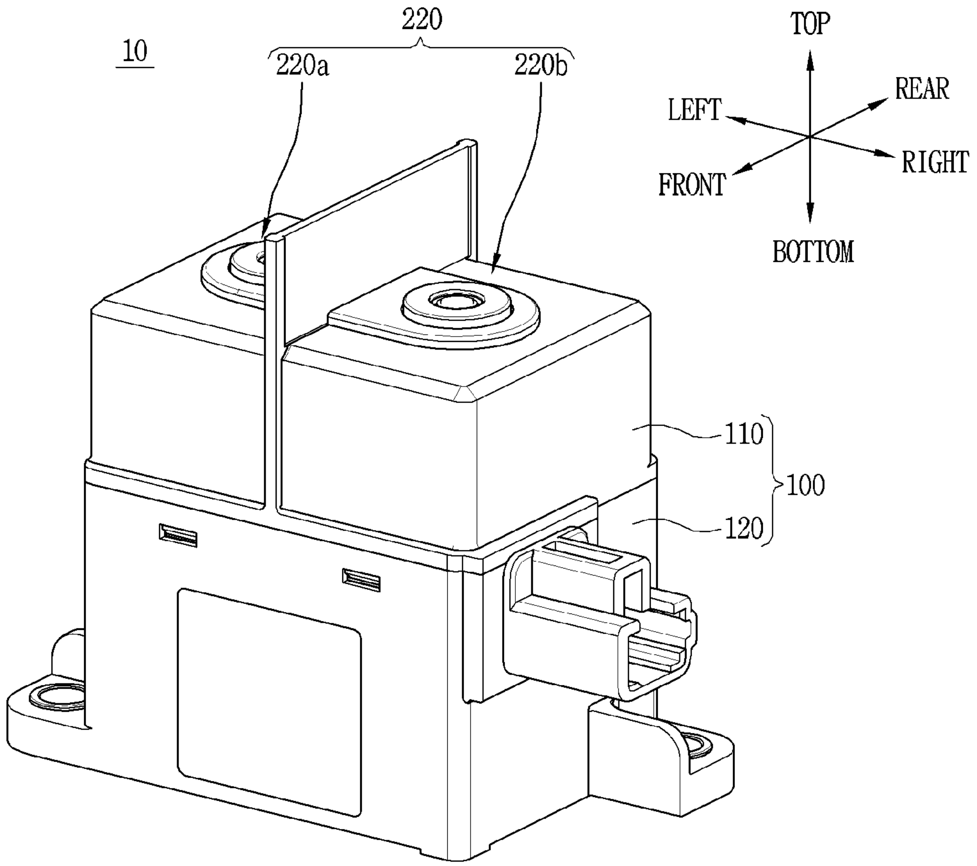
FIG. 2 is a perspective view of a DC relay in accordance with an implementation.
Figure 3:
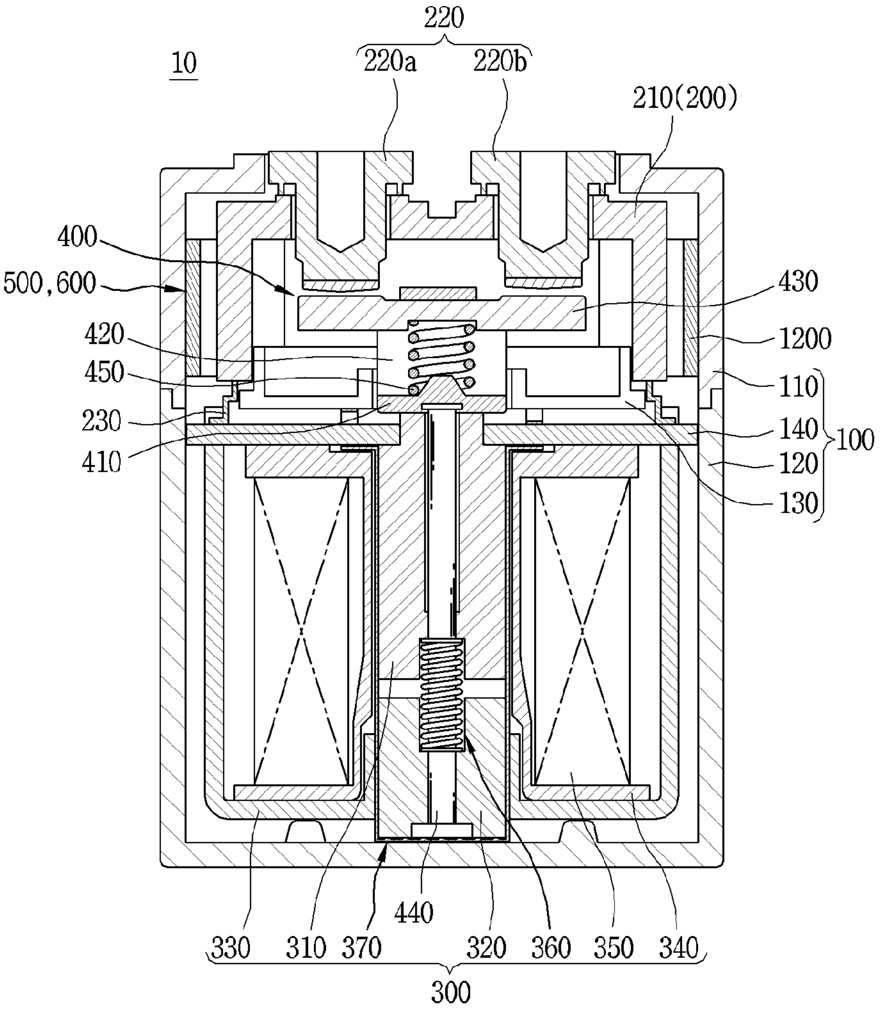
FIG. 3 is a cross-sectional view of the DC relay of FIG. 2.

Referring to FIGS. 2 and 3, a DC relay 10 according to an implementation may include a frame part 100, an opening/closing part 300, a core part 400, and a movable contactor part 400.

Referring to FIGS. 4 to 14, the DC relay 10 may include an arc path forming unit 500, 600. The arc path forming unit 500, 600 may form (define) a discharge path of a generated arc.

Hereinafter, each configuration of the DC relay 10 according to the implementation will be described with reference to the accompanying drawings, and the arc path forming unit 500, 600 will be described as a separate clause.

(1) Description of Frame Part 100

The frame part 100 may define appearance of the DC relay 10. A predetermined space may be defined inside the frame part 100. Various devices for the DC relay 10 to perform functions for applying or cutting off current transmitted from outside may be accommodated in the space.

That is, the frame part 100 may function as a kind of housing.

The frame part 100 may be formed of an insulating material such as synthetic resin. This may prevent an arbitrary electrical connection between inside and outside of the frame part 100.

The frame part 100 may include an upper frame 110, a lower frame 120, an insulating plate 130, and a supporting plate 140.

The upper frame 110 may define an upper side of the frame part 100. A predetermined space may be defined inside the upper frame 110.

The opening/closing part 200 and the movable contactor part 400 may be accommodated in an inner space of the upper frame 110. The arc path forming unit 500, 600 may also be accommodated in the inner space of the upper frame 110.

The upper frame 110 may be coupled to the lower frame 120. The insulating plate 130 and the supporting plate 140 may be disposed in a space between the upper frame 110 and the lower frame 120.

A fixed contactor 220 of the opening/closing part 200 may be located on one side of the upper frame 110, for example, on an upper side of the upper frame 110 in the illustrated implementation. The fixed contactor 220 may be partially exposed to the upper side of the upper frame 110, to be electrically connected to an external power supply or a load.

To this end, a through hole through which the fixed contactor 220 is coupled may be formed at the upper side of the upper frame 110.

The lower frame 120 may define a lower side of the frame part 100. A predetermined space may be defined inside the lower frame 120. The core part 300 may be accommodated in the inner space of the lower frame 120.

The lower frame 120 may be coupled to the upper frame 110. The insulating plate 130 and the supporting plate 140 may be disposed in a space between the lower frame 120 and the upper frame 110.

The insulating plate 130 and the supporting plate 140 may electrically and physically isolate the inner space of the upper frame 110 and the inner space of the lower frame 120 from each other.

The insulating plate 130 may be located between the upper frame 110 and the lower frame 120. The insulating plate 130 may allow the upper frame 110 and the lower frame 120 to be electrically spaced apart from each other. To this end, the frame part 130 may be formed of an insulating material such as synthetic resin.

The insulating plate 130 can prevent arbitrary electrical connection between the opening/closing part 200, the movable contactor part 400, and the arc path forming unit 500, 600 and the core part 300 accommodated in the lower frame 120.

A through hole (not illustrated) may be formed through a central portion of the insulating plate 130. A shaft 440 of the movable contactor part 400 may be coupled through the through hole (not illustrated) to be movable up and down.

The insulating plate 140 may be located on a lower side of the insulating plate 130. The insulating plate 130 may be supported by the supporting plate 140.

The supporting plate 140 may be located between the upper frame 110 and the lower frame 120.

The supporting plate 140 may allow the upper frame 110 and the lower frame 120 to be electrically spaced apart from each other. In addition, the supporting plate 140 may support the insulating plate 130.

For example, the supporting plate 140 may be formed of a magnetic material. In addition, the supporting plate 140 may configure a magnetic circuit together with a yoke 330 of the core part 300. The magnetic circuit may apply driving force to a movable core 320 of the core part 300 so as to move toward a fixed core 310.

A through hole (not illustrated) may be formed through a central portion of the supporting plate 140. The shaft 440 may be coupled through the through hole (not illustrated) to be movable up and down.

Therefore, when the movable core 320 is moved toward or away from the fixed core 310, the shaft 440 and the movable contactor 430 connected to the shaft 440 may also be moved in the same direction.

(2) Description of Opening/Closing Part 200

The opening/closing unit 200 may allow current to be applied to or cut off from the DC relay 10 according to an operation of the core part 300. Specifically, the opening/closing part 200 may allow or block an application of current as the fixed contactor 220 and the movable contactor 430 are brought into contact with or separated from each other.

The opening/closing part 200 may be accommodated in the inner space of the upper frame 110. The opening/closing part 200 may be electrically and physically spaced apart from the core part 300 by the insulating plate 130 and the supporting plate 140.

The opening/closing part 200 may include an arc chamber 210, a fixed contactor 220, and a sealing member 230.

In addition, the arc path forming unit 500, 600 may be disposed outside the arc chamber 210. The arc path forming unit 500, 600 may form a magnetic field for forming an arc path A.P of an arc generated inside the arc chamber 210. A detailed description thereof will be given later.

The arc chamber 210 may be configured to extinguish an arc at its inner space, when the arc is generated as the fixed contactor 220 and the movable contactor 430 are separated from each other. Therefore, the arc chamber 210 may also be referred to as an "arc extinguishing portion".

The arc chamber 210 may hermetically accommodate the fixed contactor 220 and the movable contactor 430. That is, the fixed contactor 220 and the movable contactor 430 may be accommodated in the arc chamber 210. Accordingly, the arc generated when the fixed contactor 220 and the movable contactor 430 are separated from each other may not arbitrarily leak to the outside of the arc chamber 210.

The arc chamber 210 may be filled with extinguishing gas. The extinguishing gas may extinguish the generated arc and may be discharged to the outside of the DC relay 10 through a preset path. To this end, a communication hole (not illustrated) may be formed through a wall surrounding the inner space of the arc chamber 210.

The arc chamber 210 may be formed of an insulating material. In addition, the arc chamber 210 may be formed of a material having high pressure resistance and high heat resistance. This is because the generated arc is a flow of electrons of high-temperature and high-pressure. In one implementation, the arc chamber 210 may be formed of a ceramic material.

A plurality of through holes may be formed through an upper side of the arc chamber 210. The fixed contactor 220 may be coupled through each of the through holes (not illustrated).

In the illustrated implementation, the fixed contactor 220 may be provided by two, namely, a first fixed contactor **220*a* and a second fixed contactor 220*b*. Accordingly, the through hole (not illustrated) formed through the upper side of the arc chamber 210** may also be provided by two.

When the fixed contactors 220 are inserted through the through holes, the through holes may be sealed. That is, the fixed contactor 220 may be hermetically coupled to the through hole. Accordingly, the generated arc cannot be discharged to the outside through the through hole.

A lower side of the arc chamber 210 may be open. That is, the lower side of the arc chamber 210 may be sealed by the insulating plate 130 and the sealing member 230. That is, the lower side of the arc chamber 210 may be sealed by the insulating plate 130 and the sealing member 230.

Accordingly, the arc chamber 210 can be electrically and physically isolated from an outer space of the upper frame 110.

The arc extinguished in the arc chamber 210 may be discharged to the outside of the DC relay 10 through a preset path. In one implementation, the extinguished arc may be discharged to the outside of the arc chamber 210 through the communication hole (not illustrated).

The fixed contactor 220 may be brought into contact with or separated from the movable contactor 430, so as to electrically connect or disconnect the inside and the outside of the DC relay 10.

Specifically, when the fixed contactor 220 is brought into contact with the movable contactor 430, the inside and the outside of the DC relay 10 may be electrically connected. On the other hand, when the fixed contactor 220 is separated from the movable contactor 430, the electrical connection between the inside and the outside of the DC relay 10 may be released.

As the name implies, the fixed contactor 220 does not move. That is, the fixed contactor 220 may be fixedly coupled to the upper frame 110 and the arc chamber 210. Accordingly, the contact and separation between the fixed contactor 220 and the movable contactor 430 can be implemented by the movement of the movable contactor 430.

One end portion of the fixed contactor 220, for example, an upper end portion in the illustrated implementation, may be exposed to the outside of the upper frame 110. A power supply or a load may be electrically connected to the one end portion.

The fixed contactor 220 may be provided in plurality. In the illustrated implementation, the fixed contactor 220 may be provided by two, including a first fixed contactor **220*a* on a left side and a second fixed contactor 220*b*** on a right side.

The first fixed contactor **220*a* may be located to be biased to one side from a center of the movable contactor 430 in a longitudinal direction, namely, to the left in the illustrated implementation. Also, the second fixed contactor 220*b* may be located to be biased to another side from the center of the movable contactor 430** in the longitudinal direction, namely, to the right in the illustrated implementation.

A power supply may be electrically connected to any one of the first fixed contactor **220*a* and the second fixed contactor 220*b*. Also, a load may be electrically connected to another one of the first fixed contactor 220*a* and the second fixed contactor 220*b***.

The DC relay 10 may form an arc path A.P regardless of a direction of the power supply or load connected to the fixed contactor 220. This can be achieved by the arc path forming unit 500, 600, and a detailed description thereof will be described later.

Another end portion of the fixed contactor 220, for example, a lower end portion in the illustrated implementation may extend toward the movable contactor 430.

When the movable contactor 430 is moved toward the fixed contactor 220, namely, upward in the illustrated implementation, the lower end portion of the fixed contactor 220 may be brought into contact with the movable contactor 430. Accordingly, the outside and the inside of the DC relay 10 can be electrically connected.

The lower end portion of the fixed contactor 220 may be located inside the arc chamber 210.

When control power is cut off, the movable contactor 430 may be separated from the fixed contactor 220 by elastic force of a return spring 360.

At this time, as the fixed contactor 220 and the movable contactor 430 are separated from each other, an arc may be generated between the fixed contactor 220 and the movable contactor 430. The generated arc may be extinguished by the extinguishing gas inside the arc chamber 210, and may be discharged to the outside along a path formed by the arc path forming unit 500, 600.

The sealing member 230 may block arbitrary communication between the arc chamber 210 and the inner space of the upper frame 110. The sealing member 230 may seal the lower side of the arc chamber 210 together with the insulating plate 130 and the supporting plate 140.

In detail, an upper side of the sealing member 230 may be coupled to the lower side of the arc chamber 210. A radially inner side of the sealing member 230 may be coupled to an outer circumference of the insulating plate 130, and a lower side of the sealing member 230 may be coupled to the supporting plate 140.

Accordingly, the arc generated in the arc chamber 210 and the arc extinguished by the extinguishing gas may not arbitrarily flow into the inner space of the upper frame 110.

In addition, the sealing member 230 may prevent an inner space of a cylinder 370 from arbitrarily communicating with the inner space of the frame part 100.

(3) Description of Core Part 300

The core part 300 may allow the movable contactor part 400 to move upward as control power is applied. In addition, when the control power is not applied any more, the core part 300 may allow the movable contactor part 400 to move downward again.

As described above, the core part 300 may be electrically connected to an external power supply (not illustrated) to receive control power.

The core part 300 may be located below the opening/closing part 200. The core part 300 may be accommodated in the lower frame 120. The core part 300 and the opening/closing part 200 may be electrically and physically spaced apart from each other by the insulating plate 130 and the supporting plate 140.

The movable contactor part 400 may be located between the core part 300 and the opening/closing part 200. The movable contactor part 400 may be moved by driving force applied by the core part 300. Accordingly, the movable contactor 430 and the fixed contactor 220 can be brought into contact with each other so that the DC relay 10 can be electrically connected.

The core part 300 may include a fixed core 310, a movable core 320, a yoke 330, a bobbin 340, coils 350, a return spring 360, and a cylinder 370.

The fixed core 310 may be magnetized by a magnetic field generated in the coils 350 so as to generate electromagnetic attractive force. The movable core 320 may be moved toward the fixed core 310 (upward in FIG. 3) by the electromagnetic attractive force.

The fixed core 310 may not move. That is, the fixed core 310 may be fixedly coupled to the supporting plate 140 and the cylinder 370.

The movable core 310 may have any shape capable of being magnetized by the magnetic field so as to generate electromagnetic force. In one implementation, the fixed core 310 may be implemented as a permanent magnet or an electromagnet.

The fixed core 310 may be partially accommodated in an upper space inside the cylinder 370. Further, an outer circumference of the fixed core 310 may come in contact with an inner circumference of the cylinder 370.

The fixed core 310 may be located between the supporting plate 140 and the movable core 320.

A through hole (not illustrated) may be formed through a central portion of the fixed core 310. The shaft 440 may be coupled through the through hole (not illustrated) to be movable up and down.

The fixed core 310 may be spaced apart from the movable core 320 by a predetermined distance. Accordingly, a distance by which the movable core 320 can move toward the fixed core 310 may be limited to the predetermined distance. Accordingly, the predetermined distance may be defined as a "moving distance of the movable core 320".

One end portion of the return spring 360, namely, an upper end portion in the illustrated implementation may be brought into contact with the lower side of the fixed core 310. When the movable core 320 is moved upward as the fixed core 310 is magnetized, the return spring 360 may be compressed and store restoring force.

Accordingly, when application of control power is released and the magnetization of the fixed core 310 is terminated, the movable core 320 may be returned to the lower side by the restoring force.

When control power is applied, the movable core 320 may be moved toward the fixed core 310 by the electromagnetic attractive force generated by the fixed core 310.

As the movable core 320 is moved, the shaft 440 coupled to the movable core 320 may be moved toward the fixed core 310, namely, upward in the illustrated implementation. In addition, as the shaft 440 is moved, the movable contactor part 400 coupled to the shaft 440 may be moved upward.

Accordingly, the fixed contactor 220 and the movable contactor 430 may be brought into contact with each other so that the DC relay 10 can be electrically connected to the external power supply and the load.

The movable core 320 may have any shape capable of receiving attractive force by electromagnetic force. In one implementation, the movable core 320 may be formed of a magnetic material or implemented as a permanent magnet or an electromagnet.

The movable core 320 may be accommodated inside the cylinder 370. Also, the movable core 320 may be moved inside the cylinder 370 in the longitudinal direction of the cylinder 370, for example, in the vertical direction in the illustrated implementation.

Specifically, the movable core 320 may move toward the fixed core 310 and away from the fixed core 310.

The movable core 320 may be coupled to the shaft 440. The movable core 320 may move integrally with the shaft 440. When the movable core 320 moves upward or downward, the shaft 440 may also move upward or downward. Accordingly, the movable contactor 430 may also move upward or downward.

The movable core 320 may be located below the fixed core 310. The movable core 320 may be spaced apart from the fixed core 310 by a predetermined distance. As described above, the predetermined distance may be defined as the moving distance of the movable core 320 in the vertical (up/down) direction.

The movable core 320 may extend in the longitudinal direction. A hollow portion extending in the longitudinal direction may be recessed into the movable core 320 by a predetermined distance. The return spring 360 and the shaft 440 coupled through the return spring 360 may be partially accommodated in the hollow portion.

A through hole may be formed through a lower side of the hollow portion in the longitudinal direction. The hollow portion and the through hole may communicate with each other. A lower end portion of the shaft 440 inserted into the hollow portion may proceed (be inserted) toward the through hole.

A space portion may be recessed into a lower end portion of the movable core 320 by a predetermined distance. The space portion may communicate with the through hole. A lower head portion of the shaft 440 may be located in the space portion.

The yoke 330 may configure a magnetic circuit as control power is applied. The magnetic circuit formed by the yoke 330 may control a direction of electromagnetic field generated by the coils 350.

Accordingly, when control power is applied, the coils 350 may generate a magnetic field in a direction in which the movable core 320 moves toward the fixed core 310. The yoke 330 may be formed of a conductive material capable of allowing electrical connection.

The yoke 330 may be accommodated inside the lower frame 120. The yoke 330 may surround the coils 350. The coils 350 may be accommodated in the yoke 330 with being spaced apart from an inner circumferential surface of the yoke 330 by a predetermined distance.

The bobbin 340 may be accommodated inside the yoke 330. That is, the yoke 330, the coils 350, and the bobbin 340 on which the coils 350 are wound may be sequentially disposed in a direction from an outer circumference of the lower frame 120 to a radially inner side.

An upper side of the yoke 330 may come in contact with the supporting plate 140. In addition, the outer circumference of the yoke 330 may come in contact with an inner circumference of the lower frame 120 or may be located to be spaced apart from the inner circumference of the lower frame 120 by a predetermined distance.

The coils 350 may be wound around the bobbin 340. The bobbin 340 may be accommodated inside the yoke 330.

The bobbin 340 may include upper and lower portions formed in a flat shape, and a cylindrical pole portion extending in the longitudinal direction to connect the upper and lower portions. That is, the bobbin 340 may have a bobbin shape.

The upper portion of the bobbin 340 may come in contact with the lower side of the supporting plate 140. The coils 350 may be wound around the pole portion of the bobbin 340. A wound thickness of the coils 350 may be equal to or smaller than a diameter of the upper and lower portions of the bobbin 340.

A hollow portion may be formed through the pole portion of the bobbin 340 extending in the longitudinal direction. The cylinder 370 may be accommodated in the hollow portion. The pole portion of the bobbin 340 may be disposed to have the same central axis as the fixed core 310, the movable core 320, and the shaft 440.

The coils 350 may generate a magnetic field as control power is applied. The fixed core 310 may be magnetized by the electric field generated by the coils 350 and thus an electromagnetic attractive force may be applied to the movable core 320.

The coils 350 may be wound around the bobbin 340. Specifically, the coils 350 may be wound around the pole portion of the bobbin 340 and stacked on a radial outside of the pole portion. The coils 350 may be accommodated inside the yoke 330.

When control power is applied, the coils 350 may generate a magnetic field. In this case, strength or direction of the magnetic field generated by the coils 350 may be controlled by the yoke 330. The fixed core 310 may be magnetized by the electric field generated by the coils 350.

When the fixed core 310 is magnetized, the movable core 320 may receive electromagnetic force, namely, attractive force in a direction toward the fixed core 310. Accordingly, the movable core 320 can be moved toward the fixed core 310, namely, upward in the illustrated implementation.

The return spring 360 may apply restoring force to return the movable core 320 to its original position when control power is not applied any more after the movable core 320 is moved toward the fixed core 310.

The return spring 360 may store restoring force while being compressed as the movable core 320 is moved toward the fixed core 310. At this time, the stored restoring force may preferably be smaller than the electromagnetic attractive force, which is exerted on the movable core 320 as the fixed core 310 is magnetized. This can prevent the movable core 320 from being returned to its original position by the return spring 360 while control power is applied.

When control power is not applied any more, only the restoring force by the return spring 360 may be exerted on the movable core 320. Of course, gravity due to an empty weight of the movable core 320 may also be applied to the movable core 320. Accordingly, the movable core 320 can be moved away from the fixed core 310 to be returned to the original position.

The return spring 360 may be formed in any shape which is deformed to store the restoring force and returned to its original state to transfer the restoring force to outside. In one implementation, the return spring 360 may be configured as a coil spring.

The shaft 440 may be coupled through the return spring 360. The shaft 440 may move up and down regardless of the deformation of the return spring 360 in the coupled state with the return spring 360.

The return spring 360 may be accommodated in the hollow portion recessed in the upper side of the movable core 320. In addition, one end portion of the return spring 360 facing the fixed core 310, namely, an upper end portion in the illustrated implementation may be accommodated in a hollow portion recessed into a lower side of the fixed core 310.

The cylinder 370 may accommodate the fixed core 310, the movable core 320, the return spring 360, and the shaft 440. The movable core 320 and the shaft 440 may move up and down in the cylinder 370.

The cylinder 370 may be located in the hollow portion formed through the pole portion of the bobbin 340. An upper end portion of the cylinder 370 may come in contact with a lower surface of the supporting plate 140.

A side surface of the cylinder 370 may come in contact with an inner circumferential surface of the pole portion of the bobbin 340. An upper opening of the cylinder 370 may be closed by the fixed core 310. A lower surface of the cylinder 370 may come in contact with an inner surface of the lower frame 120.

(4) Description of Movable Contactor Part 400

The movable contactor part 400 may include the movable contactor 430 and components for moving the movable contactor 430. The movable contactor part 400 may allow the DC relay 10 to be electrically connected to an external power supply and a load.

The movable contactor part 400 may be accommodated in the inner space of the upper frame 110. The movable contactor part 400 may be accommodated in the arc chamber 210 to be movable up and down.

The fixed contactor 220 may be located above the movable contactor part 400. The movable contactor part 400 may be accommodated in the arc chamber 210 to be movable in a direction toward the fixed contactor 220 and a direction away from the fixed contactor 220.

The core part 300 may be located below the movable contactor part 400. The movement of the movable contactor part 400 may be achieved by the movement of the movable core 320.

The movable contactor part 400 may include a housing 410, a cover 420, a movable contactor 430, a shaft 440, and an elastic portion 450.

The housing 410 may accommodate the movable contactor 430 and the elastic portion 450 elastically supporting the movable contactor 430.

Figure 5:
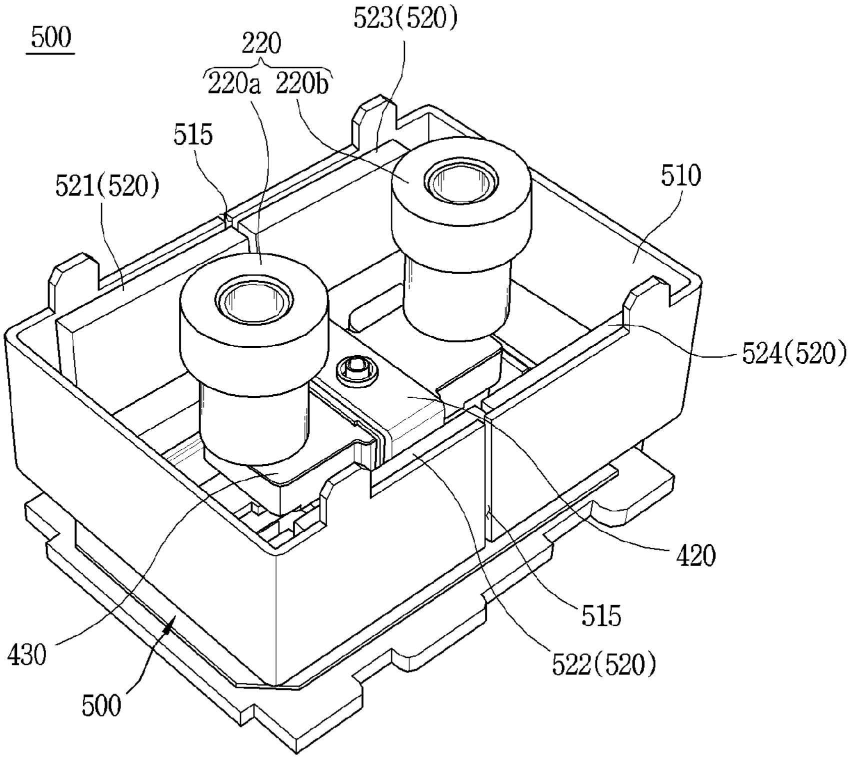
FIG. 5 is a perspective view illustrating a magnet assembly in accordance with one implementation.

In the illustrated implementation, the housing 410 may be formed such that one side and another side opposite to the one side are open (see FIG. 5). The movable contactor 430 may be inserted through the openings.

The unopened side of the housing 410 may surround the accommodated movable contactor 430.

The cover 420 may be provided on a top of the housing 410. The cover 420 may cover an upper surface of the movable contactor 430 accommodated in the housing 410.

The housing 410 and the cover 420 may preferably be formed of an insulating material to prevent unexpected electrical connection. In one implementation, the housing 410 and the cover 420 may be formed of a synthetic resin or the like.

A lower side of the housing 410 may be connected to the shaft 440. When the movable core 320 connected to the shaft 440 is moved upward or downward, the housing 410 and the movable contactor 430 accommodated in the housing 410 may also be moved upward or downward.

The housing 410 and the cover 420 may be coupled by arbitrary members. In one implementation, the housing 410 and the cover 420 may be coupled by coupling members (not illustrated) such as a bolt and a nut.

The movable contactor 430 may come in contact with the fixed contactor 220 when control power is applied, so that the DC relay 10 can be electrically connected to an external power supply and a load. When control power is not applied, the movable contactor 430 may be separated from the fixed contactor 220 such that the DC relay 10 can be electrically disconnected from the external power supply and the load.

The movable contactor 430 may be located adjacent to the fixed contactor 220.

An upper side of the movable contactor 430 may be covered by the cover 420. In one implementation, a portion of the upper surface of the movable contactor 430 may be in contact with a lower surface of the cover 420.

A lower side of the movable contactor 430 may be elastically supported by the elastic portion 450. In order to prevent the movable contactor 430 from being arbitrarily moved downward, the elastic portion 450 may elastically support the movable contactor 430 in a compressed state by a predetermined distance.

The movable contactor 430 may extend in the longitudinal direction, namely, in left and right directions in the illustrated implementation. That is, a length of the movable contactor 430 may be longer than its width. Accordingly, both end portions of the movable contactor 430 in the longitudinal direction, accommodated in the housing 410, may be exposed to the outside of the housing 410.

Contact protrusions may protrude upward from the both end portions by predetermined distances. The fixed contactor 220 may be brought into contact with the contact protrusions.

The contact protrusions may be formed at positions corresponding to the fixed contactors 220*a* and 220*b*, respectively. Accordingly, the moving distance of the movable contactor 430 can be reduced and contact reliability between the fixed contactor 220 and the movable contactor 430 can be improved.

The width of the movable contactor 430 may be the same as a spaced distance between the side surfaces of the housing 410. That is, when the movable contactor 430 is accommodated in the housing 410, both side surfaces of the movable contactor 430 in a widthwise direction may be brought into contact with inner sides of the side surfaces of the housing 410.

Accordingly, the state where the movable contactor 430 is accommodated in the housing 410 can be stably maintained.

The shaft 440 may transmit driving force, which is generated in response to the operation of the core part 300, to the movable contactor part 400. Specifically, the shaft 440 may be connected to the movable core 320 and the movable contactor 430. When the movable is moved upward or downward, the movable contactor 430 may also be moved upward or downward by the shaft 440.

The shaft 440 may extend in the longitudinal direction, namely, in the up and down (vertical) direction in the illustrated implementation.

The lower end portion of the shaft 440 may be inserted into the movable core 320. When the movable core 320 is moved up and down, the shaft 440 may also be moved up and down together with the movable core 320.

A body portion of the shaft 440 may be coupled through the fixed core 310 to be movable up and down. The return spring 360 may be coupled through the body portion of the shaft 440.

Specifically, an upper end portion of the shaft 440 may be coupled to the housing 410. When the movable core 320 is moved, the shaft 440 and the housing 410 may also be moved.

The upper and lower end portions of the shaft 440 may have a larger diameter than the body portion of the shaft. Accordingly, the coupled state of the shaft 440 to the housing 410 and the movable core 320 can be stably maintained.

The elastic portion 450 may elastically support the movable contactor 430. When the movable contactor 430 is brought into contact with the fixed contactor 220, the movable contactor 430 may tend to be separated from the fixed contactor 220 due to electromagnetic repulsive force.

At this time, the elastic portion 450 can elastically support the movable contactor 430 to prevent the movable contactor 430 from being arbitrarily separated from the fixed contactor 220.

The elastic portion 450 may be arbitrarily configured to be capable of storing restoring force by being deformed and applying the stored restoring force to another member. In one implementation, the elastic portion 450 may be configured as a coil spring.

One end portion of the elastic portion 450 facing the movable contactor 430 may come in contact with the lower side of the movable contactor 430. In addition, another end portion opposite to the one end portion may come in contact with the upper side of the housing 410.

The elastic portion 450 may elastically support the movable contactor 430 in a state of storing the restoring force by being compressed by a predetermined length. Accordingly, even if electromagnetic repulsive force is generated between the movable contactor 430 and the fixed contactor 220, the movable contactor 430 cannot be arbitrarily moved.

A protrusion (not illustrated) inserted into the elastic portion 450 may protrude from the lower side of the movable contactor 430 to enable stable coupling of the elastic portion 450. Similarly, a protrusion (not illustrated) inserted into the elastic portion 450 may also protrude from the upper side of the housing 410.

3. Description of Arc Path Forming Unit 500 According to One Implementation

Referring to FIG. 3, the DC relay 10 may include an arc path forming unit 500. The arc path forming unit 500 may form a path through which an arc generated inside the arc chamber 210 is moved or extinguished during movement.

The arc path forming unit 500 may include a main magnet (or main magnet unit) 520 and a sub magnet (or sub magnet unit) 540. The main magnet 520 and the sub magnet 540 may generate magnetic fields therebetween or by themselves.

In a state in which the magnetic fields are generated, when the fixed contactor 220 and the movable contactor 430 are in contact with each other, electromagnetic force may be generated accordingly. A direction of the electromagnetic force may be determined by the Fleming's left-hand rule.

The arc path forming unit 500 may control the direction of the electromagnetic force by using polarities and an arrangement method of the main magnet 520 and the sub magnet 540.

Accordingly, a generated arc may not move toward a central portion C of a space portion 516 of a magnet frame 510. This can prevent damage on components of the DC relay 10 disposed at the central portion C.

The arc path forming unit 500 may be located in the inner space of the upper frame 110. Also, the arc path forming unit 500 may surround the arc chamber 210 at the outside of the arc chamber 210.

Hereinafter, the arc path forming unit 500 according to one implementation will be described in detail, with reference to FIGS. 4 to 9.

The arc path forming unit 500 according to the illustrated implementation may include a magnet frame 510, a main magnet 520, a magnetization member 530, and a sub magnet 540.

(1) Description of Magnet Frame 510

The magnet frame 510 may define an outside of the arc path forming unit 500. The magnet frame 510 may surround the arc chamber 210. That is, the magnet frame 510 may be located outside the arc chamber 210.

In the illustrated implementation, the magnet frame 510 may have a rectangular cross-section. That is, the magnet frame 510 may be formed such that a length in the lengthwise (longitudinal) direction, for example, in the left and right direction in the illustrated implementation is longer than a length in a widthwise direction, for example, in the front and rear direction in the illustrated implementation.

The shape of the magnet frame 510 may vary depending on shapes of the upper frame 110 and the arc chamber 210.

A space portion 516 defined in the magnet frame 510 may communicate with the arc chamber 210. To this end, as described above, a through hole (not illustrated) may be formed through a wall portion of the arc chamber 210.

The magnet frame 510 may be formed of an insulating material through which electricity or magnetic force does not pass. This can prevent an occurrence of magnetic interference among the main magnet 520, the magnetization member 530, and the sub magnet 540. In one implementation, the magnet frame 510 may be formed of a synthetic resin or ceramic.

Figure 6:
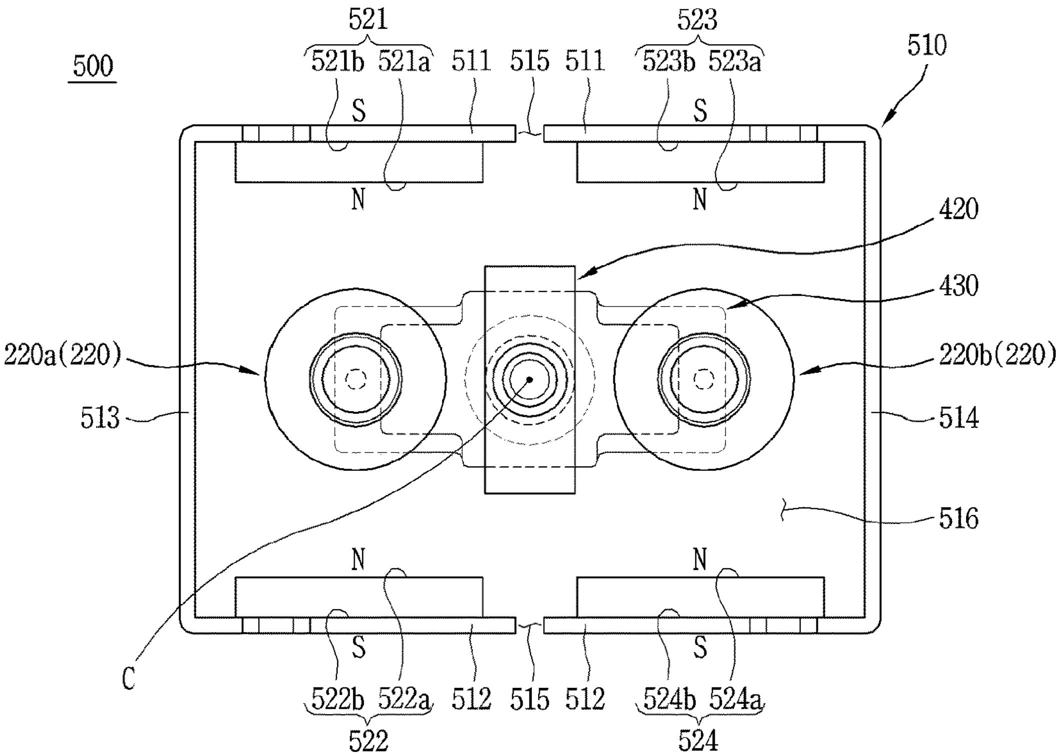
FIG. 6 is a planar view of the magnet assembly of FIG. 5.
Figure 6:
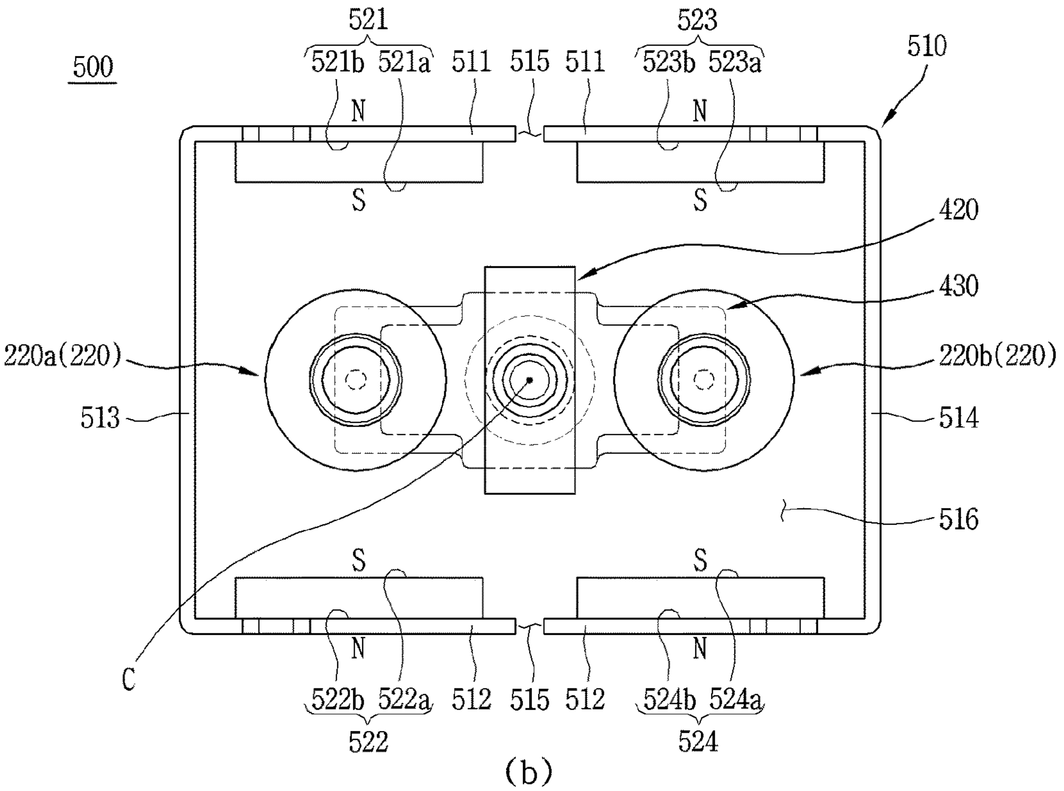

Referring to FIG. 6, the magnet frame 510 may include a first surface 511, a second surface 512, a third surface 513, a fourth surface 514, an arc discharge opening 515, and a space portion 516.

The first surface 511, the second surface 512, the third surface 513, and the fourth surface 514 may define an outer circumferential surface of the magnet frame 510. That is, the first surface 511, the second surface 512, the third surface 513, and the fourth surface 514 may serve as walls of the magnet frame 510.

Outer sides of the first surface 511, the second surface 512, the third surface 513, and the fourth surface 514 may be in contact with or fixedly coupled to an inner surface of the upper frame 110. In addition, the main magnet 520, the magnetization member 530, and the sub magnet 540 may be disposed at inner sides of the first surface 511, the second surface 512, the third surface 513, and the fourth surface 514.

In the illustrated implementation, the first surface 511 may define a rear surface. The second surface 512 may define a front surface and face the first surface 511.

Also, the third surface 513 may define a left surface. The fourth surface 514 may define a right surface and face the third surface 513.

The first surface 511 may continuously be formed with the third surface 513 and the fourth surface 514. The first surface 511 may be coupled to the third surface 513 and the fourth surface 514 at predetermined angles. In one implementation, the predetermined angle may be a right angle.

The second surface 512 may continuously be formed with the third surface 513 and the fourth surface 514. The second surface 512 may be coupled to the third surface 513 and the fourth surface 514 at predetermined angles. In one implementation, the predetermined angle may be a right angle.

Each corner at which the first surface 511 to the fourth surface 514 are connected to one another may be chamfered.

A first main magnet 521 and a third main magnet 523 may be coupled to the inner side of the first surface 511, namely, one side of the first surface 511 facing the second surface 512. In addition, a second main magnet 522 and a fourth main magnet 524 may be coupled to the inner side of the second surface 512, namely, one side of the second surface 512 facing the first surface 511.

A first magnetization member 531 may be coupled to the one side of the first surface 511. In addition, a second magnetization member 532 may be coupled to the one side of the second surface 512.

A first sub magnet 541 may be coupled to the inner side of the third surface 513, namely, one side of the third surface 513 facing the fourth surface 514. Also, a second sub magnet 542 may be coupled to the inner side of the fourth surface 514, namely, one side of the fourth surface 514 facing the third surface 513.

Coupling members (not illustrated) may be provided for coupling the respective surfaces 511, 512, 513, and 514 with the main magnet 520, the magnetization member 530, and the sub magnet 540.

An arc discharge opening 515 may be formed through at least one of the first surface 511 and the second surface 512.

The arc discharge opening 515 may be a passage through which an arc extinguished and discharged from the arc chamber flows into the inner space of the upper frame 110. The arc discharge opening 515 may allow the space portion 516 of the magnet frame 510 to communicate with the space of the upper frame 110.

In the illustrated implementation, the arc discharge opening 515 may be formed through each of the first surface 511 and the second surface 512.

The arc discharge opening 515 formed through the first surface 511 may communicate with a space defined by a predetermined spaced distance between the first main magnet 521 and the third main magnet 523. That is, the arc discharge opening 515 formed through the first surface 511 may be defined between the first main magnet 521 and the third main magnet 523.

The arc discharge opening 515 formed through the second surface 512 may communicate with a space defined by a predetermined spaced distance between the second main magnet 522 and the fourth main magnet 524. That is, the arc discharge opening 515 formed through the second surface 512 may be defined between the second main magnet 522 and the fourth main magnet 524.

A space surrounded by the first surface 511 to the fourth surface 514 may be defined as the space portion 516.

Figure 4:
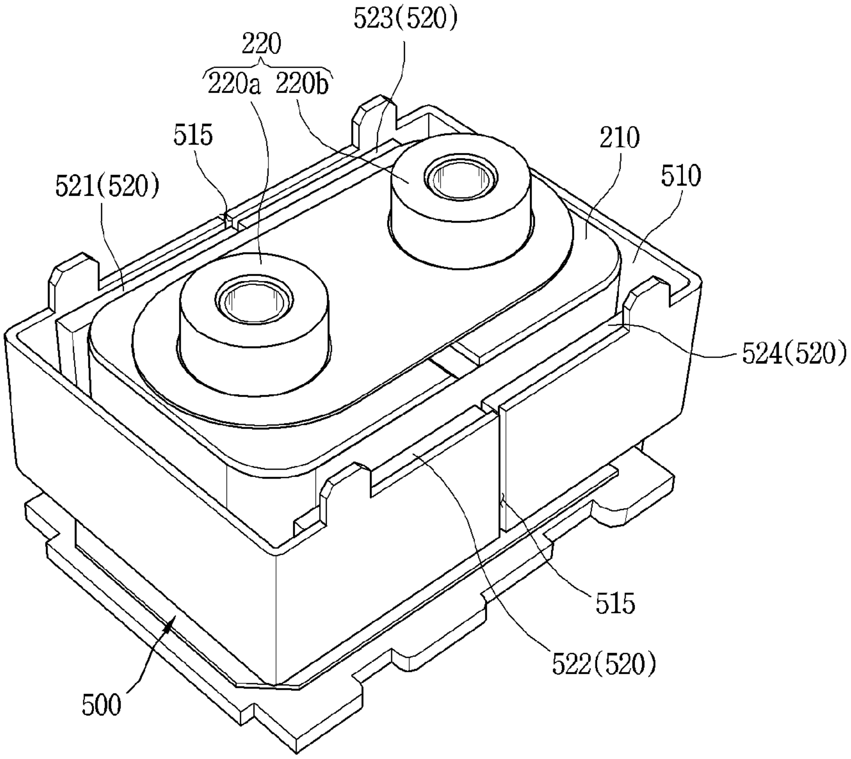
FIG. 4 is an exploded perspective view illustrating a magnet assembly disposed in the DC relay of FIG. 2.

The fixed contactor 220 and the movable contactor 430 may be accommodated in the space portion 516. In addition, as illustrated in FIG. 4, the arc chamber 210 may be accommodated in the space portion 516.

In the space portion 516, the movable contactor 430 may move toward the fixed contactor 220 or away from the fixed contactor 220.

In addition, a path A.P of an arc generated in the arc chamber 210 may be formed in the space portion 516. This can be achieved by magnetic fields generated by the main magnet 520, the magnetization member 530, and the sub magnet 540.

A central portion of the space portion 516 may be defined as a central portion C. A same straight line distance may be set from each corner where the first to fourth surfaces 511, 512, 513, and 514 are connected to the central portion C.

The central portion C may be located between the first fixed contactor **220*a* and the second fixed contactor 220*b*. In addition, a center of the movable contactor part 400 may be located perpendicularly below the central portion C. That is, centers of the housing 410, the cover 420, the movable contactor 430, the shaft 440, and the elastic portion 450** may be located perpendicularly below the central portion C.

Accordingly, when a generated arc is moved toward the central portion C, those components may be damaged. To prevent such damage, the arc path forming unit 500 may include the main magnet 520, the magnetization member 530, and the sub magnet 540.

(2) Description of Main Magnet 520

The main magnet 520 may generate a magnetic field inside the space portion 516. The magnetic field may be generated between the neighboring main magnets 521 or by each main magnet 520.

The main magnet 520 may be configured to have magnetism by itself or to obtain magnetism by an application of current or the like. In one implementation, the main magnet 520 may be implemented as a permanent magnet or an electromagnet.

The main magnet 520 may be coupled to the magnet frame 510. Coupling members (not illustrated) may be provided for the coupling between the main magnet 520 and the magnet frame 510.

In the illustrated implementation, the main magnet 520 may extend in the longitudinal direction and have a rectangular parallelepiped shape having a rectangular cross section. The main magnet 520 may be provided in any shape capable of producing the magnetic field.

The main magnet 520 may be provided in plurality. In the illustrated implementation, four main magnets 520 may be provided, but the number may vary.

The plurality of main magnets 520 may include a first main magnet 521, a second main magnet 522, a third main magnet 523, and a fourth main magnet 524.

The first main magnet 521 may produce a magnetic field together with the second main magnet 522 or the fourth main magnet 524. In addition, the first main magnet 521 may generate a magnetic field by itself.

In the illustrated implementation, the first main magnet 521 may be located to be biased to a left side on the inner side of the first surface 511. The first main magnet 521 may be spaced apart from the third main magnet 523 by a predetermined distance in the longitudinal direction, for example, in the left and right direction in the illustrated implementation.

A space defined by the predetermined distance between the first main magnet 521 and the third main magnet 523 may communicate with the arc discharge opening 515 formed through the first surface 511.

The first main magnet 521 may be disposed to face the second main magnet 522. Specifically, the first main magnet 521 may be disposed to face the second main magnet 522 with the space portion 516 therebetween.

The first main magnet 521 may include a first facing surface **521*a* and a first opposing surface 521*b***.

The first facing surface **521*a* may be defined as one side surface of the first main magnet 521 that faces the space portion 516. In other words, the first facing surface 521*a* may be defined as one side surface of the first main magnet 521 that faces the second main magnet 522**.

The first opposing surface **521*b* may be defined as another side surface of the first main magnet 521 that faces the first surface 511. In other words, the first opposing surface 521*b* may be defined as one side surface of the first main magnet 521 opposite to the first facing surface 521*a***.

The first facing surface **521*a* and the first opposing surface 521*b* may have different polarities. That is, the first facing surface 521*a* may be magnetized to one of an N pole and an S pole, and the first opposing surface 521*b*** may be magnetized to another one of the N pole and the S pole.

Accordingly, a magnetic field propagating from one of the first facing surface **521*a* and the first opposing surface 521*b* to the other may be produced by the first main magnet 521** itself.

The polarity of the first facing surface 521*a* may be the same as a polarity of the second facing surface 522*a* of the second main magnet 522. Also, the polarity of the first facing surface 521*a* may be the same as a polarity of a fourth facing surface 524*a* of the fourth main magnet 524.

Accordingly, the first main magnet 521, the second main magnet 522, and the fourth main magnet 524 may produce repelling magnetic fields in the space portion 516.

The second main magnet 522 may produce a magnetic field together with the first main magnet 521 or the third main magnet 523. In addition, the second main magnet 522 may generate a magnetic field by itself.

In the illustrated implementation, the second main magnet 522 may be located to be biased to the left side on the inner side of the second surface 512. The second main magnet 522 may be spaced apart from the fourth main magnet 524 by a predetermined distance in the longitudinal direction, for example, in the left and right direction in the illustrated implementation.

A space defined by the predetermined distance between the second main magnet 522 and the fourth main magnet 524 may communicate with the arc discharge opening 515 formed through the second surface 512.

The second main magnet 522 may be disposed to face the first main magnet 521. Specifically, the second main magnet 522 may be disposed to face the first main magnet 521 with the space portion 516 therebetween.

The second main magnet 522 may include a second facing surface 522*a* and a second opposing surface 522*b*.

The second facing surface 522*a* may be defined as one side surface of the second main magnet 522 that faces the space portion 516. In other words, the second facing surface 522*a* may be defined as one side surface of the second main magnet 522 that faces the first main magnet 521.

The second opposing surface 522*b* may be defined as another side surface of the second main magnet 522 that faces the second surface 512. In other words, the second opposing surface 522*b* may be defined as one side surface of the second main magnet 522 opposite to the second facing surface 522*a*.

The second facing surface 522*a* and the second opposing surface 522*b* may have different polarities. That is, the second facing surface 522*a* may be magnetized to one of the N pole and the S pole, and the second opposing surface 522*b* may be magnetized to another one of the N pole and the S pole.

Accordingly, a magnetic field propagating from one of the second facing surface 522*a* and the second opposing surface 522*b* to the other may be produced by the second main magnet 522 itself.

The polarity of the second facing surface 522*a* may be the same as the polarity of the first facing surface 521*a* of the first main magnet 521. Also, the polarity of the second facing surface 522*a* may be the same as a polarity of a third facing surface 523*a* of the third main magnet 523.

Accordingly, the second main magnet 522, the first main magnet 521, and the third main magnet 523 may produce repelling magnetic fields in the space portion 516.

The third main magnet 523 may produce a magnetic field together with the second main magnet 522 or the fourth main magnet 524. In addition, the third main magnet 523 may generate a magnetic field by itself.

In the illustrated implementation, the third main magnet 523 may be located to be biased to a right side on the inner side of the first surface 511. The third main magnet 523 may be spaced apart from the first main magnet 521 by a predetermined distance in the longitudinal direction, for example, in the left and right direction in the illustrated implementation.

A space defined by the predetermined distance between the third main magnet 523 and the first main magnet 521 may communicate with the arc discharge opening 515 formed through the first surface 511.

The third main magnet 523 may be disposed to face the fourth main magnet 524. Specifically, the third main magnet 523 may be disposed to face the fourth main magnet 524 with the space portion 516 therebetween.

The third main magnet 523 may include a third facing surface 523*a* and a third opposing surface 523*b*.

The third facing surface 523*a* may be defined as one side surface of the third main magnet 523 that faces the space portion 516. In other words, the third facing surface 523*a* may be defined as one side surface of the third main magnet 523 that faces the fourth main magnet 524.

The third opposing surface 523*b* may be defined as another side surface of the third main magnet 523 that faces the first surface 511. In other words, the third opposing surface 523*b* may be defined as one side surface of the third main magnet 523 opposite to the third facing surface 523*a*.

The third facing surface 523*a* and the third opposing surface 523*b* may have different polarities. That is, the third facing surface 523*a* may be magnetized to one of the N pole and the S pole, and the third opposing surface 523*b* may be magnetized to another one of the N pole and the S pole.

Accordingly, a magnetic field propagating from one of the third facing surface 523*a* and the third opposing surface 523*b* to the other may be produced by the third main magnet 523 itself.

The polarity of the third facing surface 523*a* may be the same as a polarity of a fourth facing surface 524*a* of the fourth main magnet 524. Also, the polarity of the third facing surface 523*a* may be the same as the polarity of the second facing surface 522*a* of the second main magnet 522.

Accordingly, the third main magnet 523, the second main magnet 522, and the fourth main magnet 524 may produce repelling magnetic fields in the space portion 516.

The fourth main magnet 524 may produce a magnetic field together with the first main magnet 521 or the third main magnet 523. In addition, the fourth main magnet 524 may generate a magnetic field by itself.

In the illustrated implementation, the fourth main magnet 524 may be located to be biased to the right side on the inner side of the second surface 512. The fourth main magnet 524 may be spaced apart from the second main magnet 522 by a predetermined distance in the longitudinal direction, for example, in the left and right direction in the illustrated implementation.

A space defined by the predetermined distance between the fourth main magnet 524 and the second main magnet 522 may communicate with the arc discharge opening 515 formed through the second surface 512.

The fourth main magnet 524 may be disposed to face the third main magnet 523. Specifically, the fourth main magnet 524 may be disposed to face the third main magnet 523 with the space portion 516 therebetween.

The fourth main magnet 524 may include a fourth facing surface 524*a* and a fourth opposing surface 524*b*.

The fourth facing surface 524*a* may be defined as one side surface of the fourth main magnet 524 that faces the space portion 516. In other words, the fourth facing surface 524*a* may be defined as one side surface of the fourth main magnet 524 that faces the third main magnet 523.

The fourth opposing surface 524*b* may be defined as another side surface of the fourth main magnet 524 that faces the second surface 512. In other words, the fourth opposing surface 524*b* may be defined as one side surface of the fourth main magnet 524 opposite to the fourth facing surface 524*a*.

The fourth facing surface 524*a* and the fourth opposing surface 524*b* may have different polarities. That is, the fourth facing surface 524*a* may be magnetized to one of the N pole and the S pole, and the fourth opposing surface 524*b* may be magnetized to another one of the N pole and the S pole.

Accordingly, a magnetic field propagating from one of the fourth facing surface 524*a* and the fourth opposing surface 524*b* to the other may be produced by the fourth main magnet 524 itself.

The polarity of the fourth facing surface 524*a* may be the same as the polarity of the third facing surface 523*a* of the third main magnet 523. Also, the polarity of the fourth facing surface 524*a* may be the same as the polarity of the first facing surface 521*a* of the first main magnet 521.

Accordingly, the fourth main magnet 524, the first main magnet 521, and the third main magnet 523 may produce repelling magnetic fields in the space portion 516.

That is, the first to fourth facing surfaces 521*a*, 522*a*, 523*a*, and 524*a* at which the first to fourth main magnets 521, 522, 523, and 524 face one another may have the same polarity.

Accordingly, the first to fourth main magnets 521, 522, 523, and 524 may produce repelling magnetic fields in the space portion 516.

Figure 7:
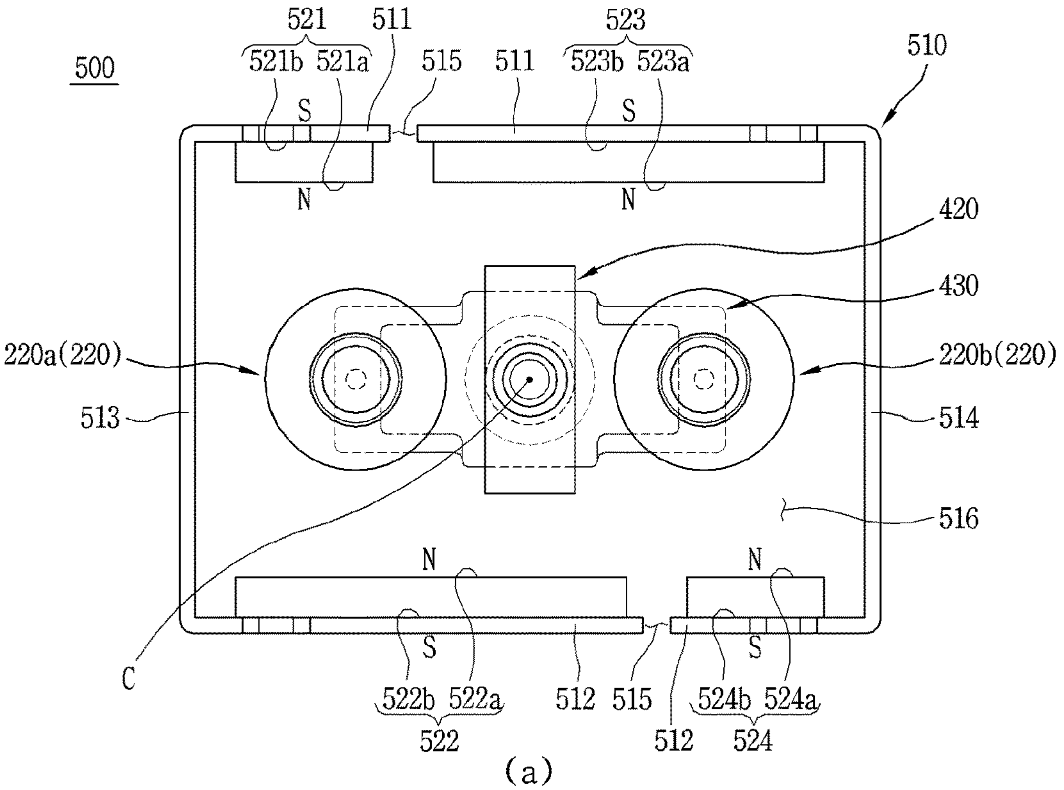
FIG. 7 is a planar view illustrating a magnet assembly in accordance with a modified example of the implementation of FIG. 5.
Figure 7:
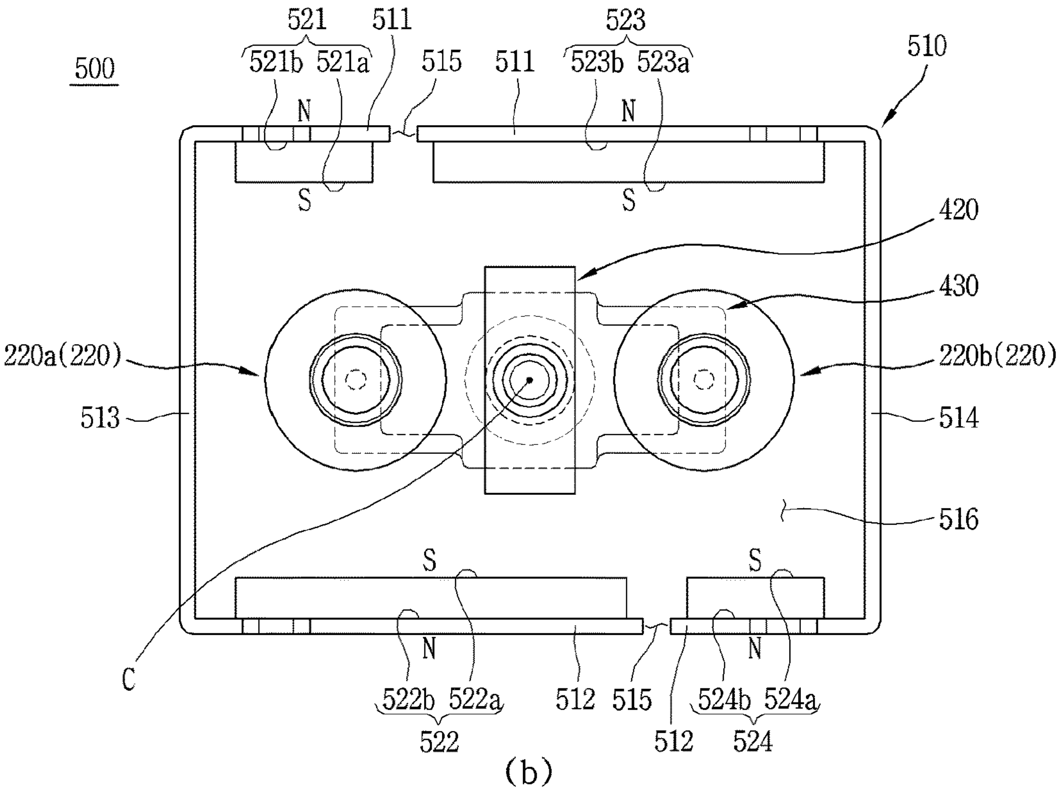

Referring to FIG. 7, extension lengths of the main magnets 520 may be different from one another.

In the illustrated implementation, the first main magnet 521 and the fourth main magnet 524 may have short lengths and the second main magnet 522 and the third main magnet 523 may extend long in length.

The arc discharge opening 515 formed through the first surface 511 may be biased to the left side to communicate with the space between the first main magnet 521 and the third main magnet 523. Similarly, the arc discharge opening 515 formed through the second surface 512 may be biased to the right side to communicate with the space between the second main magnet 522 and the fourth main magnet 524.

Although not illustrated, the first main magnet 521 and the fourth main magnet 524 may extend long in length and the second main magnet 522 and the third main magnet 523 may have short lengths. It will be understood that the positions of the arc discharge openings 515 formed at the first surface 511 and the second surface 512 may be changed correspondingly.

With the configuration, the magnetic fields produced by the main magnets 520 facing each other may be biased toward either the left or the right. Even in this case, the magnetic fields can be produced in the space portion 516 by the respective main magnets 521, 522, 523, and 524 in a repelling direction.

This can prevent a generated arc from moving toward the central portion C. Also, the degree of freedom of designing the DC relay 10 can be improved.

(3) Description of Magnetization Member 530

Figure 8:
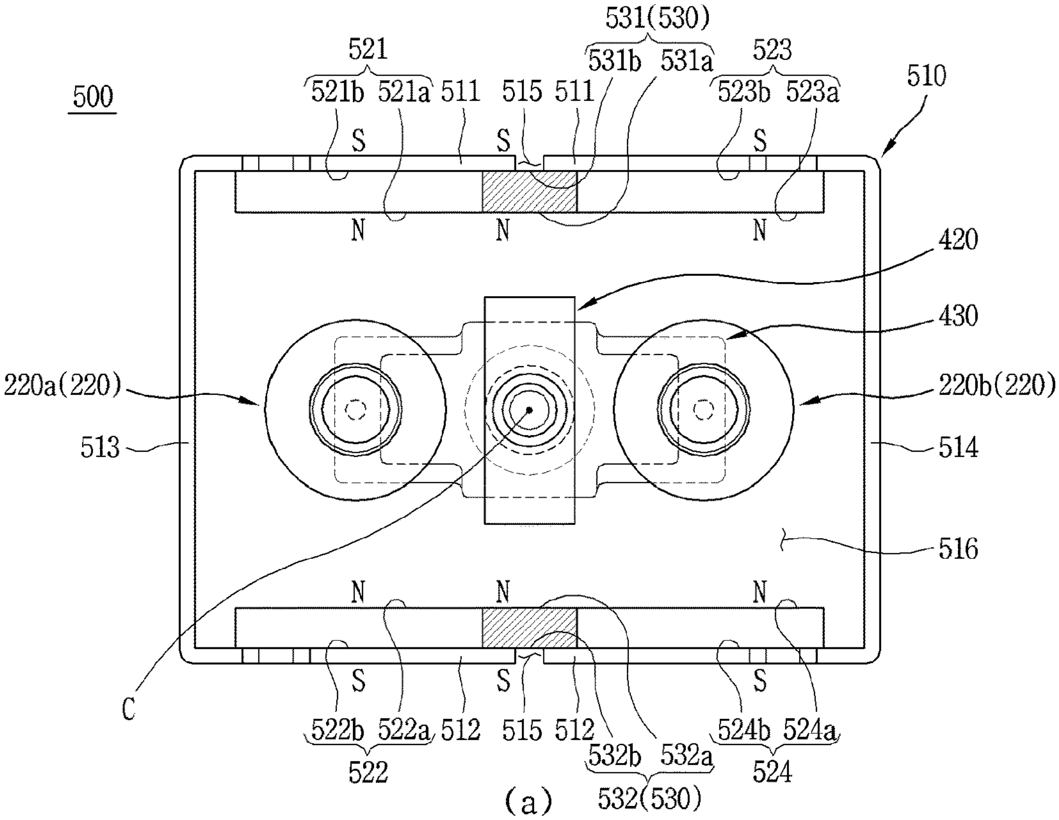
FIG. 8 is a planar view illustrating a magnet assembly in accordance with a modified example of the implementation of FIG. 5.
Figure 8:
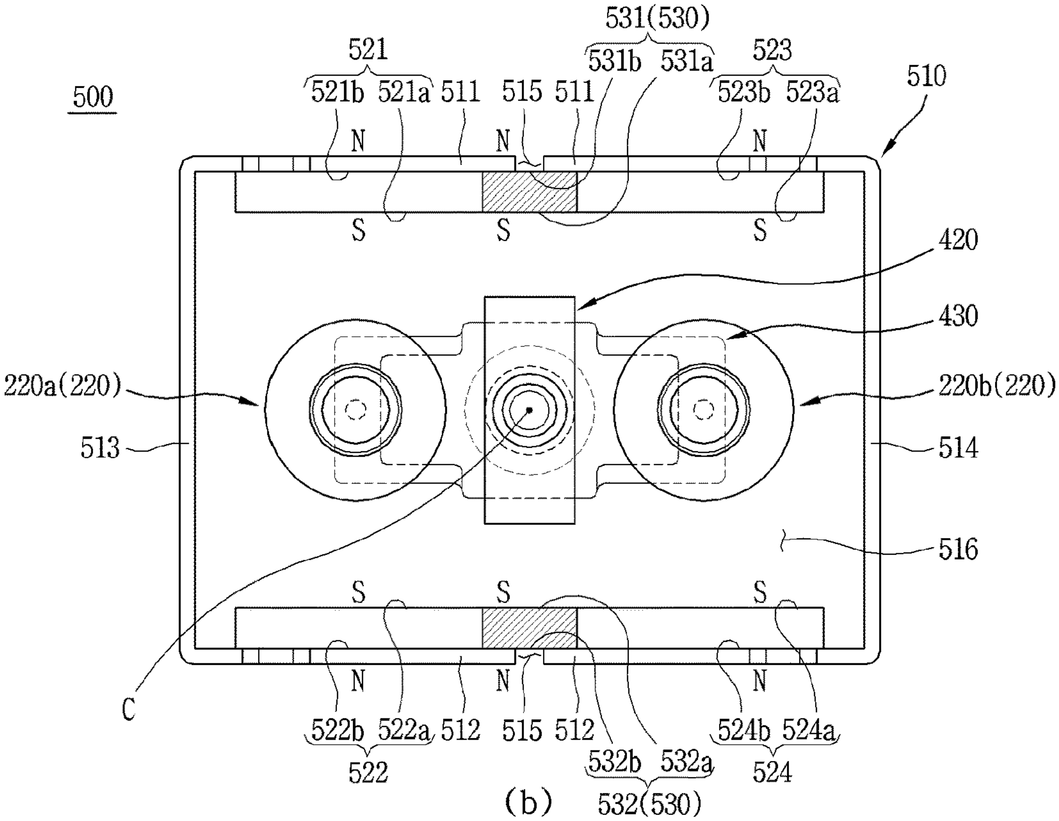

Referring to FIG. 8, the arc path forming unit 500 according to the illustrated implementation may include the magnetization member 530.

The magnetization member 530 may generate a magnetic field in the same direction as the magnetic field generated by the main magnet 520. The magnetic field produced in the space portion 516 may be strengthened by the magnetic field produced by the magnetization member 530.

The magnetization member 530 may be formed of a magnetic substance. In one implementation, the magnetization member 530 may be formed of iron (Fe) or the like.

The magnetization member 530 may be in contact with or connected to the main magnet 520. The magnetism of the main magnet 520 may be transferred to the magnetization member 530. Accordingly, the magnetization member 530 can have the same polarity as the contacted main magnet 520.

The magnetization member 530 may be coupled to the magnet frame 510. To this end, a coupling member (not illustrated) may be provided.

The magnetization member 530 may be provided in plurality. In the illustrated implementation, two magnetization members 530 may be provided, but the number may vary.

The magnetization members 530 may include a first magnetization member 531 and a second magnetization member 532.

The first magnetization member 531 may be in contact with the first main magnet 521 and the third main magnet 523. The first magnetization member 531 may be located in the space defined between the first main magnet 521 and the third main magnet 523 that are spaced apart from each other by the predetermined distance.

The first magnetization member 531 may extend in the longitudinal direction, namely, in the left and right directions in the illustrated implementation. The first magnetization member 531 may have the same thickness as that of the first main magnet 521 or the third main magnet 523.

The first magnetization member 531 may be located on the first surface 511. A communication hole (not illustrated) communicating with the arc discharge opening 515 may be formed at the first magnetization member 531.

One end portion of the first magnetization member 531 facing the first main magnet 521, for example, a left end portion in the illustrated implementation, may come in contact with one end portion of the first main magnet 521 facing the first magnetization member 531, for example, a right end portion in the illustrated implementation.

Another end portion of the first magnetization member 531 facing the third main magnet 523, for example, a right end portion in the illustrated implementation, may come in contact with one end portion of the third main magnet 523 facing the first magnetization member 531, for example, a left end portion in the illustrated implementation.

The first magnetization member 531 may include a first magnetization facing surface 531*a* and a first magnetization opposing surface 531*b*.

The first magnetization facing surface 531*a* may be defined as one side surface of the first magnetization member 531 that faces the space portion 516. In other words, the first magnetization facing surface 531*a* may be defined as one side surface of the first magnetization member 531 that faces the second magnetization member 532.

The first magnetization opposing surface 531*b* may be defined as another side surface of the first magnetization member 531 that faces the first surface 511. In other words, the first magnetization opposing surface 531*b* may be defined as another side surface of the first magnetization member 531 opposite to the first magnetization facing surface 531*a*.

When the first magnetization member 531 comes in contact with the first main magnet 521 and the third main magnet 523, the first magnetization facing surface 531*a* may have the same polarity as the polarity of the first facing surface 521*a* and the third facing surface 523*a*. Similarly, the first magnetization opposing surface 531*b* may have the same polarity as the polarity of the first opposing surface 521*b* and the third opposing surface 523*b*.

Accordingly, the first main magnet 521, the first magnetization member 531, and the third main magnet 523 can function as a single magnet.

The second magnetization member 532 may be in contact with the second main magnet 522 and the fourth main magnet 524. The second magnetization member 532 may be located in the space defined between the second main magnet 522 and the fourth main magnet 524 that are spaced apart from each other by the predetermined distance.

The second magnetization member 532 may extend in the longitudinal direction, namely, in the left and right directions in the illustrated implementation. The second magnetization member 532 may have the same thickness as that of the second main magnet 522 or the fourth main magnet 524.

The second magnetization member 532 may be located on the second surface 512. A communication hole (not illustrated) communicating with the arc discharge opening 515 may be formed at the second magnetization member 532.

One end portion of the second magnetization member 532 facing the second main magnet 522, for example, a left end portion in the illustrated implementation may come in contact with one end portion of the second main magnet 522 facing the second magnetization member 532, for example, a right end portion in the illustrated implementation.

Another end portion of the second magnetization member 532 facing the fourth main magnet 524, for example, a right end portion in the illustrated implementation may come in contact with one end portion of the fourth main magnet 524 facing the second magnetization member 532, for example, a left end portion in the illustrated implementation.

The second magnetization member 532 may include a second magnetization facing surface 532*a* and a second magnetization opposing surface 532*b*.

The second magnetization facing surface 532*a* may be defined as one side surface of the second magnetization member 532 that faces the space portion 516. In other words, the second magnetization facing surface 532*a* may be defined as one side surface of the second magnetization member 532 that faces the first magnetization member 531.

The second magnetization opposing surface 532*b* may be defined as another side surface of the second magnetization member 532 that faces the second surface 512. In other words, the second magnetization opposing surface 532*b* may be defined as another side surface of the second magnetization member 532 opposite to the second magnetization facing surface 532*a*.

When the second magnetization member 532 comes in contact with the second main magnet 522 and the fourth main magnet 524, the second magnetization facing surface 532*a* may have the same polarity as the polarity of the second facing surface 522*a* and the fourth facing surface 524*a*. Similarly, the second magnetization opposing surface 532*b* may have the same polarity as the polarity of the second opposing surface 522*b* and the fourth opposing surface 524*b*.

Accordingly, the second main magnet 522, the second magnetization member 532, and the fourth main magnet 524 can function as a single magnet.

This can increase strength and area of the magnetic fields produced in the space portion 516 by virtue of the magnetization member 530. Therefore, the arc path A.P can be more effectively formed by the magnetic fields with the increased strength and area.

(4) Description of Sub Magnet 540

Figure 9:
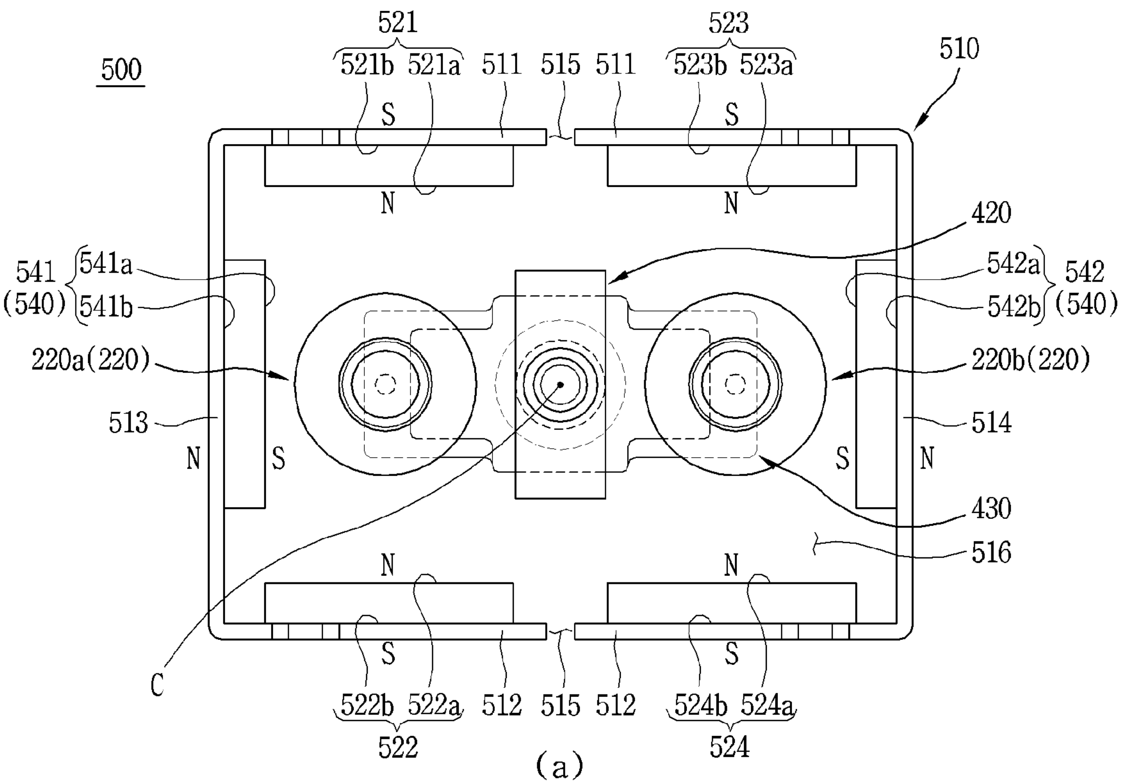
FIG. 9 is a planar view illustrating a magnet assembly in accordance with a modified example of the implementation of FIG. 5.
Figure 9:
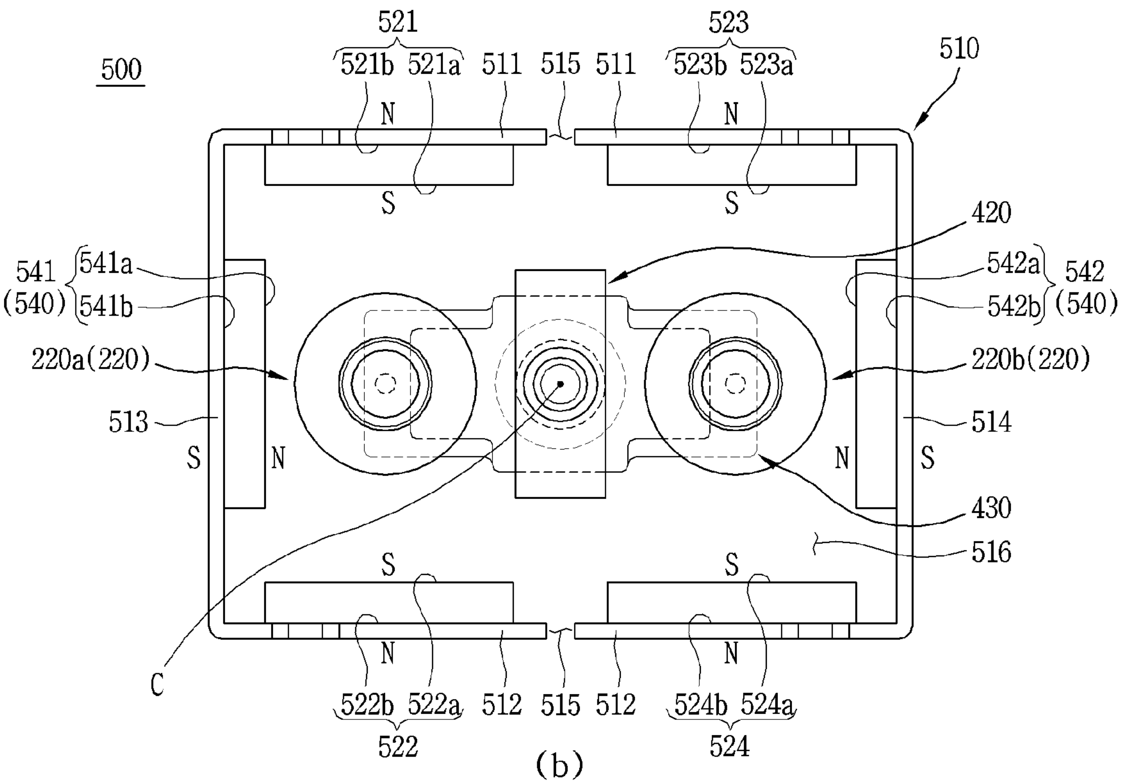
Figure 10:
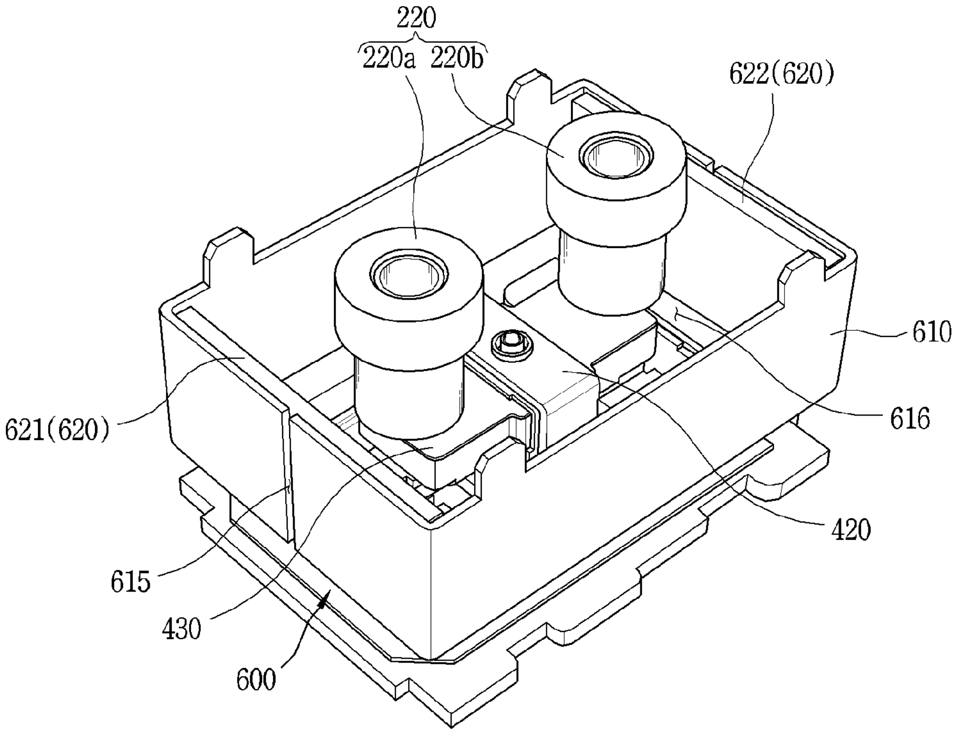
FIG. 10 is a perspective view illustrating a magnet assembly in accordance with another implementation.
Figure 11:
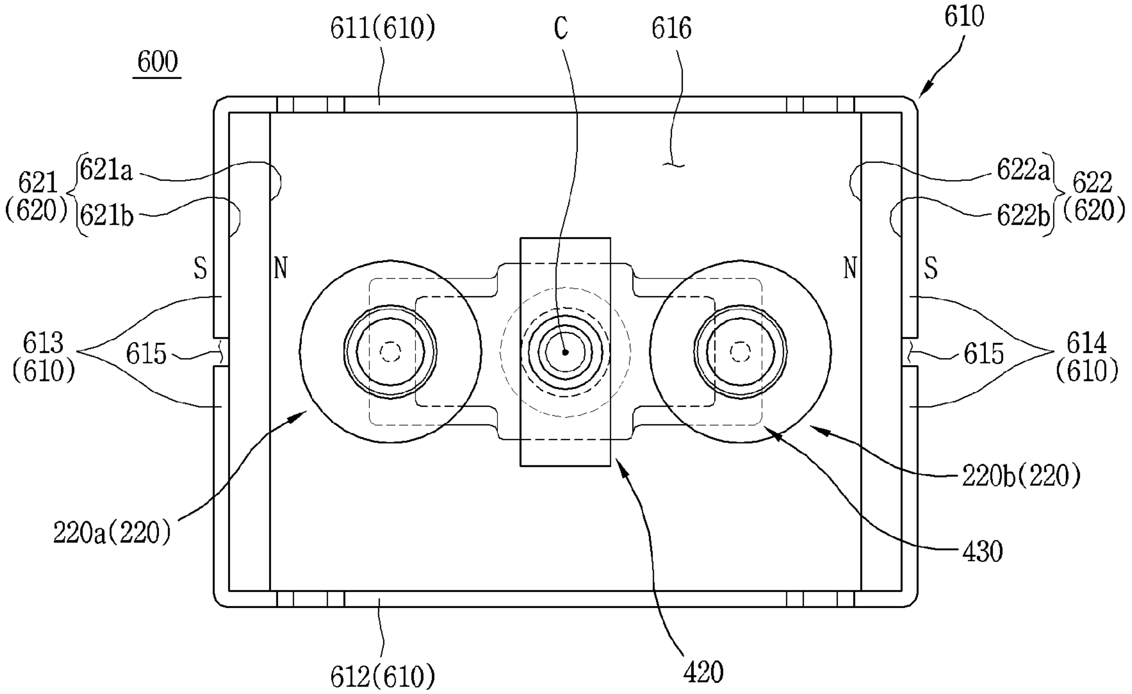
FIG. 11 is a planar view of the magnet assembly of FIG. 10.
Figure 11:
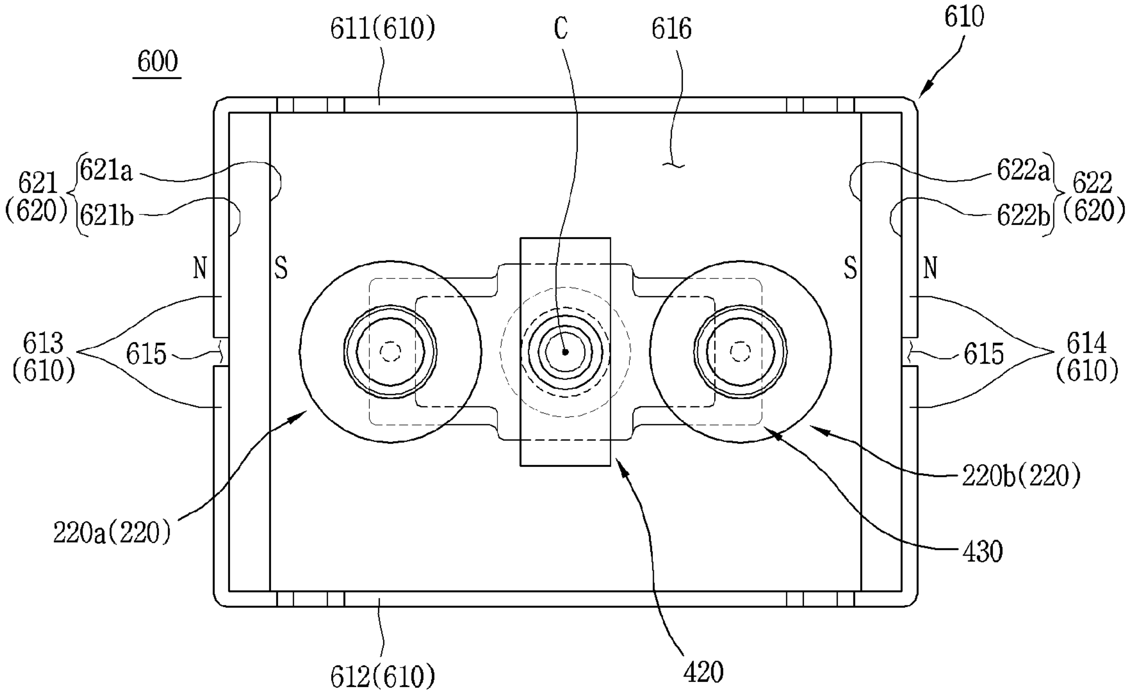

Referring to FIG. 9, the arc path forming unit 500 according to the illustrated implementation may include the sub magnet 540.

The sub magnet 540 may produce a magnetic field in a direction to strengthen the magnetic field produced by the main magnet 520.

The sub magnet 540 may generate a magnetic field inside the space portion 516. The magnetic field may be generated between the sub magnet 540 and a neighboring main magnet 520 or by each sub magnet 540.

The sub magnet 540 may be configured to have magnetism by itself or to obtain magnetism by an application of current or the like. In one implementation, the sub magnet 540 may be implemented as a permanent magnet or an electromagnet.

The sub magnet 540 may be coupled to the magnet frame 510. Coupling members (not illustrated) may be provided for the coupling between the sub magnet 540 and the magnet frame 510.

In the illustrated implementation, the sub magnet 540 may extend in the longitudinal direction and may be formed in a rectangular parallelepiped shape having a rectangular cross section. The sub magnet 540 may be provided in any shape capable of producing the magnetic field.

The sub magnet 540 may be provided in plurality. In the illustrated implementation, two sub magnets 540 may be provided but the number may vary.

The sub magnets 540 may include a first sub magnet 541 and a second sub magnet 542.

The first sub magnet 541 may produce a magnetic field in a direction to strengthen the magnetic fields generated by the first main magnet 521 and the second main magnet 522.

The first sub magnet 541 may be coupled to the inner side of the third surface 513. The first sub magnet 541 may be disposed to face the second sub magnet 542 with the space portion 516 therebetween.

The first sub magnet 541 may include a first sub facing surface 541*a* and a first sub opposing surface 541*b*.

The first sub facing surface 541*a* may be defined as one side surface of the first sub magnet 541 that faces the space portion 516. In other words, the first sub facing surface 541*a* may be defined as one side surface of the first sub magnet 541 that faces the second sub magnet 542.

The first sub opposing surface 541*b* may be defined as another side surface of the first sub magnet 541 facing the third surface 513. In other words, the first sub opposing surface 541*b* may be defined as another side surface of the first sub magnet 541 opposite to the first sub facing surface 541*a*.

The first sub facing surface 541*a* may have the same polarity as the second sub facing surface 542*a*. In addition, the first sub opposing surface 541*b* may have the same polarity as the second sub opposing surface 542*b*.

The first sub facing surface 541*a* may have a different polarity from the polarity of the first to fourth facing surfaces 521*a*, 522*a*, 523*a*, and 524*a*. That is, the first sub facing surface 541*a* may have the same polarity as the first to fourth opposing surfaces 521*b*, 522*b*, 523*b*, and 524*b*.

In addition, the first sub opposing surface 541*b* may have a different polarity from the polarity of the first to fourth opposing surfaces 521*b*, 522*b*, 523*b*, and 524*b*. That is, the first sub opposing surface 541_b_ may have the same polarity as the first to fourth facing surfaces 521_a_, 522_a_, 523_a_, and 524_a_.

With the configuration, the magnetic field produced by each of the main magnets 521, 522, 523, and 524 and the magnetic field produced by the first sub magnet 541 may attract each other.

Accordingly, the magnetic field produced by each of the main magnets 521, 522, 523, and 524 can be strengthened by the magnetic field produced by the first sub magnet 541.

The second sub magnet 542 may produce a magnetic field in a direction to strengthen the magnetic fields generated by the third main magnet 523 and the fourth main magnet 524.

The second sub magnet 542 may be coupled to the inner side of the fourth surface 514. The second sub magnet 542 may be disposed to face the first sub magnet 541 with the space portion 516 therebetween.

The second sub magnet 542 may include a second sub facing surface 542_a_ and a second sub opposing surface 542_b_.

The second sub facing surface 542_a_ may be defined as one side surface of the second sub magnet 542 that faces the space portion 516. In other words, the second sub facing surface 542_a_ may be defined as one side surface of the second sub magnet 542 that faces the first sub magnet 541.

The second sub opposing surface 542_b_ may be defined as another side surface of the second sub magnet 542 that faces the fourth surface 514. In other words, the second sub opposing surface 542_b_ may be defined as another side surface of the second sub magnet 542 opposite to the second sub facing surface 542_a_.

The second sub facing surface 542_a_ may have the same polarity as the first sub facing surface 541_a_. In addition, the second sub opposing surface 542_b_ may have the same polarity as the first sub opposing surface 541_b_.

The second sub facing surface 542_a_ may have a different polarity from the polarity of the first to fourth facing surfaces 521_a_, 522_a_, 523_a_, and 524_a_. That is, the second sub facing surface 542_a_ may have the same polarity as the first to fourth opposing surfaces 521_b_, 522_b_, 523_b_, and 524_b_.

In addition, the second sub opposing surface 542_b_ may have a different polarity from the polarity of the first to fourth opposing surfaces 521_b_, 522_b_, 523_b_, and 524_b_. That is, the second sub opposing surface 542_b_ may have the same polarity as the first to fourth facing surfaces 521_a_, 522_a_, 523_a_, and 524_a_.

With the configuration, the magnetic field produced by each of the main magnets 521, 522, 523, and 524 and the magnetic field produced by the second sub magnet 542 may attract each other.

Accordingly, the magnetic field produced by each of the main magnets 521, 522, 523, and 524 can be strengthened by the magnetic field produced by the second sub magnet 542.

This can increase strength and area of the magnetic fields produced in the space portion 516, compared to the case employing only the main magnet 520. Therefore, the arc path A.P can be more effectively formed by the magnetic fields with the increased strength and area.

The magnetization member 530 and the sub magnet 540 may be selectively provided.

That is, the arc path forming unit 500 may include only the main magnet 520, may include the main magnet 520 and the magnetization member 530, or may include the main magnet 520 and the sub magnet 540.

Furthermore, the arc path forming unit 500 may include all of the main magnet 520, the magnetization member 530, and the sub magnet 540.

4. Description of Arc Path Forming Unit 600 According to Another Implementation Referring to FIG. 3, the DC relay 10 may include an arc path forming unit 600. The arc path forming unit 600 may form a path through which an arc generated inside the arc chamber 210 is moved or extinguished during movement.

The arc path forming unit 600 may include a main magnet 620 and a sub magnet 640. The main magnet 620 and the sub magnet 640 may generate magnetic fields therebetween or by themselves.

In a state in which the magnetic fields are generated, when the fixed contactor 220 and the movable contactor 430 are in contact with each other, electromagnetic force may be generated accordingly. A direction of the electromagnetic force may be determined according to the Fleming's left-hand rule.

The arc path forming unit 600 may control the direction of the electromagnetic force by using polarities and an arrangement method of the main magnet 620 and the sub magnet 640.

Accordingly, a generated arc may not move toward the central portion C of the space portion 516 of the magnet frame 510. This can prevent damage on components of the DC relay 10 disposed in the central portion C.

The arc path forming unit 600 may be located in the inner space of the upper frame 110. Also, the arc path forming unit 600 may surround the arc chamber 210 at the outside of the arc chamber 210.

Hereinafter, the arc path forming unit 600 according to another implementation will be described in detail, with reference to FIGS. 10 to 14.

The arc path forming unit 600 according to the illustrated implementation may include a magnet frame 610, a main magnet 620, a magnetization member 630, and a sub magnet 640.

(1) Description of Magnet Frame 610

The magnet frame 610 may define an outside of the arc path forming unit 600. The magnet frame 610 may surround the arc chamber 210. That is, the magnet frame 610 may be located outside the arc chamber 210.

In the illustrated implementation, the magnet frame 610 may have a rectangular cross-section. That is, the magnet frame 610 may be formed such that a length in the longitudinal direction, for example, in the left and right direction in the illustrated implementation is longer than a length in a widthwise direction, for example, in the front and rear direction in the illustrated implementation.

The shape of the magnet frame 610 may vary depending on shapes of the upper frame 110 and the arc chamber 210.

A space portion 616 defined in the magnet frame 610 may communicate with the arc chamber 210. To this end, as described above, a through hole (not illustrated) may be formed through a wall portion of the arc chamber 210.

The magnet frame 610 may be formed of an insulating material through which electricity or magnetic force does not pass. This can prevent an occurrence of magnetic interference among the main magnet 620, the magnetization member 630, and the sub magnet 640. In one implementation, the magnet frame 610 may be formed of a synthetic resin or ceramic.

The magnet frame 610 may include a first surface 611, a second surface 612, a third surface 613, a fourth surface 614, an arc discharge opening 615, and a space portion 616.

The first surface 611, the second surface 612, the third surface 613, and the fourth surface 614 may define an outer circumferential surface of the magnet frame 610. That is, the first surface 611, the second surface 612, the third surface 613, and the fourth surface 614 may serve as walls of the magnet frame 610.

Outer sides of the first surface 611, the second surface 612, the third surface 613, and the fourth surface 614 may be in contact with or fixedly coupled to an inner surface of the upper frame 110. In addition, the main magnet 620, the magnetization member 630, and the sub magnet 640 may be disposed at inner sides of the first surface 611, the second surface 612, the third surface 613, and the fourth surface 614.

In the illustrated implementation, the first surface 611 may define a rear surface. The second surface 612 may define a front surface and face the first surface 611.

Also, the third surface 613 may define a left surface. The fourth surface 614 may define a right surface and face the third surface 613.

The first surface 611 may continuously be formed with the third surface 613 and the fourth surface 614. The first surface 611 may be coupled to the third surface 613 and the fourth surface 614 at predetermined angles. In one implementation, the predetermined angle may be a right angle.

The second surface 612 may continuously be formed with the third surface 613 and the fourth surface 614. The second surface 612 may be coupled to the third surface 613 and the fourth surface 614 at predetermined angles. In one implementation, the predetermined angle may be a right angle.

Each corner at which the first surface 611 to the fourth surface 614 are connected to one another may be chamfered.

A first main magnet 621 may be coupled to the inner side of the third surface 613, namely, one side of the third surface 613 facing the fourth surface 614. Also, a second main magnet 622 may be coupled to the inner side of the fourth surface 614, namely, one side of the fourth surface 614 facing the third surface 613.

A first magnetization member 631 may be coupled to the one side of the third surface 613. In addition, a second magnetization member 632 may be coupled to the one side of the fourth surface 614.

A first sub magnet 641 may be coupled to the inner side of the first surface 611, namely, one side of the first surface 611 facing the second surface 612. Also, a second sub magnet 642 may be coupled to the inner side of the second surface 612, namely, one side of the second surface 612 facing the first surface 611.

Coupling members (not illustrated) may be provided for coupling the respective surfaces 611, 612, 613, and 614 with the main magnet 620, the magnetization member 630, and the sub magnet 640.

An arc discharge opening 615 may be formed through at least one of the third surface 613 and the fourth surface 614.

The arc discharge opening 615 may be a passage through which an arc extinguished and discharged from the arc chamber 210 is introduced into the inner space of the upper frame 110. The arc discharge opening 615 may allow the space portion 616 of the magnet frame 610 to communicate with the space of the upper frame 110.

In the illustrated implementation, the arc discharge opening 615 may be formed through each of the third surface 613 and the fourth surface 614.

The arc discharge opening 615 formed through the third surface 613 may communicate with a through hole (not illustrated) formed through the first main magnet 621.

Also, the arc discharge opening 615 formed through the fourth surface 614 may communicate with a through hole (not illustrated) formed through the second main magnet 622.

A space surrounded by the first surface 611 to the fourth surface 614 may be defined as the space portion 616.

The fixed contactor 220 and the movable contactor 430 may be accommodated in the space portion 616. Although not illustrated in FIGS. 10 to 14, the arc chamber 210 may be accommodated in the space portion 616.

In the space portion 616, the movable contactor 430 may move toward the fixed contactor 220 or away from the fixed contactor 220.

In addition, a path A.P of an arc generated in the arc chamber 210 may be formed in the space portion 616. This can be achieved by the magnetic fields generated by the main magnet 620, the magnetization member 630, and the sub magnet 640.

A central portion of the space portion 616 may be defined as a central portion C. A same straight line distance may be set from each corner where the first to fourth surfaces 611, 612, 613, and 614 are connected to the central portion C.

The central portion C may be located between the first fixed contactor **220*a* and the second fixed contactor 220*b*. In addition, a center of the movable contactor part 400 may be located perpendicularly below the central portion C. That is, centers of the housing 410, the cover 420, the movable contactor 430, the shaft 440, and the elastic portion 450** may be located perpendicularly below the central portion C.

Accordingly, when a generated arc is moved toward the central portion C, those components may be damaged. To prevent such damage, the arc path forming unit 600 may include the main magnet 620, the magnetization member 630, and the sub magnet 640.

(2) Description of Main Magnet 620

The main magnet 620 may generate a magnetic field inside the space portion 616. The magnetic field may be generated between neighboring main magnets 620 or by each main magnet 620.

The main magnet 620 may be configured to have magnetism by itself or to obtain magnetism by an application of current or the like. In one implementation, the main magnet 620 may be implemented as a permanent magnet or an electromagnet.

The main magnet 620 may be coupled to the magnet frame 610. Coupling members (not illustrated) may be provided for the coupling between the main magnet 620 and the magnet frame 610.

In the illustrated implementation, the main magnet 620 may extend in the longitudinal direction and may be formed in a rectangular parallelepiped shape having a rectangular cross section. The main magnet 620 may be provided in any shape capable of producing the magnetic field.

The main magnet 620 may be provided in plurality. In the illustrated implementation, two main magnets 620 may be provided but the number may vary.

The main magnets 620 may include a first main magnet 621 and a second main magnet 622.

The first main magnet 621 may produce a magnetic field together with the second main magnet 622. In addition, the first main magnet 621 may generate a magnetic field by itself.

In the illustrated implementation, the first main magnet 621 may be located on the inner side of the third surface 613. The first main magnet 621 may extend to have the same length as the third surface 613.

The first main magnet 621 may be disposed to face the second main magnet 622. Specifically, the first main magnet 621 may be disposed to face the second main magnet 622 with the space portion 616 therebetween.

A through hole (not illustrate) may be formed through the first main magnet 621. The through hole (not illustrated) may be formed in a direction perpendicular to the longitudinal direction, for example, in the left and right direction in the illustrated implementation.

The through hole (not illustrated) may communicate with the arc discharge opening 615. The arc extinguished in the space portion 616 may be discharged to the outside of the magnet frame 610 through the through hole (not illustrated) and the arc discharge opening 615.

The first main magnet 621 may include a first facing surface 621*a* and a first opposing surface 621*b*.

The first facing surface 621*a* may be defined as one side surface of the first main magnet 621 that faces the space portion 616. In other words, the first facing surface 621*a* may be defined as one side surface of the first main magnet 621 that faces the second main magnet 622.

The first opposing surface 621*b* may be defined as another side surface of the first main magnet 621 that faces the third surface 613. In other words, the first opposing surface 621*b* may be defined as one side surface of the first main magnet 621 opposite to the first facing surface 621*a*.

The first facing surface 621*a* and the first opposing surface 621*b* may have different polarities. That is, the first facing surface 621*a* may be magnetized to one of the N pole and the S pole, and the first opposing surface 621*b* may be magnetized to another one of the N pole and the S pole.

Accordingly, a magnetic field propagating from one of the first facing surface 621*a* and the first opposing surface 621*b* to the other may be produced by the first main magnet 621 itself.

The polarity of the first facing surface 621*a* may be the same as a polarity of the second facing surface 622*a* of the second main magnet 622.

Accordingly, the magnetic fields that repel each other may be produced in the space portion 616 between the first main magnet 621 and the second main magnet 622.

The second main magnet 622 may produce a magnetic field together with the first main magnet 621. In addition, the second main magnet 622 may generate a magnetic field by itself.

In the illustrated implementation, the second main magnet 622 may be located on the inner side of the fourth surface 614. The second main magnet 622 may extend to have the same length as the fourth surface 614.

The second main magnet 622 may be disposed to face the first main magnet 621. Specifically, the second main magnet 622 may be disposed to face the first main magnet 621 with the space portion 616 therebetween.

The second main magnet 622 may include a second facing surface 622*a* and a second opposing surface 622*b*.

The second facing surface 622*a* may be defined as one side surface of the second main magnet 622 that faces the space portion 616. In other words, the second facing surface 622*a* may be defined as one side surface of the second main magnet 622 that faces the first main magnet 621.

The second opposing surface 622*b* may be defined as another side surface of the second main magnet 622 that faces the fourth surface 614. In other words, the second opposing surface 622*b* may be defined as one side surface of the second main magnet 622 opposite to the second facing surface 622*a*.

The second facing surface 622*a* and the second opposing surface 622*b* may have different polarities. That is, the second facing surface 622*a* may be magnetized to one of the N pole and the S pole, and the second opposing surface 622*b* may be magnetized to another one of the N pole and the S pole.

Accordingly, a magnetic field propagating from one of the second facing surface 622*a* and the second opposing surface 622*b* to the other may be produced by the second main magnet 622 itself.

The polarity of the second facing surface 622*a* may be the same as the polarity of the first facing surface 621*a* of the first main magnet 621.

Accordingly, the magnetic fields that repel each other may be produced in the space portion 616 between the second main magnet 622 and the first main magnet 621.

Figure 12:
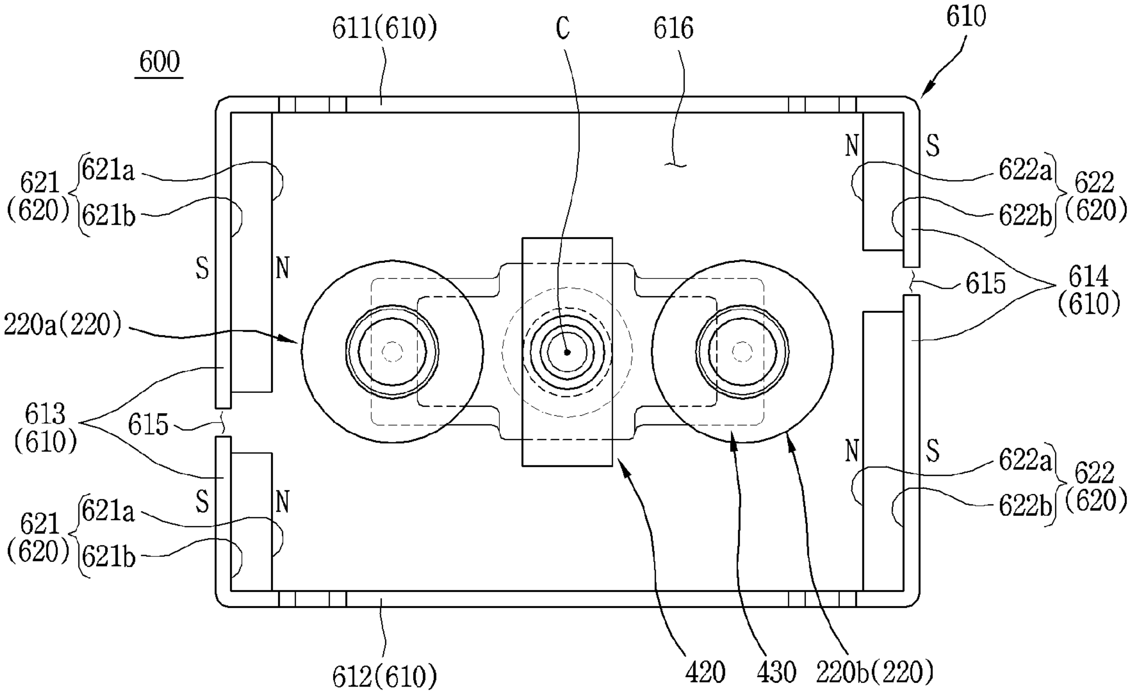
FIG. 12 is a planar view illustrating a magnet assembly in accordance with a modified example of the implementation of FIG. 10.
Figure 12:
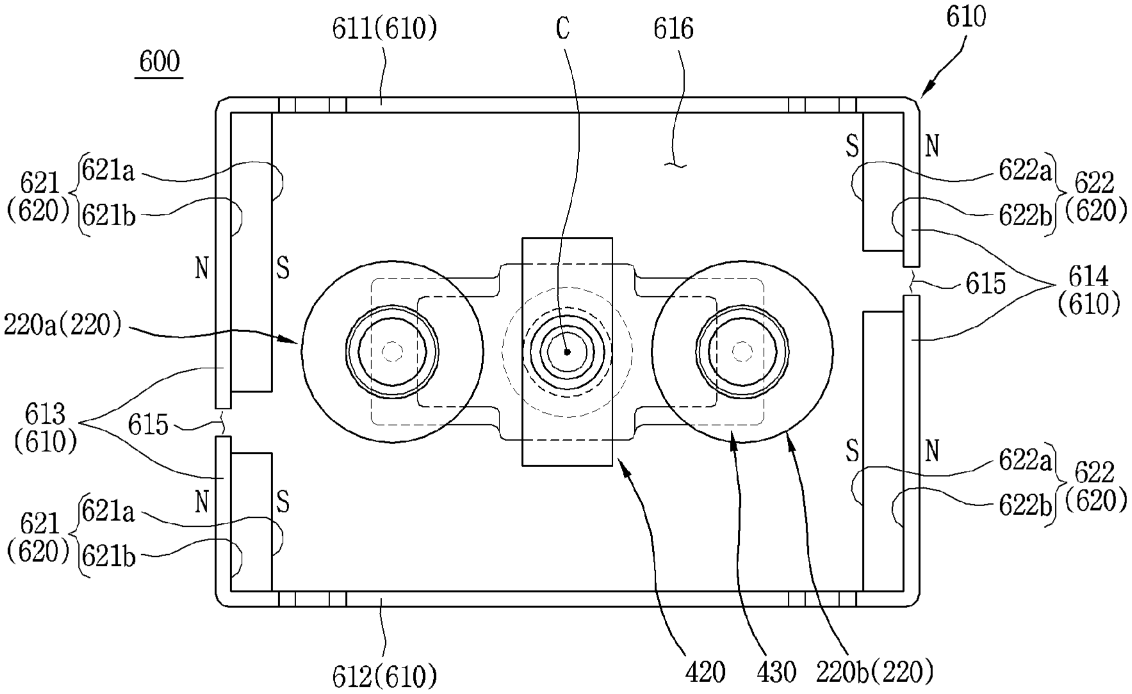

Referring to FIG. 12, the first main magnet 621 and the second main magnet 622 may be provided in plurality, respectively. In the illustrated implementation, each of the first main magnet 621 and the second main magnet 622 may be provided by two.

The plurality of first main magnets 621 may have different lengths. In the illustrated implementation, any one (at the rear side) of the plurality of first main magnets 621 may be longer than the other first main magnet 621 (at the front side).

Similarly, the plurality of second main magnets 622 may have different lengths. In the illustrated implementation, any one (at the front side) of the plurality of second main magnets 622 may be longer than the other second main magnet 622 (at the rear side).

Although not illustrated, the first main magnet 621 having the longer length may be located at the front side and the first main magnet 621 having the shorter length may be located at the rear side. Similarly, the second main magnet 622 having the longer length may be located at the rear side and the second main magnet 622 having the shorter length may be located at the front side.

The plurality of first main magnets 621 may be disposed to be spaced apart from each other by a predetermined distance. The arc discharge opening 615 formed through the third surface 613 may be located to communicate with the space defined by the spacing.

The plurality of second main magnets 622 may be disposed to be spaced apart from each other by a predetermined distance. The arc discharge opening 615 formed through the fourth surface 614 may be located to communicate with the space defined by the spacing.

With the configuration, the magnetic fields produced by the main magnets 620 facing each other may be biased toward either the left or the right. Even in this case, the magnetic fields produced in the space portion 616 by the respective main magnets 621 and 622 may repel each other.

This can prevent a generated arc from moving toward the central portion C. Also, the degree of freedom of designing the DC relay 10 can be improved.

(3) Description of Magnetization Member 630

Figure 13:
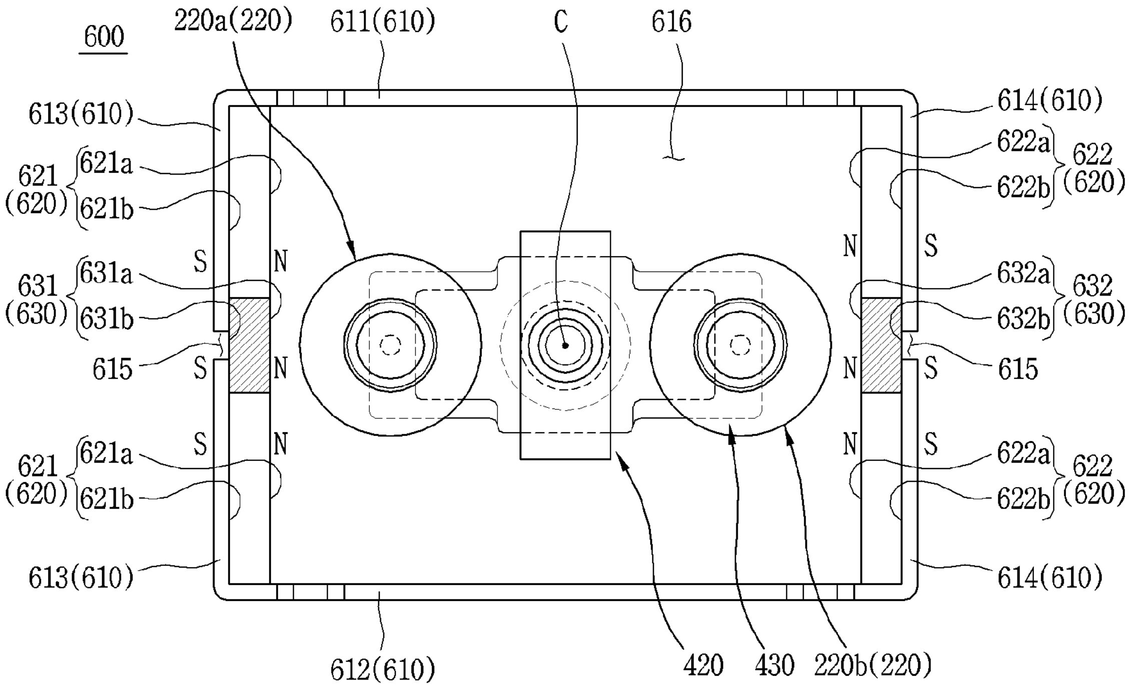
FIG. 13 is a planar view illustrating a magnet assembly in accordance with a modified example of the implementation of FIG. 10.
Figure 13:
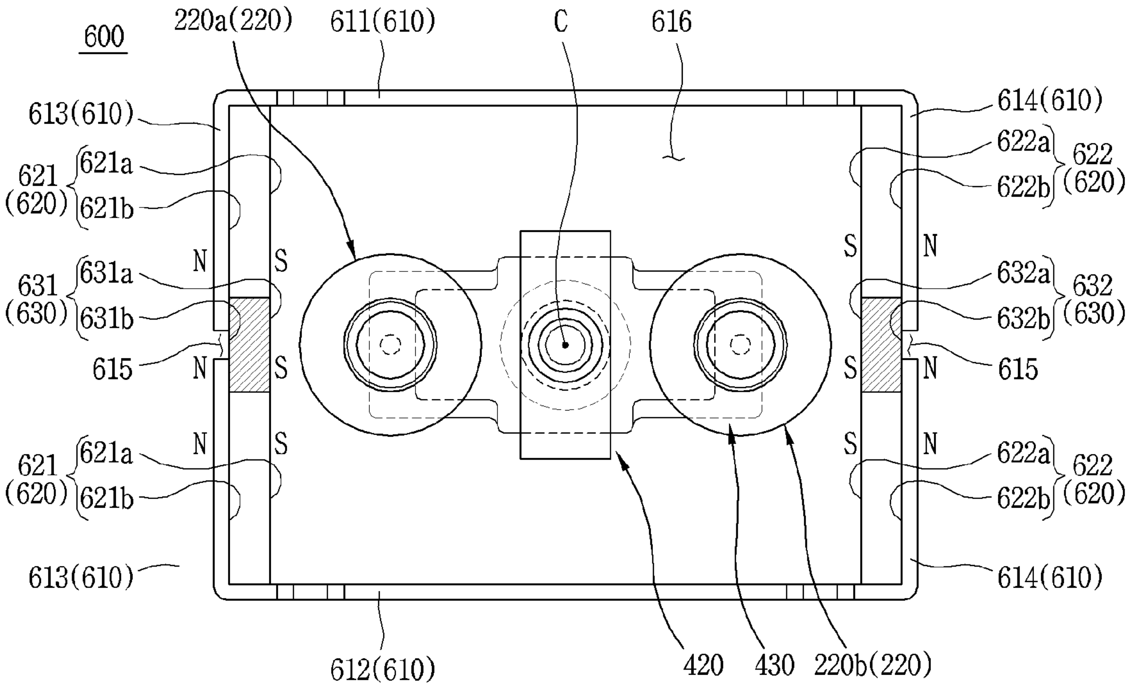

Referring to FIG. 13, the arc path forming unit 600 according to the illustrated implementation may include the magnetization member 630.

The magnetization member 630 may generate a magnetic field in the same direction as the magnetic field generated by the main magnet 620. The magnetic field produced in the space portion 616 may be strengthened by the magnetic field produced by the magnetization member 630.

The magnetization member 630 may be formed of a magnetic substance. In one implementation, the magnetization member 630 may be formed of iron (Fe) or the like.

The magnetization member 630 may be in contact with or connected to the main magnet 620. The magnetism of the main magnet 620 may be transferred to the magnetization member 630. Accordingly, the magnetization member 630 can have the same polarity as the contacted main magnet 620.

The magnetization member 630 may be coupled to the magnet frame 610. To this end, a coupling member (not illustrated) may be provided.

The magnetization member 630 may be provided in plurality. In the illustrated implementation, two magnetization members 630 may be provided but the number may vary.

In the implementation illustrated in FIG. 13, the magnetization member 630 may be located between the main magnets 620. That is, it will be understood as a modified example of the implementation in which each of the first main magnet 621 and the second main magnet 622 is provided in plurality as illustrated in FIG. 12.

The magnetization members 630 may include a first magnetization member 631 and a second magnetization member 632.

The first magnetization member 631 may be in contact with the plurality of first main magnets 621. The first magnetization member 631 may be located in the space which is defined by the plurality of first main magnets 621 spaced apart from each other by a predetermined distance.

The first magnetization member 631 may extend in the longitudinal direction, namely, in the front and rear directions in the illustrated implementation. The first magnetization member 631 may have the same thickness as that of the first main magnet 521.

Both end portions of the first magnetization member 631 in the longitudinal direction may come in contact with end portions of the plurality of first main magnets 621, respectively.

In the illustrated implementation, one end portion of the first magnetization member 631 facing the rear side may come in contact with the front end portion of the first main magnet 621 located at the rear side. Also, one end portion of the first magnetization member 631 facing the front side may come in contact with the rear end portion of the first main magnet 621 located at the front side.

A communication hole (not illustrated) may be formed at the first magnetization member 631. The arc discharge opening 615 formed through the third surface 613 may communicate with the communication hole (not illustrated).

The first magnetization member 631 may include a first magnetization facing surface 631*a* and a first magnetization opposing surface 631*b*.

The first magnetization facing surface 631*a* may be defined as one side surface of the first magnetization member 631 that faces the space portion 616. In other words, the first magnetization facing surface 631*a* may be defined as one side surface of the first magnetization member 631 that faces the second magnetization member 632.

The first magnetization opposing surface 631*b* may be defined as another side surface of the first magnetization member 631 that faces the third surface 613. In other words, the first magnetization opposing surface 631*b* may be defined as another side surface of the first magnetization member 631 opposite to the first magnetization facing surface 631*a*.

When the first magnetization member 631 comes in contact with the first main magnet 521, the first magnetization facing surface 631*a* may have the same polarity as the polarity of the first facing surface 621*a*. Similarly, the first magnetization opposing surface 631*b* may have the same polarity as the polarity of the first opposing surface 621*b*.

Accordingly, the plurality of first main magnets 621 and the first magnetization member 631 may function as a single magnet.

The second magnetization member 632 may be in contact with the plurality of second main magnets 521. The second magnetization member 632 may be located in the space which is defined by the plurality of second main magnets 622 spaced apart from each other by a predetermined distance.

The second magnetization member 632 may extend in the longitudinal direction, namely, in the front and rear directions in the illustrated implementation. The second magnetization member 632 may have the same thickness as that of the second main magnet 621.

Both end portions of the second magnetization member 632 in the longitudinal direction may come in contact with end portions of the plurality of second main magnets 622, respectively.

In the illustrated implementation, one end portion of the second magnetization member 632 facing the rear side may come in contact with the front end portion of the second main magnet 622 located at the rear side. Also, one end portion of the second magnetization member 632 facing the front side may come in contact with the rear end portion of the second main magnet 622 located at the front side.

A communication hole (not illustrated) may be formed at the second magnetization member 632. The arc discharge opening 615 formed through the fourth surface 614 may communicate with the communication hole (not illustrated).

The second magnetization member 632 may include a second magnetization facing surface 632*a* and a second magnetization opposing surface 632*b*.

The second magnetization facing surface 632*a* may be defined as one side surface of the second magnetization member 632 that faces the space portion 616. In other words, the second magnetization facing surface 632*a* may be defined as one side surface of the second magnetization member 632 that faces the first magnetization member 631.

The second magnetization opposing surface 632*b* may be defined as another side surface of the second magnetization member 632 that faces the fourth surface 614. In other words, the second magnetization opposing surface 632*b* may be defined as another side surface of the second magnetization member 632 opposite to the second magnetization facing surface 632*a*.

When the second magnetization member 632 comes in contact with the second main magnet 521, the second magnetization facing surface 632*a* may have the same polarity as the polarity of the second facing surface 622*a*. Similarly, the second magnetization opposing surface 632*b* may have the same polarity as the polarity of the second opposing surface 622*b*.

Accordingly, the plurality of second main magnets 622 and the second magnetization member 632 may function as a single magnet.

This can increase strength and area of the magnetic fields produced in the space portion 616 by virtue of the magnetization member 630. Therefore, the arc path A.P can be more effectively formed by the magnetic fields with the increased strength and area.

(4) Description of Sub Magnet 640

Figure 14:
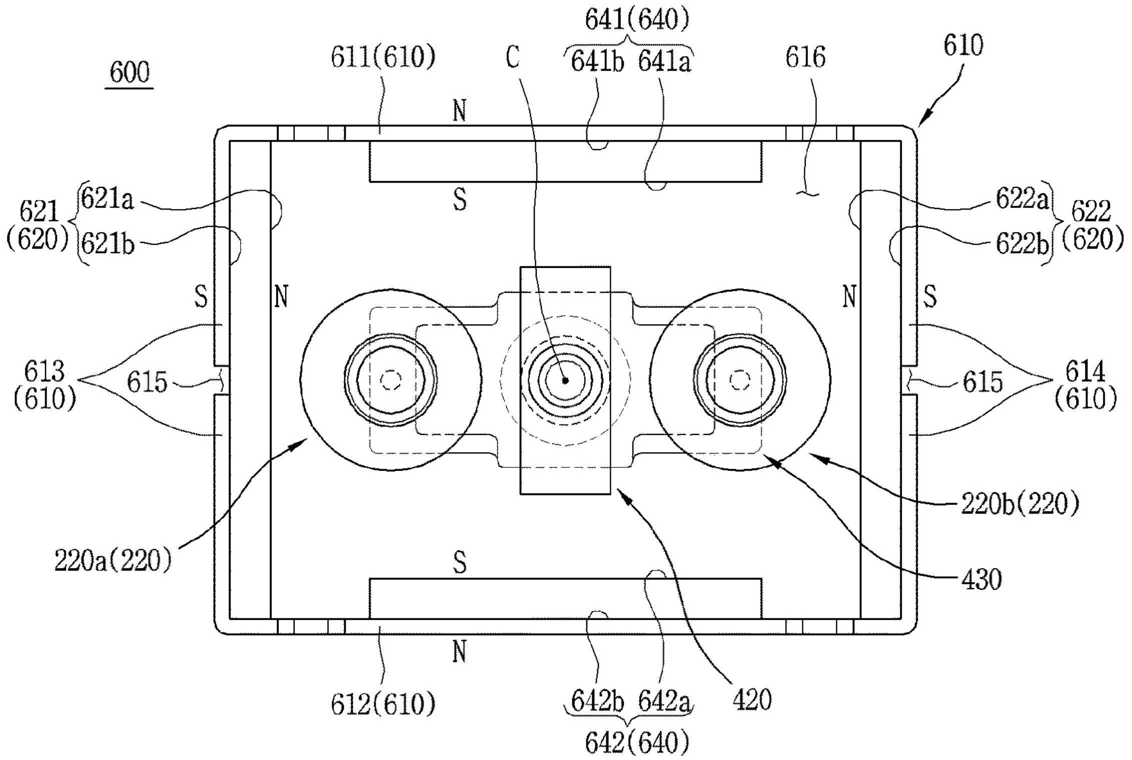
FIG. 14 is a planar view illustrating a magnet assembly in accordance with a modified example of the implementation of FIG. 10.
Figure 14:
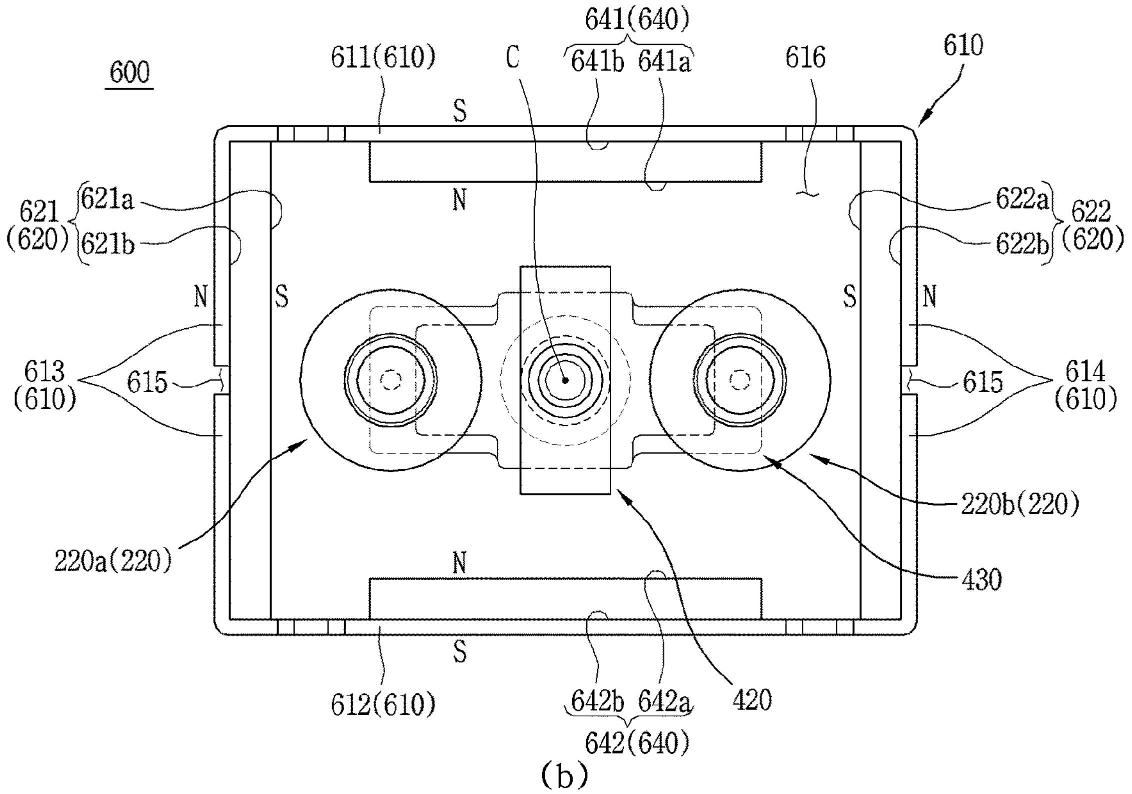

Referring to FIG. 14, the arc path forming unit 600 according to the illustrated implementation may include the sub magnet 640.

The sub magnet 640 may produce a magnetic field in a direction to strengthen the magnetic field produced by the main magnet 620.

The sub magnet 640 may generate a magnetic field inside the space portion 616. The magnetic field may be generated between the sub magnet 640 and a neighboring main magnet 620 or between the sub magnets 640 or may be generated by each sub magnet 640.

The sub magnet 640 may be configured to have magnetism by itself or to obtain magnetism by an application of current or the like. In one implementation, the sub magnet 640 may be implemented as a permanent magnet or an electromagnet.

The sub magnet 640 may be coupled to the magnet frame 610. Coupling members (not illustrated) may be provided for the coupling between the sub magnet 640 and the magnet frame 610.

In the illustrated implementation, the sub magnet 640 may extend in the longitudinal direction and may be formed in a rectangular parallelepiped shape having a rectangular cross section. The sub magnet 640 may be provided in any shape capable of producing the magnetic field.

The sub magnet 640 may be provided in plurality. In the illustrated implementation, two sub magnets 640 may be provided but the number may vary.

The sub magnets 640 may include a first sub magnet 641 and a second sub magnet 642.

The first sub magnet 641 may produce a magnetic field in a direction to strengthen the magnetic fields generated by the first main magnet 621 and the second main magnet 622.

The first sub magnet 641 may be coupled to the first surface 611. The first sub magnet 641 may be disposed to face the second sub magnet 642 with the space portion 616 therebetween.

The first sub magnet 641 may include a first sub facing surface 641*a* and a first sub opposing surface 641*b*.

The first sub facing surface 641*a* may be defined as one side surface of the first sub magnet 641 that faces the space portion 616. In other words, the first sub facing surface 641*a* may be defined as one side surface of the first sub magnet 641 that faces the second sub magnet 642.

The first sub opposing surface 641*b* may be defined as another side surface of the first sub magnet 641 that faces the first surface 611. In other words, the first sub opposing surface 641*b* may be defined as another side surface of the first sub magnet 641 opposite to the first sub facing surface 641*a*.

The first sub facing surface 641*a* may have the same polarity as the second sub facing surface 642*a*. In addition, the first sub opposing surface 641*b* may have the same polarity as the second sub opposing surface 642*b*.

The first sub facing surface 641*a* may have a different polarity from the polarity of the first and second facing surfaces 621*a* and 622*a*. That is, the first sub facing surface 641*a* may have the same polarity as the polarity of the first and second opposing surfaces 621*b* and 622*b*.

In addition, the first sub opposing surface 641*b* may have a different polarity from the polarity of the first and second opposing surfaces 621*b* and 622*b*. That is, the first sub opposing surface 641*b* may have the same polarity as the first and facing surfaces 621*a* and 622*a*.

With the configuration, the magnetic field produced by each of the first main magnet 621 and the second main magnet 622 and the magnetic field produced by the first sub magnet 641 may attract each other.

Accordingly, the magnetic field produced by each of the first main magnet 621 and the second main magnet 622 can be strengthened by the magnetic field produced by the first sub magnet 641.

The second sub magnet 642 may produce a magnetic field in a direction to strengthen the magnetic fields generated by the first main magnet 621 and the second main magnet 622.

The second sub magnet 642 may be coupled to the second surface 612. The second sub magnet 642 may be disposed to face the first sub magnet 641 with the space portion 616 therebetween.

The second sub magnet 642 may include a second sub facing surface 642*a* and a second sub opposing surface 642*b*.

The second sub facing surface 642*a* may be defined as one side surface of the second sub magnet 642 that faces the space portion 616. In other words, the second sub facing surface 642*a* may be defined as one side surface of the second sub magnet 642 that faces the first sub magnet 641.

The second sub opposing surface 642*b* may be defined as another side surface of the second sub magnet 642 that faces the second surface 612. In other words, the second sub opposing surface 642*b* may be defined as another side surface of the second sub magnet 642 opposite to the second sub facing surface 642*a*.

The second sub facing surface 642*a* may have the same polarity as the first sub facing surface 641*a*. In addition, the second sub opposing surface 642*b* may have the same polarity as the first sub opposing surface 641*b*.

The second sub facing surface 642*a* may have a different polarity from the polarity of the first and second facing surfaces 621*a* and 622*a*. That is, the second sub facing surface 642*a* may have the same polarity as the polarity of the first and second opposing surfaces 621*b* and 622*b*.

In addition, the second sub opposing surface 642*b* may have a different polarity from the polarity of the first and second opposing surfaces 621*b* and 622*b*. That is, the second sub opposing surface 642*b* may have the same polarity as the first and facing surfaces 621*a* and 622*a*.

With the configuration, the magnetic field produced by each of the first main magnet 621 and the second main magnet 622 and the magnetic field produced by the second sub magnet 642 may attract each other.

Accordingly, the magnetic field produced by each of the first main magnet 621 and the second main magnet 622 can be strengthened by the magnetic field produced by the second sub magnet 642.

This can increase strength and area of the magnetic fields produced in the space portion 616, compared to the case employing only the main magnet 620. Therefore, the arc path A.P can be more effectively formed by the magnetic fields with the increased strength and area.

The magnetization member 630 and the sub magnet 640 may be selectively provided.

That is, the arc path forming unit 600 may include only the main magnet 620, may include the main magnet 620 and the magnetization member 630, or may include the main magnet 620 and the sub magnet 640.

Furthermore, the arc path forming unit 600 may include all of the main magnet 620, the magnetization member 630, and the sub magnet 640.

5. Description of Arc Path A.P Formed by Arc Path Forming Unit 500 According to One Implementation The arc path forming unit 500 may be configured to produce magnetic fields in the arc chamber 210. The produced magnetic fields may generate electromagnetic force to form a path A.P of a generated arc.

That is, when the fixed contactor 220 and the movable contactor 430 are brought into contact with each other and thus current flows in a state in which magnetic fields are generated in the arc chamber 210, electromagnetic force may be generated according to the Fleming's left-hand rule. An arc generated inside the arc chamber 210 may move along a direction of the electromagnetic force.

Hereinafter, an arc path A.P generated by the arc path forming unit 500 according to one implementation will be described in detail, with reference to FIGS. 15 to 18.

In the following description, it will be assumed that an arc is generated at a contact portion between the fixed contactor 220 and the movable contactor 430 right after the fixed contactor 220 and the movable contactor 430 are separated from each other.

In addition, in the following description, magnetic fields that are produced between different main magnets 521, 522, 523, and 524 are referred to as "Main Magnetic Fields (M.M.F)", and a magnet field produced by each of the main magnets 521, 522, 523, and 524, the magnetization member 530, or the sub magnet 540 is referred to as a "sub magnetic field (S.M.F)".

Figure 15:
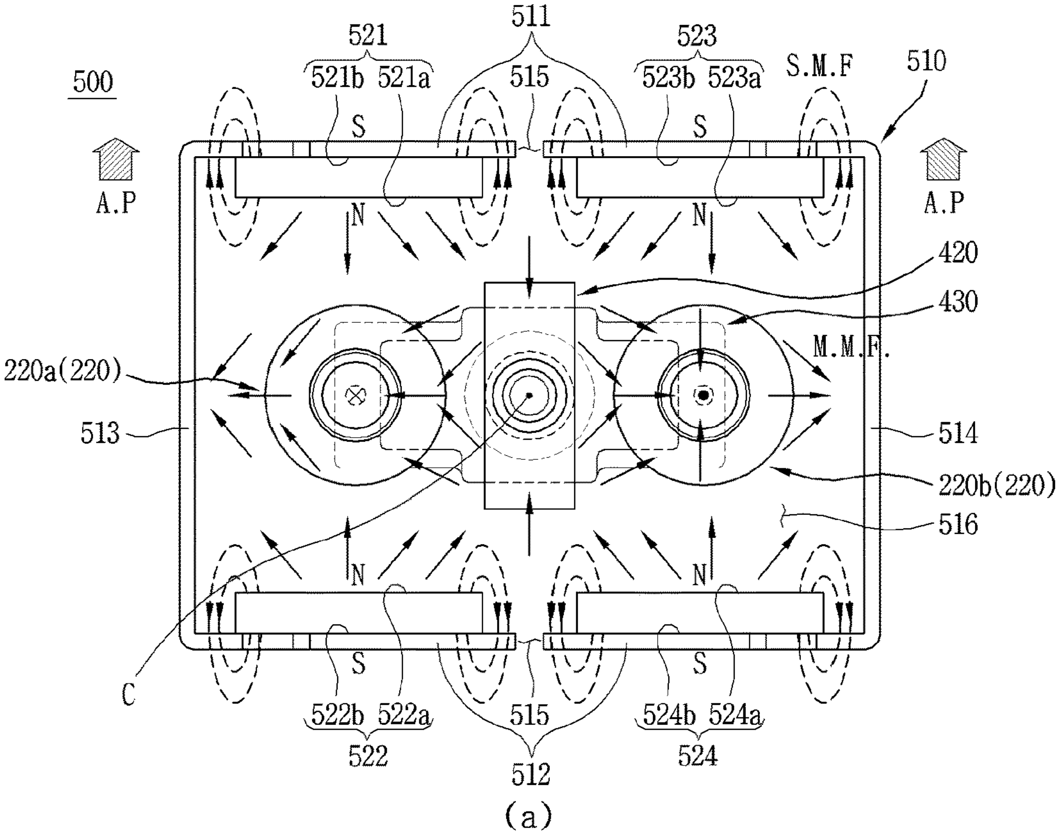
FIG. 15 is a planar view illustrating a moving (proceeding, flowing) direction of an arc generated inside the magnet assembly of FIGS. 5 and 6.
Figure 15:
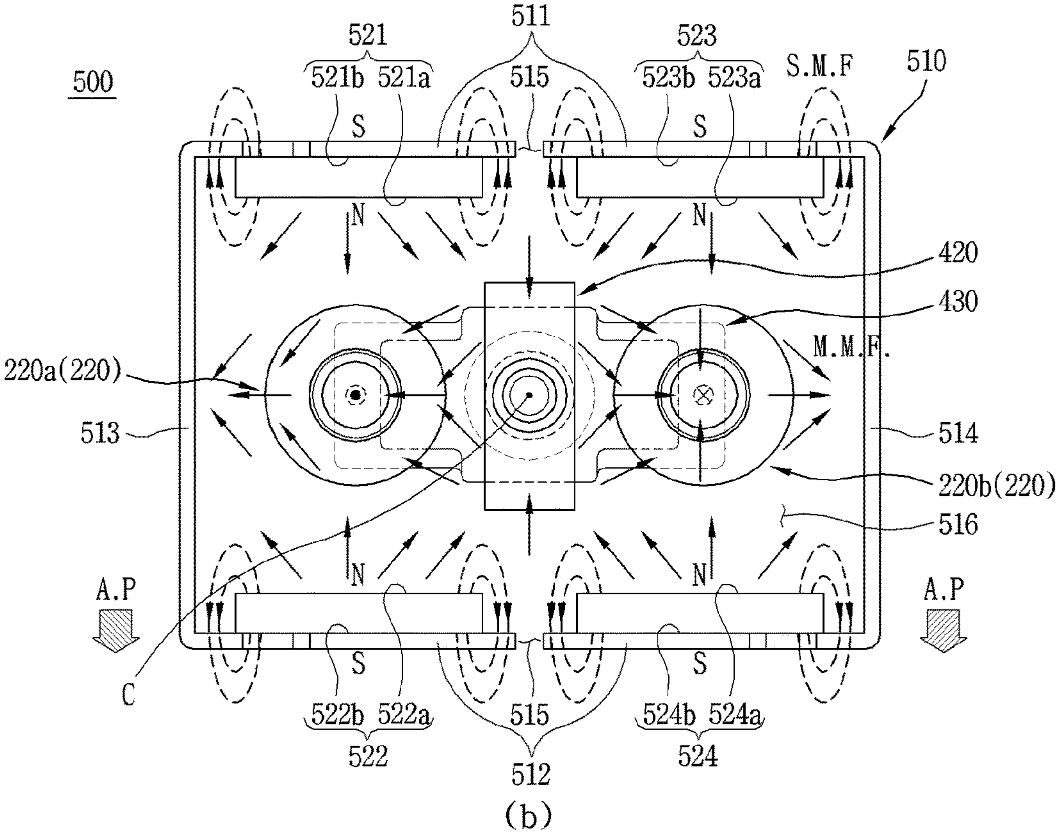
Figure 16:
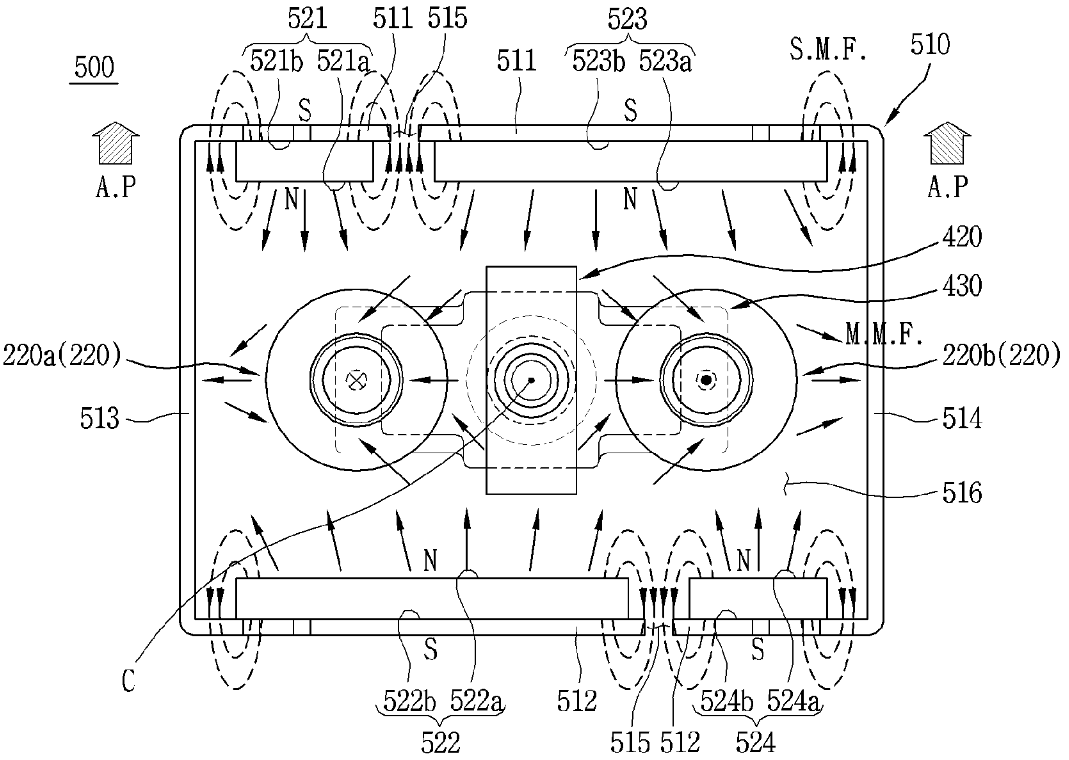
FIG. 16 is a planar view illustrating a moving direction of an arc generated inside the magnet assembly of FIG. 7.

Referring to FIGS. 15 and 16, an implementation in which the arc path forming unit 500 includes the main magnet 520 is illustrated.

FIG. 16 illustrates an implementation in which the main magnets 521, 522, 523, and 524 have different lengths, but it will be understood that the processes and directions of producing magnetic fields and electromagnetic forces are similar to those in the implementation of FIG. 15.

With regard to a flowing direction of current in (a) of FIG. 15 and (a) of FIG. 16, the current may flow into the first fixed contactor 220*a* and flow out through the second fixed contactor 220*b* via the movable contactor 430.

The first main magnet 521 to the fourth main magnet 524 may produce main magnetic fields M.M.F. The facing surfaces 521*a*, 522*a*, 523*a*, and 524*a* of the respective main magnets 521, 522, 523, and 524 may have the same polarity. In the illustrated implementation, the facing surfaces 521*a*, 522*a*, 523*a*, and 524*a* may have an N pole.

As is well known, a magnetic field diverges from an N pole and converges to an S pole. Accordingly, the main magnetic fields M.M.F generated by the main magnets 521, 522, 523, and 524 may diverge from the facing surfaces 521*a*, 522*a*, 523*a*, and 524*a*, respectively.

First, considering the rear side, the main magnetic fields M.M.F diverging from the first main magnet 521 and the third main magnet 523 may move toward the fixed contactor 220 and the movable contactor 430.

Also, considering the front side, the main magnetic fields M.M.F diverging from the second main magnet 522 and the fourth main magnet 524 may move toward the fixed contactor 220 and the movable contactor 430.

Accordingly, the main magnetic fields M.M.F diverging from the respective main magnets 521, 522, 523, and 524 may meet at the fixed contactor 220, the movable contactor 430, and the central portion C.

A force to repel each other, that is, a repulsive force, may be generated between the main magnetic fields M.M.F diverging from the main magnets 521, 522, 523, and 524. Accordingly, the main magnetic fields M.M.F that reach the fixed contactor 220, the movable contactor 430, and the central portion C may start to proceed in different directions, for example, in the left and right directions in the illustrated implementation.

In addition, the main magnets 521, 522, 523, and 524 may continuously produce the main magnetic fields M.M.F, respectively. Accordingly, the main magnetic fields M.M.F may flow toward the third surface 513 or the fourth surface 514 rather than toward the central portion C, which is a narrow space.

Specifically, at the first fixed contactor 220*a*, the main magnetic field M.M.F may flow toward the third surface 513. Also, at the second fixed contactor 220*b*, the main magnetic field M.M.F may flow toward the fourth surface 514.

If the Fleming's left-hand rule is applied at the first fixed contactor 220*a*, the main magnetic field M.M.F is directed to the third surface 513 and current flows from the upper side to the lower side. Therefore, electromagnetic force may be generated toward the rear side, namely, toward the first surface 511.

Also, if the Fleming's left-hand rule is applied at the second fixed contactor 220*b*, the main magnetic field M.M.F is directed to the fourth surface 514 and current flows from the lower side to the upper side. Therefore, electromagnetic force may also be generated toward the rear side, namely, toward the first surface 511.

Accordingly, the arc path A.P formed by the electromagnetic force may be formed toward the rear side, that is, toward the first surface 511.

With regard to a flowing direction of current in (b) of FIG. 15 and (b) of FIG. 16, the current may flow into the second fixed contactor 220*b* and flow out through the first fixed contactor 220*a* via the movable contactor 430.

The directions of the main magnetic fields M.M.F produced by the respective main magnets 521, 522, 523, and 524 are as described above.

If the Fleming's left-hand rule is applied at the first fixed contactor 220*a*, the main magnetic field M.M.F is directed to the third surface 513 and current flows from the lower side to the upper side. Therefore, electromagnetic force may be generated toward the front side, namely, toward the second surface 512.

Also, if the Fleming's left-hand rule is applied at the second fixed contactor 220*b*, the main magnetic field M.M.F is directed to the fourth surface 514 and current flows from the upper side to the lower side. Therefore, electromagnetic force may also be generated toward the front side, namely, toward the second surface 512.

Accordingly, the arc path A.P formed by the electromagnetic force may be formed toward the front side, that is, toward the second surface 512.

Therefore, a generated arc may proceed in a direction away from the central portion C. This can prevent each component of the DC relay 10 densely distributed at the central portion C from being damaged due to the arc.

Meanwhile, each of the main magnets 521, 522, 523, and 524 may produce a sub magnetic field S.M.F by itself. The sub magnetic field S.M.F may flow from each facing surface 521*a*, 522*a*, 523*a*, 524*a* toward the opposing surface 521*b*, 522*b*, 523*b*, 524*b*.

That is, the sub magnetic field S.M.F diverging from each of the main magnets 521, 522, 523, and 524 inside the space portion 516 may proceed in the same direction as the main magnetic field M.M.F. Accordingly, the sub magnetic field S.M.F can reinforce strength of the main magnetic field M.M.F.

Therefore, the electromagnetic force generated by the main magnetic field M.M.F can also be strengthened, thereby forming the arc path A.P more effectively.

Figure 17:
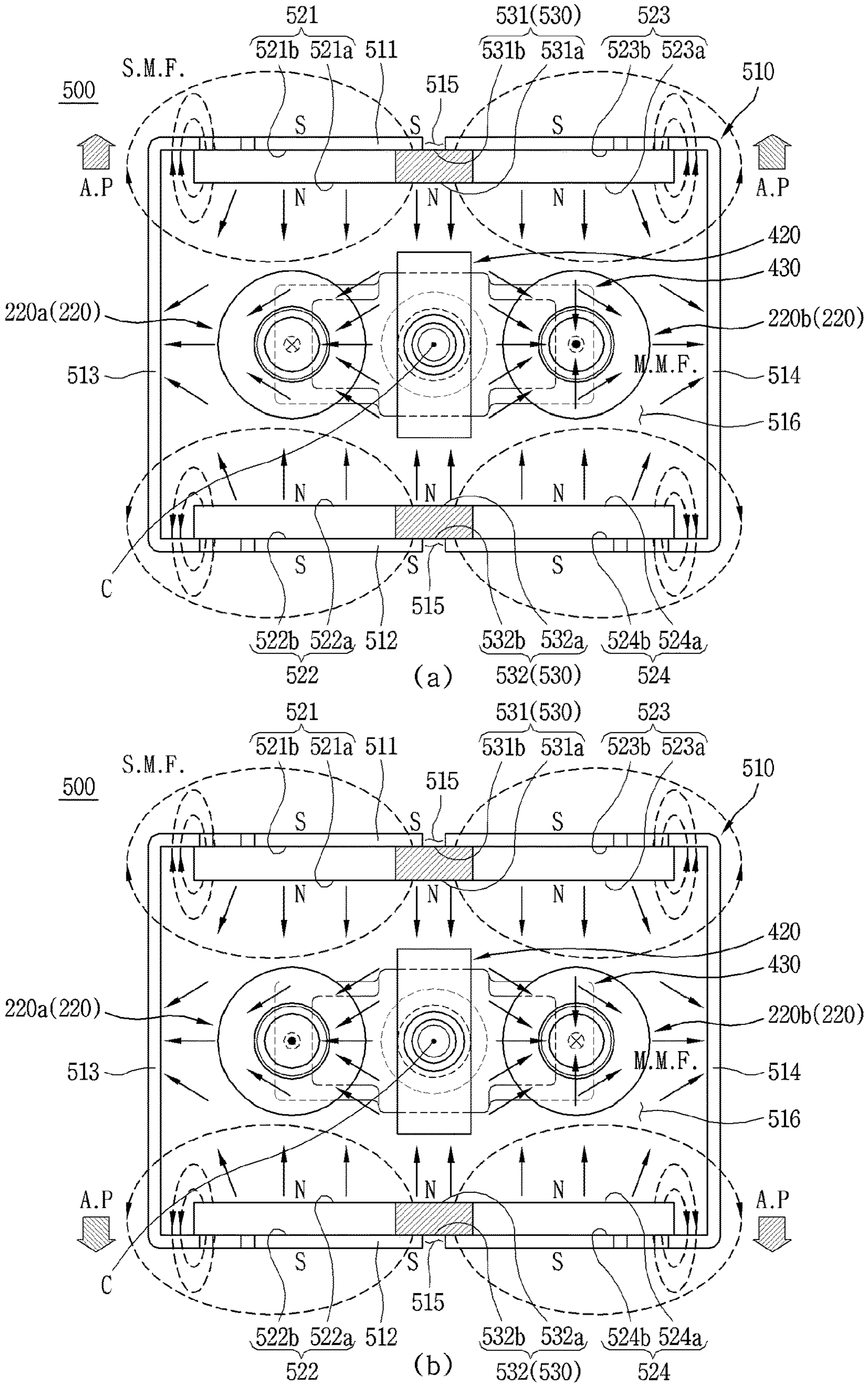
FIG. 17 is a planar view illustrating a moving direction of an arc generated inside the magnet assembly of FIG. 8.

Referring to FIG. 17, an implementation in which the arc path forming unit 500 includes the main magnet 520 and the magnetization member 530 is illustrated.

With regard to a flowing direction of current in (a) of FIG. 17, the current may flow into the first fixed contactor 220*a* and flow out through the second fixed contactor 220*b* via the movable contactor 430.

With regard to a flowing direction of current in (b) of FIG. 17, the current may flow into the second fixed contactor 220*b* and flow out through the first fixed contactor 220*a* via the movable contactor 430.

As aforementioned, the main magnetic field M.M.F and the sub magnetic field S.M.F may be produced by each of the main magnets 521, 522, 523, and 524, and thus the electromagnetic force forming the arc path A.P may be generated.

Therefore, hereinafter, a process in which the main magnetic field M.M.F is strengthened by the magnetization member 530 will be mainly described.

The first magnetization member 531 may be in contact with the first main magnet 521 and the third main magnet 523. The first magnetization facing surface 531*a* may have the same polarity as the polarity of the first facing surface 521*a* and the third facing surface and 523*a*. In the illustrated implementation, the first magnetization facing surface 531*a* may have an N pole.

The second magnetization member 532 may be in contact with the second main magnet 522 and the fourth main magnet 524. The second magnetization facing surface 532*a* may have the same polarity as the polarity of the second facing surface 522*a* and the fourth facing surface and 524*a*. In the illustrated implementation, the second magnetization facing surface 532*a* may have the N pole.

The magnetic fields diverging from the first magnetization facing surface 531*a* and the second magnetization facing surface 532*a* may flow toward the fixed contactor 220, the movable contactor 430, and the central portion C. Accordingly, the magnetic fields diverging from the respective magnetization facing surfaces 531*a* and 532*a* may meet at the fixed contactor 220, the movable contactor 430, and the central portion C.

At this time, since each magnetization facing surface 531*a* and 532*a* have the same polarity, for example, the N pole in the illustrated implementation, force to repel each other, i.e., repulsive force may be generated between the magnetic fields.

Accordingly, the magnetic fields diverging from the magnetization facing surfaces 531*a* and 532*a* may flow similarly to the flowing direction of the aforementioned main magnetic fields M.M.F.

Specifically, the magnetic fields diverging from the first magnetization facing surface 531*a* and the second magnetization facing surface 523*a* may move toward the third surface 513 or the fourth surface 514.

Accordingly, the main magnetic fields M.M.F diverging from the main magnets 521, 522, 523, and 524 and the magnetic fields diverging from the magnetization members 531 and 532 may be superimposed at the fixed contactors 220*a* and 220*b*.

In addition, the magnetic fields diverging from the magnetization members 531 and 532 may move along the same path as the main magnetic fields M.M.F. This can increase the strength of the main magnetic field M.M.F.

Therefore, the electromagnetic force generated at the fixed contactors 220*a* and 220*b* can also be strengthened, thereby forming the arc path A.P effectively.

As described above, the electromagnetic force may move toward the rear side, that is, toward the first surface 511 in (a) of FIG. 17. Also, the electromagnetic force may move toward the rear side, that is, toward the second surface 512 in (b) of FIG. 17.

Meanwhile, the magnetization members 531 and 532 may produce the sub magnetic fields S.M.F. The sub magnetic fields S.M.F may move from the magnetization facing surfaces 531*a* and 532*a* toward the magnetization opposing surfaces 531*b* and 532*b*, respectively.

That is, the sub magnetic fields S.M.F diverging from the magnetization members 531 and 532 may move in the same direction as the sub magnetic fields S.M.F diverging from the main magnets 521, 522, 523, and 524 inside the space portion 516.

Accordingly, the sub magnetic fields S.M.F diverging from the magnetization members 531 and 532 can increase the strength of the main magnetic fields M.M.F and the sub magnetic fields S.M.F diverging from the main magnets 521, 522, 523, and 524.

In addition, as described above, the magnetization members 531 and 532 may be connected to the main magnets 521, 522, 523, and 524, so as to function as the single magnet. Accordingly, a magnetic field may be produced between the magnetization members 531 and 532 in the same direction as the main magnetic fields M.M.F produced by the main magnets 521, 522, 523, and 524.

Therefore, the electromagnetic force generated by the main magnetic field M.M.F can also be strengthened, thereby forming the arc path A.P more effectively.

Figure 18:
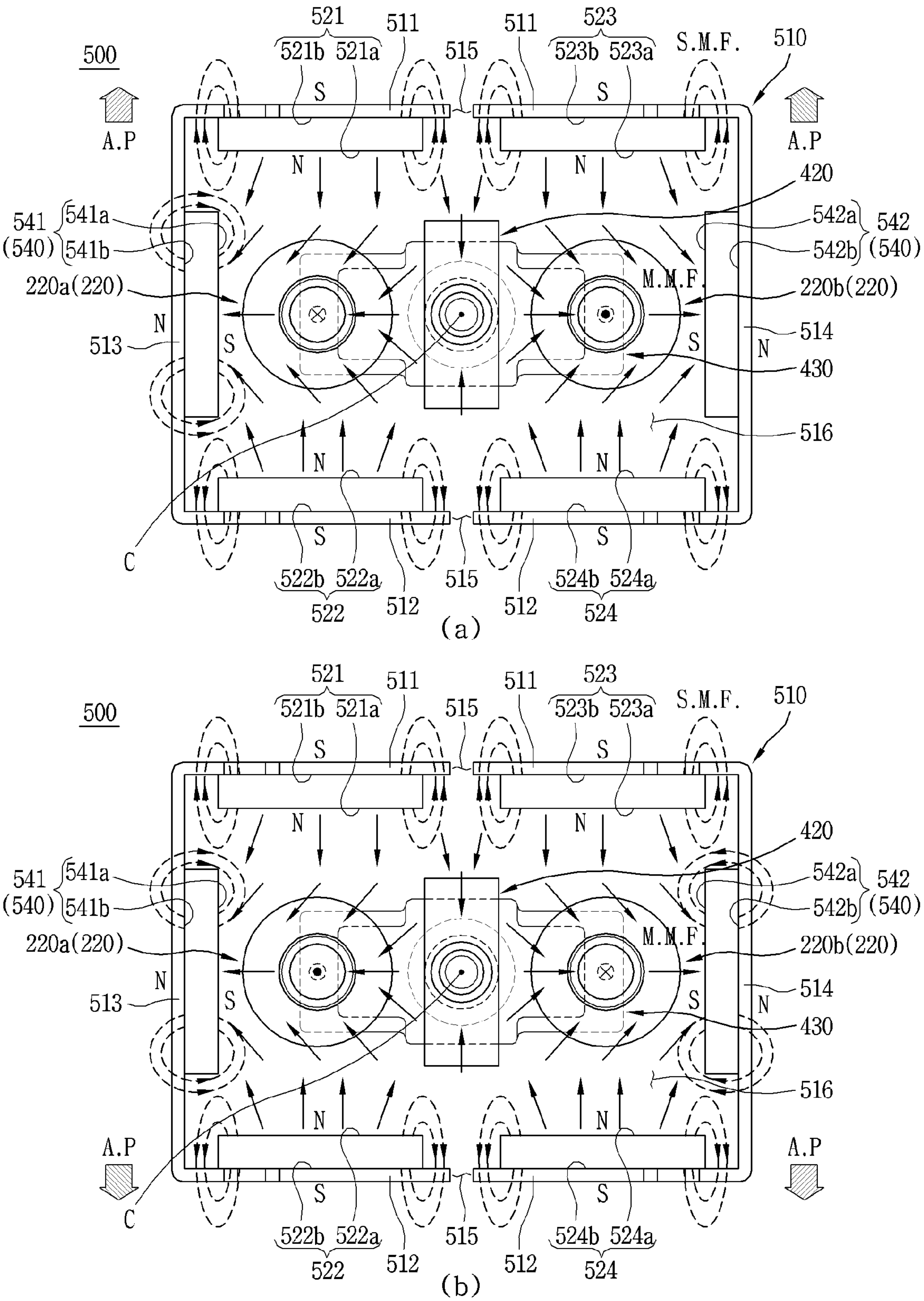
FIG. 18 is a planar view illustrating a moving direction of an arc generated inside the magnet assembly of FIG. 9.

Referring to FIG. 18, an implementation in which the arc path forming unit 500 includes the main magnet 520 and the sub magnet 540 is illustrated.

With regard to a flowing direction of current in (a) of FIG. 18, the current may flow into the first fixed contactor 220*a* and flow out through the second fixed contactor 220*b* via the movable contactor 430.

With regard to a flowing direction of current in (b) of FIG. 18, the current may flow into the second fixed contactor 220*b* and flow out through the first fixed contactor 220*a* via the movable contactor 430.

As aforementioned, the main magnetic field M.M.F and the sub magnetic field S.M.F may be produced by each of the main magnets 521, 522, 523, and 524, and thus the electromagnetic force forming the arc path A.P may be generated.

Therefore, hereinafter, a process in which the main magnetic field M.M.F is strengthened by the sub magnet 540 will be mainly described.

Each sub magnet 540 may be disposed on a surface of the magnet frame 510 on which the main magnet 520 is not disposed. In the illustrated implementation, the main magnets 520 may be located on the first surface 511 and the second surface 512, and thus the sub magnets 540 may be located on the third surface 513 and the fourth surface 514.

Specifically, the first sub magnet 541 may be located on the third surface 513 and the second sub magnet 542 on the fourth surface 514.

The sub facing surfaces 541*a* and 542*a* of the sub magnets 541 and 542 may have a polarity different from that of the facing surfaces 521*a*, 522*a*, 523*a*, and 524*a*. In the illustrated implementation, the facing surfaces 521*a*, 522*a*, 523*a*, and 524*a* may have the N pole, and thus the sub facing surfaces 541*a* and 542*a* may have the S pole.

Accordingly, the sub magnets 541 and 542 may produce magnetic fields in a direction converging to the sub facing surfaces 541*a* and 542*a*.

Therefore, the main magnetic fields M.M.F diverging from the first main magnet 521 and the second main magnet 522 may move toward the first sub magnet 541. Also, the main magnetic fields M.M.F diverging from the third main magnet 523 and the fourth main magnet 524 may move toward the second sub magnet 542.

Accordingly, the main magnetic fields M.M.F may move not only in a direction diverging from each of the main magnets 521, 522, 523, and 524 but also in a direction converging to each of the sub magnets 541 and 542.

Accordingly, the strength of the main magnetic fields M.M.F produced at the first fixed contactor 220*a* can further be increased in the direction toward the first sub magnet 541, that is, toward the third surface 513.

Likewise, the main magnetic fields M.M.F produced at the second fixed contactor 220*b* can further be strengthened in the direction toward the second sub magnet 542, that is, toward the fourth surface 514.

Therefore, the electromagnetic force generated at the fixed contactors 220*a* and 220*b* can also be strengthened by the main magnetic fields M.M.F, thereby forming the arc path A.P effectively.

The foregoing description has been mainly given of the implementation in which each of the facing surfaces 521*a*, 522*a*, 523*a*, and 524*a* has the N pole, but another implementation in which each of the facing surfaces 521*a*, 522*a*, 523*a*, and 524*a* has the S pole may also be considered. In this case, it will be understood that a direction of electromagnetic force and an arc path A. P are formed opposite to those of the previous implementation.

As described above, in the arc path forming unit 500, the arc may not move toward the central portion C regardless of the direction of the current applied to the fixed contactor 220. That is, the arc path A.P formed by the arc path forming unit 500 may be formed to extend toward the front or rear side, other than toward the central portion C.

Therefore, each component densely distributed at the central portion C cannot be damaged by the arc.

6. Description of Arc Path A.P Formed by Arc Path Forming Unit 600 According to Another Implementation The arc path forming unit 600 may be configured to produce a magnetic field in the arc chamber 210. The produced magnetic field may generate electromagnetic force to form a path A.P of a generated arc.

That is, when the fixed contactor 220 and the movable contactor 430 are brought into contact with each other and thus current flows in a state in which a magnetic field is generated in the arc chamber 210, electromagnetic force may be generated according to the Fleming's left-hand rule. An arc generated inside the arc chamber 210 may move along a direction of the electromagnetic force.

Hereinafter, an arc path A.P generated by the arc path forming unit 600 according to one implementation will be described in detail, with reference to FIGS. 19 to 22.

In the following description, it will be assumed that an arc is generated at a contact portion between the fixed contactor 220 and the movable contactor 430 right after the fixed contactor 220 and the movable contactor 430 are separated from each other.

In addition, in the following description, a magnetic field that is produced between the different main magnets 621 and 622 is referred to as a "Main Magnetic Field (M.M.F)", and a magnet field produced by each of the main magnets 621 and 622, the magnetization member 630, or the sub magnet 640 is referred to as a "sub magnetic field (S.M.F)".

Figure 19:
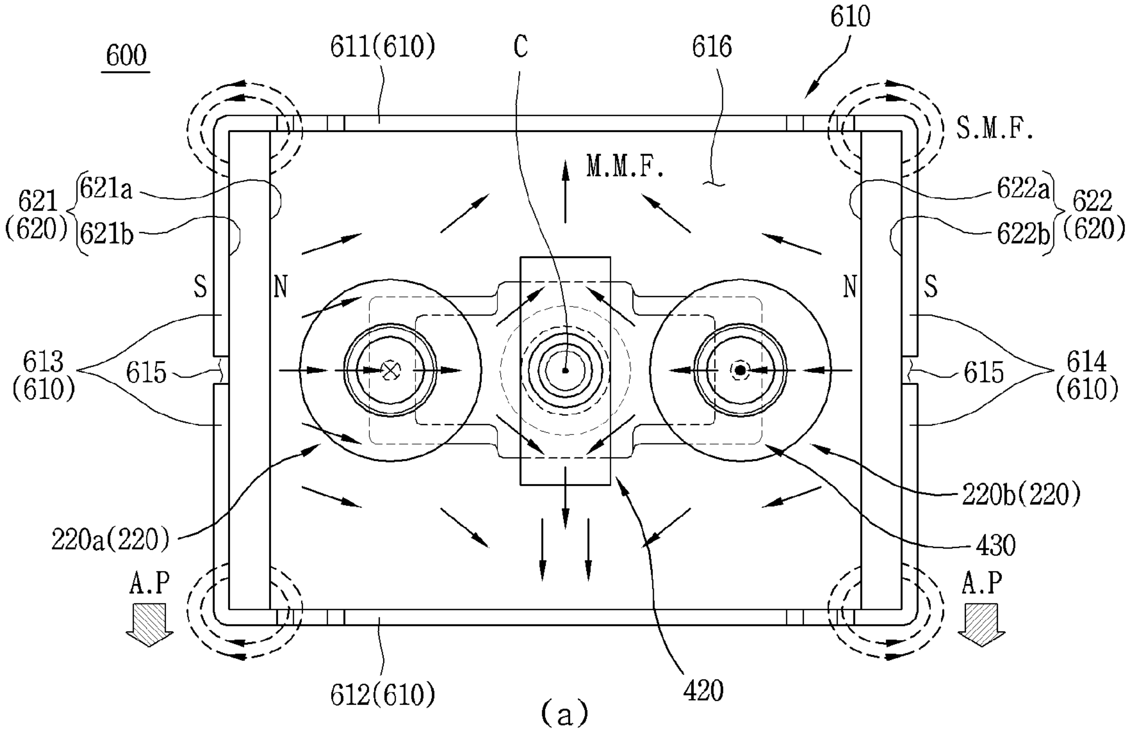
FIG. 19 is a planar view illustrating a moving direction of an arc generated inside the magnet assembly of FIGS. 10 and 11.
Figure 19:
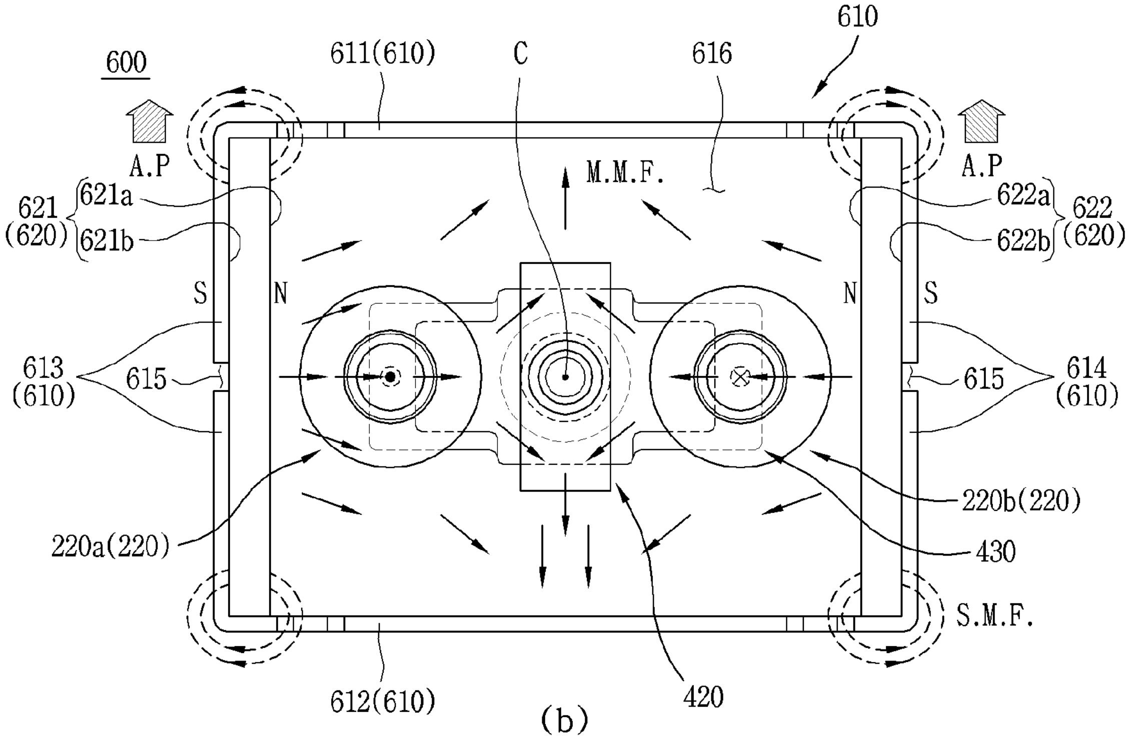
Figure 20:
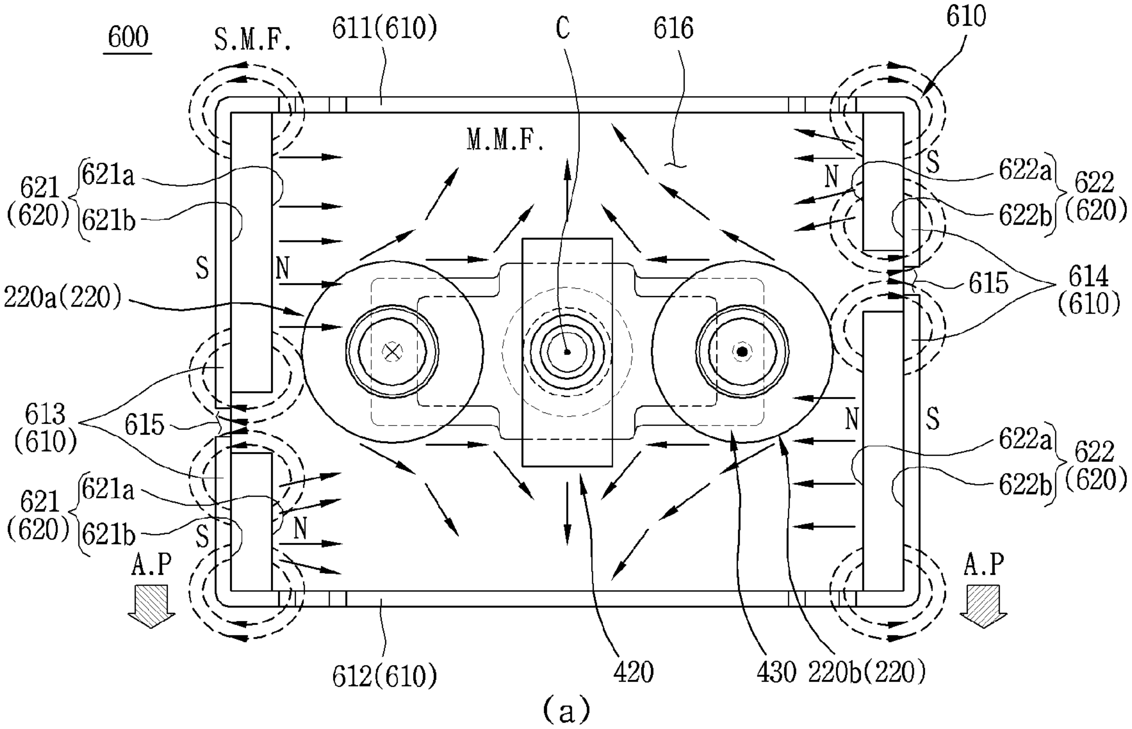
FIG. 20 is a planar view illustrating a moving direction of an arc generated inside the magnet assembly of FIG. 12.
Figure 20:
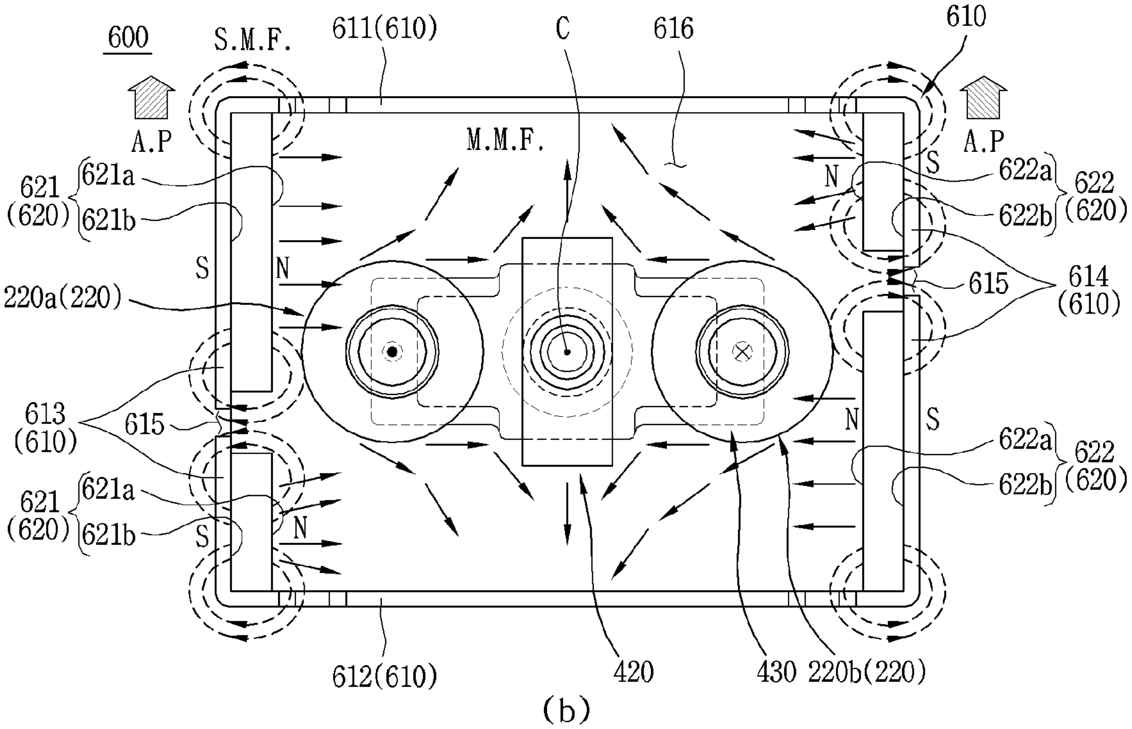

Referring to FIGS. 19 and 20, an implementation in which the arc path forming unit 600 includes the main magnet 620 is illustrated.

FIG. 20 illustrates an implementation in which each of the main magnets 621 and 622 is provided in plurality and the plurality of main magnets 621 and the plurality of main magnets 622 have different lengths, respectively. However, it will be understood that the processes and directions of producing magnetic fields and electromagnetic forces are similar to those in the implementation of FIG. 19.

With regard to a flowing direction of current in (a) of FIG. 19 and (a) of FIG. 20, the current may flow into the first fixed contactor 220*a* and flow out through the second fixed contactor 220*b* via the movable contactor 430.

The first main magnet 621 and the second main magnet 622 may produce main magnetic fields M.M.F. The facing surfaces 621*a* and 622*a* of the respective main magnets 621 and 622 may have the same polarity. In the illustrated implementation, the facing surfaces 621*a* and 622*a* may have an N pole.

As is well known, a magnetic field diverges from an N pole and converges to an S pole. Accordingly, the main magnetic fields M.M.F generated by the main magnets 621 and 622 may diverge from the facing surfaces 621*a* and 622*a*, respectively.

First, considering a left side, the main magnetic field M.M.F diverging from the first main magnet 621 may move toward the fixed contactor 220 and the movable contactor 430.

Also, considering a right side, the main magnetic field M.M.F diverging from the second main magnet 622 may move toward the fixed contactor 220 and the movable contactor 430.

Accordingly, the main magnetic fields M.M.F diverging from the respective main magnets 621 and 622 may meet at the central portion C of the space portion 616. A force to repel each other, that is, a repulsive force, may be generated between the main magnetic fields M.M.F diverging from the main magnets 621 and 622.

Accordingly, the main magnetic fields M.M.F that reach the central portion C may start to proceed in different directions, for example, in the left and right directions in the illustrated implementation.

In addition, the main magnets 621 and 622 may continuously produce the main magnetic fields M.M.F, respectively. Accordingly, the main magnetic fields M.M.F may flow toward the first surface 511 or the fourth surface 514.

Therefore, at the first fixed contactor 220*a*, the main magnetic field M.M.F may flow toward the central portion C or the fourth surface 614, namely, toward the right side in the illustrated implementation. Also, at the second fixed contactor 220*b*, the main magnetic field M.M.F may flow toward the central portion C or the third surface 613, namely, toward the left side in the illustrated implementation.

If the Fleming's left-hand rule is applied at the first fixed contactor 220*a*, the main magnetic field M.M.F is directed to the fourth surface 614 and current flows from the upper side to the lower side. Therefore, electromagnetic force may be generated toward the front side, namely, toward the second surface 612.

Also, if the Fleming's left-hand rule is applied at the second fixed contactor 220*b*, the main magnetic field M.M.F is directed to the third surface 613 and current flows from the lower side to the upper side. Therefore, electromagnetic force may also be generated toward the front side, namely, toward the second surface 612.

Accordingly, the arc path A.P formed by the electromagnetic force may be formed toward the front side, that is, toward the second surface 612.

With regard to a flowing direction of current in (b) of FIG. 19 and (b) of FIG. 20, the current may flow into the second fixed contactor 220*b* and flow out through the first fixed contactor 220*a* via the movable contactor 430.

The directions of the main magnetic fields M.M.F produced by the respective main magnets 621 and 622 are as described above.

If the Fleming's left-hand rule is applied at the first fixed contactor 220*a*, the main magnetic field M.M.F is directed to the fourth surface 614 and current flows from the lower side to the upper side. Therefore, electromagnetic force may be generated toward the rear side, namely, toward the first surface 611.

Also, if the Fleming's left-hand rule is applied at the second fixed contactor 220*b*, the main magnetic field M.M.F is directed to the third surface 613 and current flows from the upper side to the lower side. Therefore, electromagnetic force may also be generated toward the rear side, namely, toward the first surface 611.

Accordingly, the arc path A.P formed by the electromagnetic force may be formed toward the rear side, that is, toward the first surface 611.

Therefore, a generated arc may proceed in a direction away from the central portion C. This can prevent each component of the DC relay 10 densely distributed at the central portion C from being damaged due to the arc.

Meanwhile, the main magnets 621 and 622 may produce the sub magnetic fields S.M.F. The sub magnetic fields S.M.F may move from the facing surfaces 621*a* and 622*a* toward the opposing surfaces 621*b* and 622*b*, respectively.

That is, the sub magnetic field S.M.F diverging from each of the main magnets 621 and 622 inside the space portion 616 may proceed in the same direction as the main magnetic field M.M.F. Accordingly, the sub magnetic field S.M.F can reinforce the strength of the main magnetic field M.M.F.

Therefore, the electromagnetic force generated by the main magnetic field M.M.F can also be strengthened, thereby forming the arc path A.P more effectively.

Figure 21:
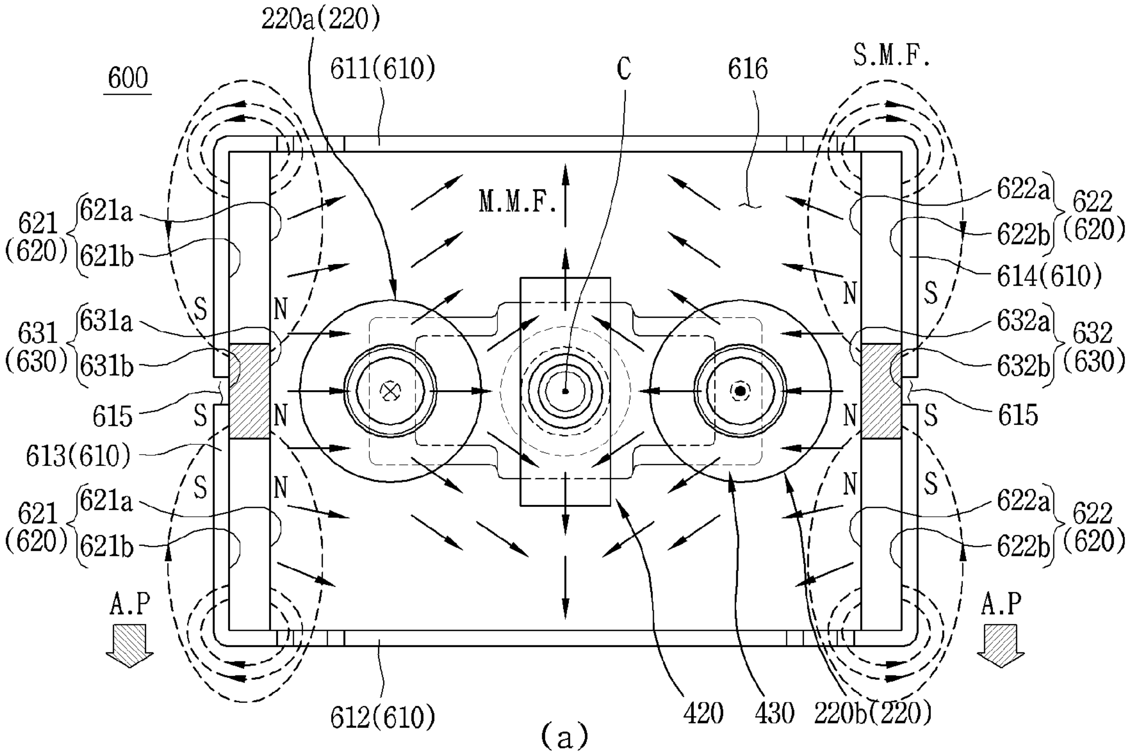
FIG. 21 is a planar view illustrating a moving direction of an arc generated inside the magnet assembly of FIG. 13.
Figure 21:
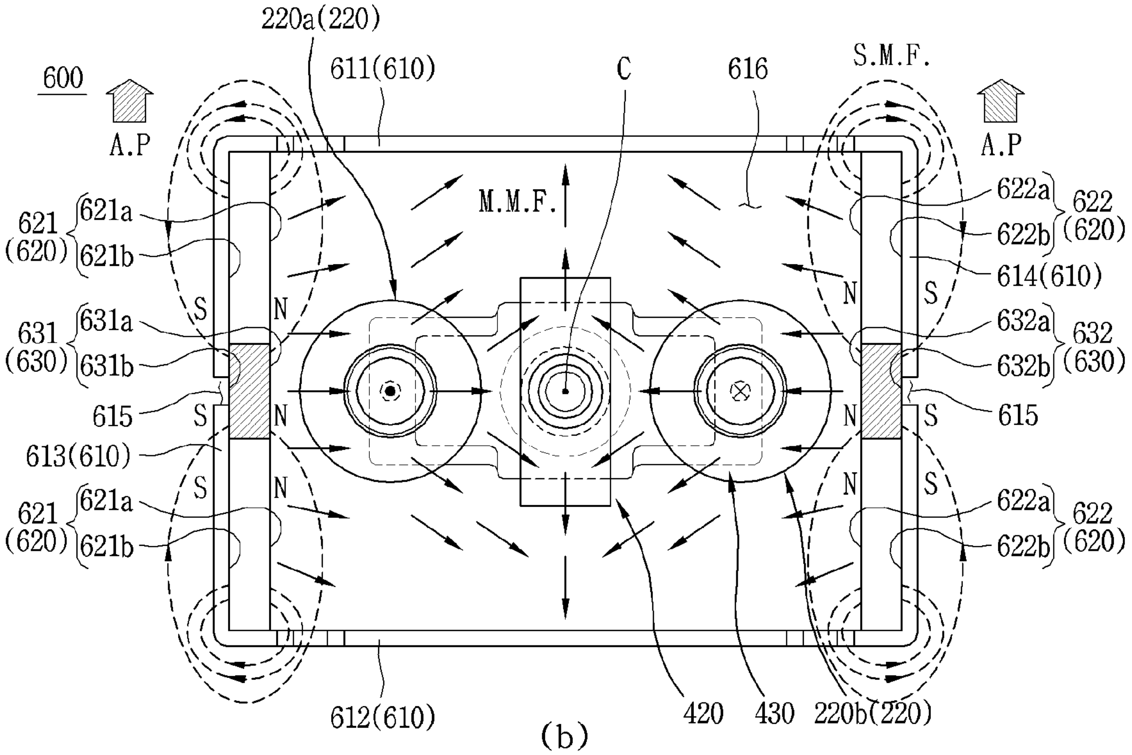

Referring to FIG. 21, an implementation in which the arc path forming unit 600 includes the main magnet 620 and the magnetization member 630 is illustrated.

With regard to a flowing direction of current in (a) of FIG. 21, the current may flow into the first fixed contactor 220*a* and flow out through the second fixed contactor 220*b* via the movable contactor 430.

With regard to a flowing direction of current in (b) of FIG. 21, the current may flow into the second fixed contactor 220*b* and flow out through the first fixed contactor 220*a* via the movable contactor 430.

As aforementioned, the main magnetic field M.M.F and the sub magnetic field S.M.F may be produced by each of the main magnets 621 and 622, and thus the electromagnetic force forming the arc path A.P may be generated.

Therefore, hereinafter, a process in which the main magnetic field M.M.F is strengthened by the magnetization member 630 will be mainly described.

The first magnetization member 631 may be in contact with the first main magnet 621. The first magnetization facing surface 631*a* may have the same polarity as the first facing surface 621*a*. In the illustrated implementation, the first magnetization facing surface 631*a* may have an N pole.

The second magnetization member 632 may be in contact with the second main magnet 622. The second magnetization facing surface 632*a* may have the same polarity as the second facing surface 622*a*. In the illustrated implementation, the second magnetization facing surface 632*a* may have the N pole.

The magnetic fields diverging from the first magnetization facing surface 631*a* and the second magnetization facing surface 632*a* may flow toward the central portion C. Specifically, the magnetic field diverging from the first magnetization facing surface 631*a* may proceed toward the fourth surface 614. Also, the magnetic field diverging from the second magnetization facing surface 632*a* may proceed toward the third surface 613.

Accordingly, the magnetic fields diverging from the respective magnetization facing surfaces 631*a* and 632*a* may meet at the central portion C.

At this time, since each of the magnetization facing surfaces 631*a* and 632*a* has the same polarity, for example, the N pole in the illustrated implementation, force to repel each other, i.e., repulsive force may be generated between the magnetic fields.

Accordingly, the magnetic fields diverging from the magnetization facing surfaces 631*a* and 632*a* may flow similarly to the flowing direction of the aforementioned main magnetic fields M.M.F.

Accordingly, not only the main magnetic fields M.M.F diverging from the main magnets 621 and 622 but also the magnetic fields diverging from the magnetization members 631 and 632 can be produced at the fixed contactors 220*a* and 220*b*.

In addition, the magnetic fields diverging from the magnetization members 631 and 632 may move along the same path as the main magnetic fields M.M.F. This can reinforce the strength of the main magnetic field M.M.F.

Therefore, the electromagnetic force generated at the fixed contactors 220*a* and 220*b* can also be strengthened, thereby forming the arc path A.P effectively.

Of course, as aforementioned, the electromagnetic force may move toward the front side, that is, toward the second surface 612 in (a) of FIG. 21. Also, the electromagnetic force may move toward the rear side, that is, toward the first surface 611 in (b) of FIG. 21.

Meanwhile, the magnetization members 631 and 632 may produce the sub magnetic fields S.M.F. The sub magnetic fields S.M.F may move from the magnetization facing surfaces 631*a* and 632*a* toward the magnetization opposing surfaces 631*b* and 632*b*, respectively.

That is, the sub magnetic fields S.M.F diverging from the magnetization members 631 and 632 may move in the same direction as the sub magnetic fields S.M.F diverging from the main magnets 621 and 622 inside the space portion 616.

Accordingly, the sub magnetic fields S.M.F diverging from the magnetization members 631 and 632 can increase the strength of the main magnetic fields M.M.F and the sub magnetic fields S.M.F diverging from the main magnets 621 and 622.

In addition, as described above, the magnetization members 631 and 632 may be connected to the main magnets 621 and 622, so as to function as the single magnet. Accordingly, a magnetic field may be produced between the magnetization members 631 and 632 in the same direction as the main magnetic fields M.M.F produced by the main magnets 621 and 622.

Therefore, the electromagnetic force generated by the main magnetic field M.M.F can also be strengthened, thereby forming the arc path A.P more effectively.

Figure 22:
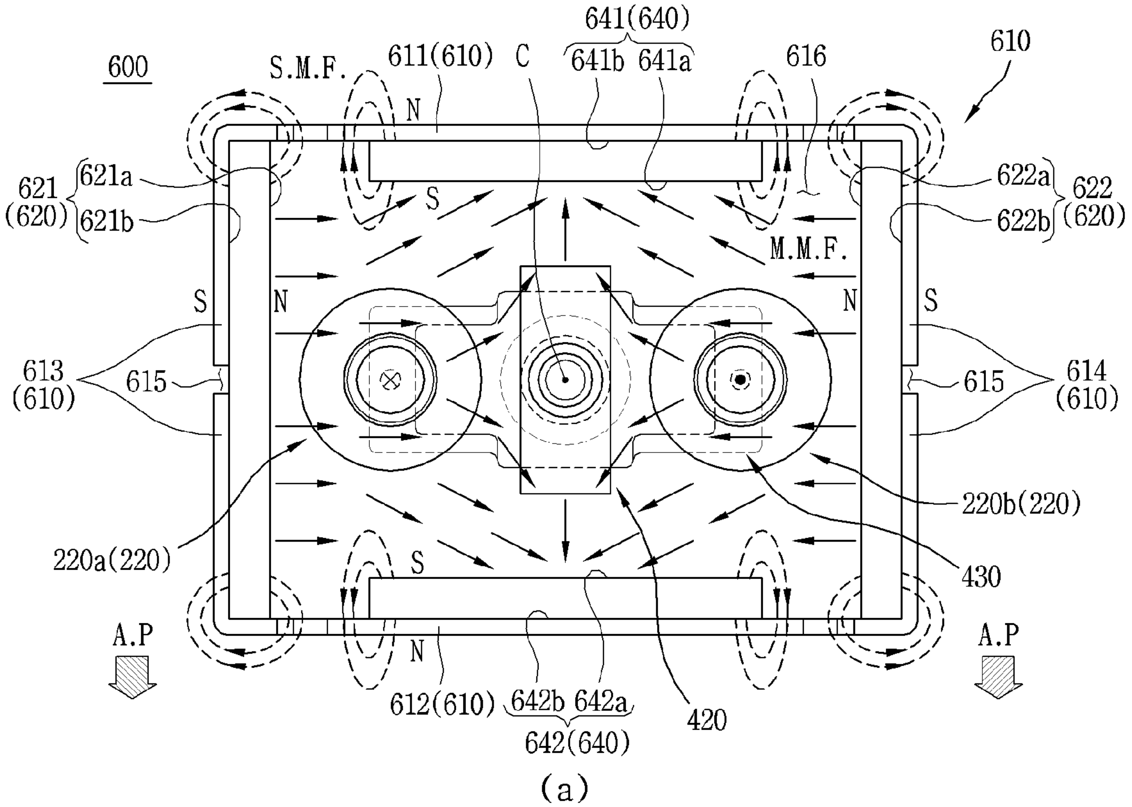
FIG. 22 is a planar view illustrating a moving direction of an arc generated inside the magnet assembly of FIG. 14.
Figure 22:
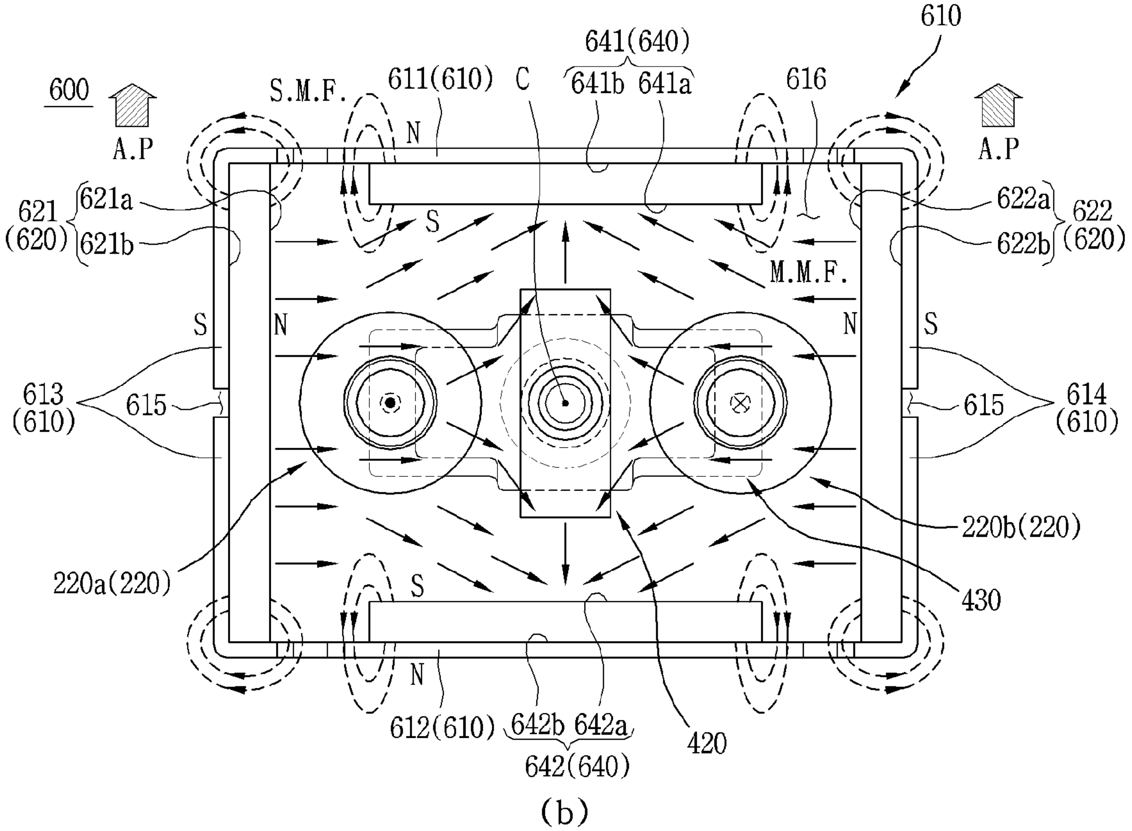

Referring to FIG. 22, an implementation in which the arc path forming unit 600 includes the main magnet 620 and the sub magnet 640 is illustrated.

With regard to a flowing direction of current in (a) of FIG. 22, the current may flow into the first fixed contactor 220*a* and flow out through the second fixed contactor 220*b* via the movable contactor 430.

With regard to a flowing direction of current in (b) of FIG. 22, the current may flow into the second fixed contactor 220*b* and flow out through the first fixed contactor 220*a* via the movable contactor 430.

As aforementioned, the main magnetic field M.M.F and the sub magnetic field S.M.F may be produced by each of the main magnets 621 and 622, and thus the electromagnetic force forming the arc path A.P may be generated.

Therefore, hereinafter, a process in which the main magnetic field M.M.F is strengthened by the sub magnet 640 will be mainly described.

Each sub magnet 640 may be disposed on a surface of the magnet frame 610 on which the main magnet 620 is not disposed. In the illustrated implementation, the main magnets 620 may be located on the third surface 613 and the fourth surface 614, and thus the sub magnets 640 may be located on the first surface 611 and the second surface 612.

Specifically, the first sub magnet 641 may be located on the first surface 611 and the second sub magnet 642 on the second surface 612.

The sub facing surfaces 641*a* and 642*a* of the sub magnets 641 and 642 may have a polarity different from that of the facing surfaces 621*a* and 622*a*. In the illustrated implementation, the facing surfaces 621*a* and 622*a* may have the N pole, and thus the sub facing surfaces 641*a* and 642*a* may have the S pole.

Accordingly, the sub magnets 641 and 642 may produce magnetic fields converging to the sub facing surfaces 641*a* and 642*a*.

The main magnetic fields M.M.F diverging from the first main magnet 621 and the second main magnet 622 may move toward the first sub magnet 641 or the second sub magnet 642.

Accordingly, the main magnetic fields M.M.F may move not only in a direction diverging from each of the main magnets 621 and 622 but also in a direction converging to each of the sub magnets 641 and 642.

Therefore, the main magnetic field M.M.F at the first fixed contactor 220*a* can be more strengthened in a direction toward the central portion C or the second main magnet 620, namely, toward the right side in the illustrated implementation.

Similarly, the strength of the main magnetic field M.M.F at the second fixed contactor 220*b* can be more strengthened in a direction toward the central portion C or the first main magnet 621, namely, toward the left side in the illustrated implementation.

Therefore, the electromagnetic force generated at the fixed contactors 220*a* and 220*b* can also be strengthened by the main magnetic fields M.M.F, thereby forming the arc path A.P effectively.

The foregoing description has been mainly given of the implementation in which each of the facing surfaces 621*a* and 622*a* has the N pole, but another implementation in which each of the facing surfaces 621*a* and 622*a* has an S pole may also be considered. In this case, it will be understood that a direction of electromagnetic force and an arc path A. P are formed opposite to those of the previous implementation.

As described above, in the arc path forming unit 600, the arc may not move toward the central portion C regardless of the direction of the current applied to the fixed contactor 220. That is, the arc path A.P formed by the arc path forming unit 600 may be formed to extend toward the front or rear side, other than toward the central portion C.

Therefore, each component densely distributed at the central portion C cannot be damaged by the arc.

Although it has been described above with reference to preferred implementations of the present disclosure, it will be understood that those skilled in the art are able to variously modify and change the present disclosure without departing from the spirit and scope of the disclosure described in the claims below.

10: DC relay
100: Frame part
110: Upper frame
120: Lower frame
130: Insulating plate
140: Supporting plate
200: Opening/closing part
210: Arc chamber
220: Fixed contactor
220*a*: First fixed contactor
220*b*: Second fixed contactor
230: Sealing member
300: Core part
310: Fixed core
320: Movable core
330: York
340: Bobbin
350: Coil
360: Return spring
370: Cylinder
400: Movable contactor part
410: Housing
420: Cover
430: Movable contactor
440: Shaft
450: Elastic portion
500: Arc path forming unit according to first implementation
510: Magnet frame
511: First surface
512: Second surface
513: Third surface
514: Fourth surface
515: Arc discharge opening
516: Space portion
520: Main magnet
521: First main magnet
521*a*: First facing surface
521*b*: First opposing surface
522: Second main magnet
522*a*: Second facing surface
522*b*: Second opposing surface
523: Third main magnet
523*a*: Third facing surface
523*b*: Third opposing surface
524: Fourth main magnet
524*a*: Fourth facing surface
524*b*: Fourth opposing surface
530: Magnetization member
531: First magnetization member
531*a*: First magnetization facing surface
531*b*: First magnetization opposing surface
532: Second magnetization member
532*a*: Second magnetization facing surface
532*b*: Second magnetization opposing surface
540: Sub magnet
541: First sub magnet

541*a*: First sub facing surface
541*b*: First sub opposing surface
542: Second sub magnet
542*a*: Second sub facing surface
542*b*: Second sub opposing surface
600: Arc path forming unit according to second implementation
610: Magnet frame
611: First surface
612: Second surface
613: Third surface
614: Fourth surface
615: Arc discharge opening
616: Space portion
620: Main magnet
621: First main magnet
621*a*: First facing surface
621*b*: First opposing surface
622: Second main magnet
622*a*: Second facing surface
622*b*: Second opposing surface
630: Magnetization member
631: First magnetization member
631*a*: First magnetization facing surface
631*b*: First magnetization opposing surface
632: Second magnetization member
632*a*: Second magnetization facing surface
632*b*: Second magnetization opposing surface
640: Sub magnet
641: First sub magnet
641*a*: First sub facing surface
641*b*: First sub opposing surface
642: Second sub magnet
642*a*: Second sub facing surface
642*b*: Second sub opposing surface
1000: DC relay according to the related art
1100: Fixed contact according to the related art
1200: Movable contact according to the related art
1300: Permanent magnet according to the related art
1310: First permanent magnet according to the related art
1320: Second permanent magnet according to the related art
C: Central portion of space portion 516, 616
M.M.F: Main magnetic field
S.M.F: Sub magnetic field
A.P: Arc path

The invention claimed is:

1. An arc path forming unit comprising:

a magnet frame having an inner space, and comprising first and second pairs of surfaces facing each other and surrounding the inner space; and a plurality of main magnets accommodated in the inner space and coupled to the first pair of surfaces, the first pair of surfaces extending shorter than the second pair of surfaces, wherein a fixed contactor and a movable contactor configured to be brought into contact with or separated from the fixed contactor are accommodated in the inner space, and wherein the plurality of main magnets comprise:

a first main magnet coupled to a first surface of the first pair of surfaces and extending along the first pair of surfaces for a first distance that is more than half of a length of the first pair of surfaces;

a second main magnet coupled to a second surface of the first pair of surfaces and extending along the first pair of surfaces for a second distance that is less than half of the length of the first pair of surfaces;

a third main magnet coupled to the first surface of the first pair of surfaces and extending along the first pair of surfaces for the second distance, the third main magnet separated by a gap distance from the first main magnet; and a fourth main magnet coupled to the second surface of the first pair of surfaces and extending along the second pair of surfaces for the first distance, the fourth main magnet separated by the gap distance from the second main magnet;

wherein the first main magnet is disposed to face the second main magnet and the fourth main magnet, the second main magnet is disposed to face only the first main magnet, the third main magnet is disposed to face only the fourth main magnet, and the fourth main magnet is disposed to face the first main magnet and the third main magnet, and wherein facing surfaces of the plurality of main magnets that face each other have a same polarity so as to form a discharge path of an arc generated when the fixed contactor and the movable contactor are separated from each other.

2. The arc path forming unit of claim 1, wherein the facing surfaces of the plurality of main magnets that face each other have an N pole.

3. The arc path forming unit of claim 1, further comprising sub magnets coupled to the second pair of surfaces of the magnet frame, and wherein facing surfaces of the sub magnets that face each other have a same polarity.

4. The arc path forming unit of claim 3, wherein the facing surfaces of the sub magnets that face each other have a different polarity from the polarity of the facing surfaces of the plurality of main magnets.

5. The arc path forming unit of claim 1, wherein arc discharge openings are formed through the first pair of surfaces of the magnet frame, such that the inner space communicates with an outside of the magnet frame.

6. The arc path forming unit of claim 1, wherein a first magnetization member is disposed between the first main magnet and the third main magnet and a second magnetization member is disposed between the second main magnet and the fourth main magnet such that the first and third main magnets and the first magnetization member are connected to each other and the second and third main magnets and the second magnetization member are connected to each other.

7. The arc path forming unit of claim 1, wherein the first main magnet and the second main magnet comprise opposing surfaces opposite to the facing surfaces, respectively, and coming in contact with the surfaces of the magnet frame, and wherein a main magnetic field is produced between the first main magnet and the second main magnet, and a sub magnetic field is produced between the facing surfaces and the opposing surfaces of the first main magnet and the second main magnet, such that the sub magnetic field strengthens the main magnetic field.

8. The arc path forming unit of claim 1, wherein a sum of the first distance, the second distance, and the gap distance is equal to a distance between first and second surfaces of the second pair of surfaces of the magnet frame.

9. The arc path forming unit of claim 1, wherein the fixed contactor includes a first fixed contactor and a second fixed contactor, and wherein the first and fourth main magnets are disposed to position both the first fixed contactor and the second fixed contactor therebetween.

* * * * *